US008117089B2

(12) United States Patent
Minsky et al.

(10) Patent No.: US 8,117,089 B2
(45) Date of Patent: Feb. 14, 2012

(54) SYSTEM FOR SEGMENTATION BY PRODUCT CATEGORY OF PRODUCT IMAGES WITHIN A SHOPPING CART

(76) Inventors: Claudia Juliana Minsky, Santa Barbara, CA (US); Oliver Steele, Santa Barbara, CA (US); Margaret D. R. Minsky, Amherst, MA (US)

( * ) Notice: Subject to any disclaimer, the term of this patent is extended or adjusted under 35 U.S.C. 154(b) by 540 days.

(21) Appl. No.: 12/030,724

(22) Filed: Feb. 13, 2008

(65) Prior Publication Data
US 2009/0043674 A1    Feb. 12, 2009

Related U.S. Application Data

(60) Provisional application No. 60/889,661, filed on Feb. 13, 2007.

(51) Int. Cl.
*G06Q 30/00* (2006.01)

(52) U.S. Cl. ................ 705/27.1; 705/27.2

(58) Field of Classification Search ......... 705/26, 705/27, 27.1, 27.2
See application file for complete search history.

(56) References Cited

U.S. PATENT DOCUMENTS

| | | | |
|---|---|---|---|
| 6,515,656 B1 * | 2/2003 | Wittenburg et al. | 345/418 |
| 6,876,977 B1 * | 4/2005 | Marks | 705/26.62 |
| 6,901,379 B1 * | 5/2005 | Balter et al. | 705/27.2 |
| 7,133,839 B2 * | 11/2006 | Inoue et al. | 705/27 |
| 7,899,694 B1 * | 3/2011 | Marshall et al. | 705/7.11 |
| 2001/0047293 A1 * | 11/2001 | Waller et al. | 705/10 |
| 2002/0002513 A1 * | 1/2002 | Chiasson | 705/27 |
| 2003/0065562 A1 * | 4/2003 | Matsui et al. | 705/14 |
| 2006/0122895 A1 * | 6/2006 | Abraham et al. | 705/26 |
| 2007/0150368 A1 * | 6/2007 | Arora et al. | 705/26 |
| 2007/0234196 A1 * | 10/2007 | Nicol et al. | 715/501.1 |
| 2007/0271149 A1 * | 11/2007 | Siegel et al. | 705/26 |
| 2007/0271156 A1 * | 11/2007 | Sarusi et al. | 705/27 |
| 2008/0010319 A1 * | 1/2008 | Vonarburg et al. | 707/104.1 |
| 2008/0126020 A1 * | 5/2008 | Hoguet | 703/1 |

OTHER PUBLICATIONS

"Meaningful Presentation of Photo Libraries", Kustanowitz, Jack Joint Conference on Digital Libraries, Jun. 7-11, 2005.*

* cited by examiner

*Primary Examiner* — Yogesh C Garg
*Assistant Examiner* — Matthew Zimmerman
(74) *Attorney, Agent, or Firm* — Donald R. Boys; Central Coast Patent Agency, Inc.

(57) ABSTRACT

A shopping cart utility for e-commerce has a first workspace for retrieving and storing electronic catalog items; a second workspace for receiving specific ones or combinations of the catalog items; and a device display mechanism for displaying the items and associated item information in one of a thumbnail, collage, or list view. A user may reorder and reposition items in the collage view and wherein the first and second workspaces are functionally integrated.

1 Claim, 59 Drawing Sheets

SYSTEM FOR SEGMENTATION BY PRODUCT CATEGORY OF PRODUCT IMAGES WITHIN A SHOPPING CART

CROSS-REFERENCE TO RELATED APPLICATIONS

The present invention claims priority to a U.S. provisional patent application Ser. No. 60/889,661 entitled "SYSTEM AND METHOD FOR MANIPULATING ONLINE SHOPPING CARTS" filed on Feb. 13, 2007, disclosure of which is included herein in its entirety at least by reference.

BACKGROUND OF THE INVENTION

1. Field of the Invention

The present invention is in the field of e-commerce and pertains particularly to methods and apparatus for facilitating online shopping via a shopping cart facility.

2. Discussion of the State of the Art

Consumer online shopping is an increasingly important component of commerce. Online shopping is convenient for the consumer, who can shop from any merchant with an online presence and without commute time. It is convenient for the merchant, who can reach customers globally and interact with them without the routine presence of sales staff. Online retail locations ("web sites") on the world wide web serve the role that a physical or "bricks-and-mortar" store, or a mail-order catalog, have in the past.

An online shopping site conventionally combines a catalog display with a shopping cart. The catalog display presents the merchandise. The shopping cart represents items that the consumer has selected for purchase. Items are added to the shopping cart by selecting them from the catalog display. When the consumer "checks out" from the store, the shopping cart items are purchased.

In current online shopping sites, the shopping cart is represented as a list of items, conventionally ordered vertically. Each item is represented by a rectangle width the same width and height, and the position of items in the cart is set algorithmically by the system, not by the consumer.

When shopping in a physical store, the consumer can directly manipulate several items, in order to inspect their appearance in the aggregate, and use this to guide further selections from the store's stock. When shopping from a mail-order catalog, the consumer can clip pictures from the catalog pages to assemble a collage, and use this as a temporary shopping cart before copying the item names onto an order form or reading them to a telephone salesperson, for the same purpose.

The online representation of a shopping cart is adequate to the task of aggregating items for a purchase. It does not fulfill the additional roles of allowing the consumer to visually judge the appearance of an ensemble of items, and of letting the consumer use this appearance to guide further product selection.

Consumers are accustomed to seeing products arranged visually in two main ways—in the context of large scenes, or arranged separately but thematically on the page—in news, fashion, lifestyle, and other special interest magazines featuring new and useful products.

The use of a mail-order catalog as a source for clippings allows the consumer to replicate these styles of arrangement with a consumer's own selection of products. What is desirable is a set of methods and systems for combining the efficiency and potential for online collaboration of online shopping, with the graphic manipulation possibilities provided by mail-order catalogs.

More particularly, what is needed is a set of methods and systems that present an online shopping car as a set of spatial representations, and that enable a consumer to select products from an online catalog, and arrange images that represent products in this catalog in an online shopping cart in order to construct the representations that appear similar to the a physical collage constructed from a mail-order catalog, other image sources, and real world shopping experiences.

SUMMARY OF THE INVENTION

The problem stated above is that more interactivity and features for online shopping utilities are desirable, but many of the conventional means for facilitating e-commerce, such as virtual shopping carts, are rather fixed in features and limited to list views of shopping cart items. The inventors therefore considered functional elements of an e-commerce system for online shopping, looking for elements that exhibit flexibility and improve efficiency that could potentially be harnessed to provide an improved online shopping experience but in a manner that would not be limited.

Every e-commerce web storefront is propelled by a shopping cart utility, one by-product of which is much manual work a user must perform to register as a customer and purchase products using the standard shopping cart facility. Most such shopping carts employ list or text-based presentation of line items aggregated for purchase, and which require users to switch between web pages to view the aggregated items.

The present inventor realized in an inventive moment that if, during active shopping at an e-commerce site, a facility could be provided to enable a user to work in both catalog and shopping cart representations to view graphically the e-commerce items aggregated by associating the products to product images that may be placed in any order or spatial arrangement within the utility container, that much opportunity for new services would result. The inventor therefore constructed a unique e-commerce shopping facility for consumers that allowed consumers much flexibility to expand the shopping experience, while providing merchants with more ways to reach consumers.

Accordingly, a shopping cart utility for e-commerce is provided. The utility includes a first workspace for retrieving and storing electronic catalog items, a second workspace for receiving specific ones or combinations of the catalog items, and a device display mechanism for displaying the items and associated item information in one of a thumbnail, collage, or list view. A user may reorder and reposition items in the collage view and wherein the first and second workspaces are functionally integrated.

According to another embodiment of the present invention, a server node for serving electronic e-commerce items and item data based on requests from a server client is provided and includes an input port for receiving requests from the client, a processing core for handling requests received, and an output port for serving result data to the server client. The server client uses a representation of a shopping cart integrated with one or more product catalogs to facilitate requests to the server to add, edit, or remove e-commerce items and/or item data relative to a planned purchase event.

According to another embodiment of the present invention an automated system for consulting an online shopper is provided. The system includes a first server node accessible to the online shopper over the network, at least one data source accessible to the first server node, and a server client of the first server node for interacting with a portable shopping cart utility pre-filled by the system with items suggested for purchase based on consultation with data stored in the at least one data source in light of one or more rules. The system selects particular items for pre-fill of the portable shopping cart utility based on analysis of information relative to a user or owner of the portable shopping cart utility.

In one aspect of the invention, a method for creating a collage of e-commerce items from one or more electronic data sources is provided and includes the steps (a) providing a server client that may access indirectly or directly, the one or more data sources, (b) providing an information access and retrieval utility to run on the server client, (c) accessing the one or more data sources via the server client utility, (d) importing to or otherwise sending to the server client specific items from the one or more data sources, and (e) placing the selected items in a shopping cart utility downloaded to the server client.

According to another embodiment, a portable shopping utility for collecting electronic e-commerce items from more than one merchant store or catalog is provided. The portable shopping utility includes a first workspace interface to the merchant stores or catalogs, a second workspace interface integrated by at least a link to the first workspace interface, one or more user controls provided to one or both workspaces and/or e-commerce items collected therein, and a user action button for initiating mobility of the shopping facility between separate e-commerce pages or sites.

BRIEF DESCRIPTION OF THE DRAWING FIGURES

DETAILED DESCRIPTION

Figure 1:
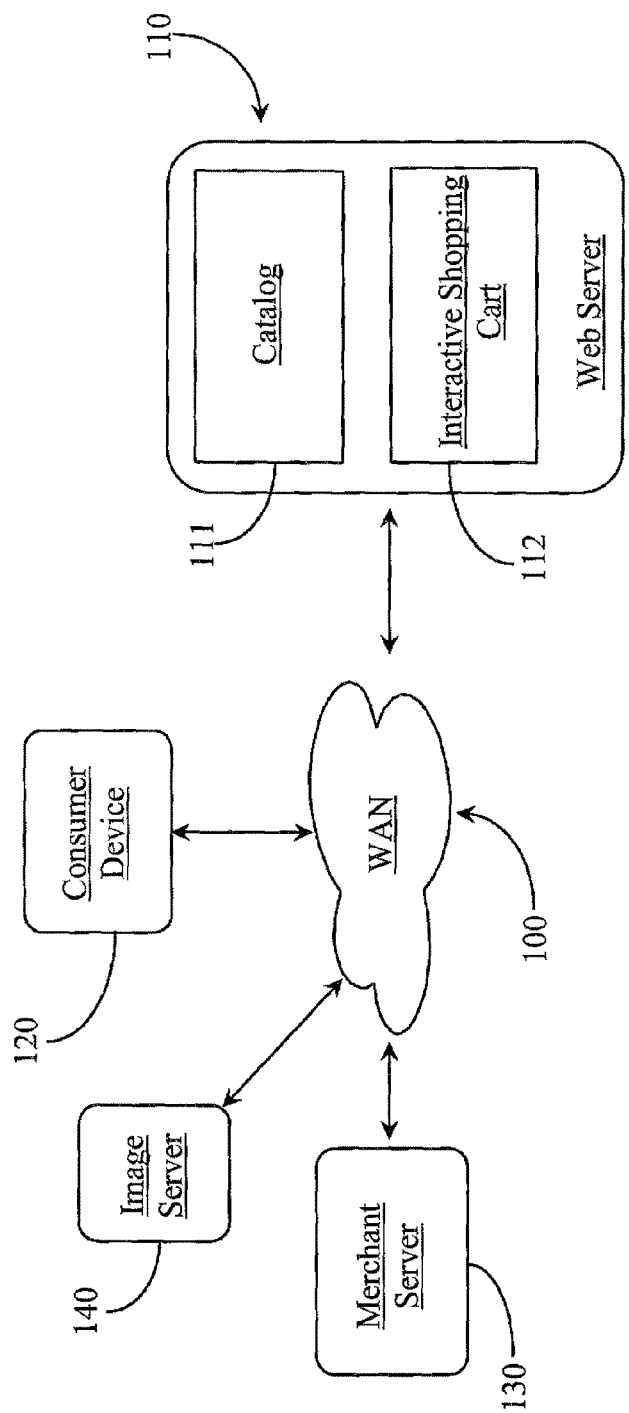
FIG. 1 is a block diagram illustrating basic network architecture for interacting with the shopping cart system of the present invention.

FIG. 1 is a block diagram illustrating basic network architecture for interacting with the shopping cart system of the present invention. The system includes a first E-commerce server 110 including a product catalog Web page 111 and an interactive shopping cart 112. Server 110 is accessible to one or more consumer devices 120 through a wide area network (WAN) 100, which may be the Internet network, more particularly, the World Wide Web (WWW).

A merchant server 130 is illustrated in the example and may be adapted to provide product information and images to catalog 111. There may also be zero or more third-party image servers (140) that may access server 110 via WAN 100, merchant servers 130, and to zero or more third-party image servers 140, across a wide area network (WAN) 100, such as the internet, or more particularly, the World Wide Web. Therefore, there is no geographic limitation to practicing the present invention.

Although in one embodiment the consumer device 120 is a personal computer, those of ordinary skill in the art will appreciate that the consumer device 120 could be a wireless device such as a PDA, a cellular telephone, or any other type of consumer device 120 capable of communicating with the web server 110. Moreover, those of ordinary skill in the art will recognize that while only one consumer device 120, one web server 110, and one merchant server 130 are depicted in FIG. 1, numerous consumer devices 120, web servers 110, and merchant servers 130 may be interconnected to operate in accordance with the present invention.

The inventor provided the interactive shopping cart 112 that can be interacted with by users in unique and novel ways that will be described in various embodiments. Shopping cart 112 may, in this example be integrated via linking to catalog 111 or to multiple catalogs.

Figure 2:
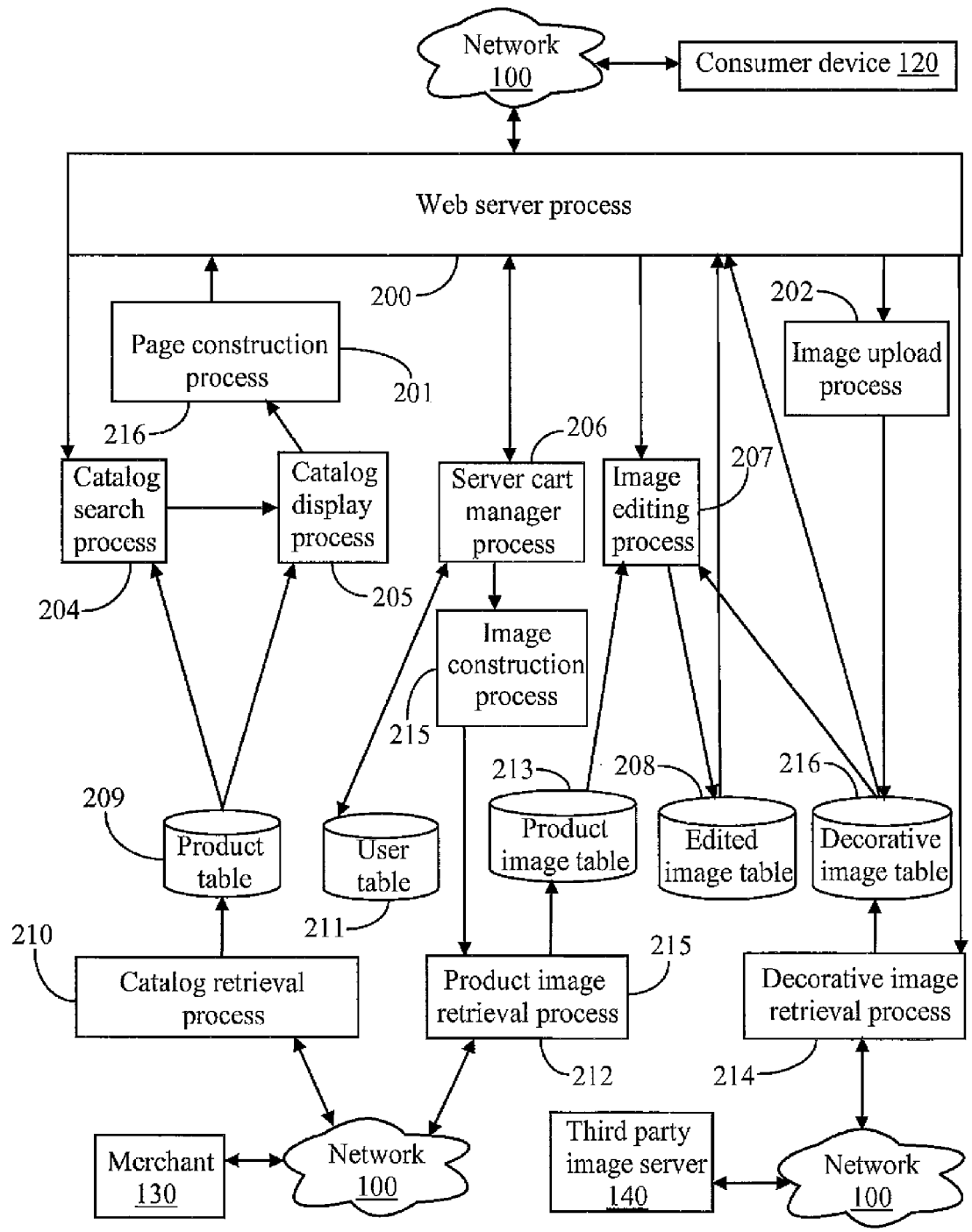
FIG. 2 is a block diagram illustrating server-side process according to an embodiment of the present invention.

FIG. 2 is a block diagram illustrating server-side process according to an embodiment of the present invention. For instance, any servers included in the web server 110 can be configured using the illustrated processing environment. Numerous other processing environments can be used as well, and the present invention is not intended to be limited to any one such embodiment. FIG. 2 is merely provided as one possible example. According to the embodiment depicted, the server analogous to server 110 illustrated above in FIG. 1 consists of a set of processes that run to serve pages and data to the consumer device 120 via network 100. While the consumer device 120 is running a browser, the web server 110 delivers content to the client.

Server 110 includes a Web server process 200. Server process 200 is part of the overall server system. In typical client server request and response protocol, it receives requests from the consumer device, and routes them to other server-side processes depending upon the nature of the request. In response, it sends HTML, text, machine-readable message, and image data from other processes to the consumer device.

Web server process 200 utilizes a web page construction process 201. Page construction process 201 constructs HTML representations of pages, which include either representations of the shopping cart, the product catalog or a version integrating both.

Although in the present embodiment, the server (110) constructs HTML pages and sends these to the consumer device, those of ordinary skill in the art will appreciate that the server could construct machine-readable representations of data which could be processed and rendered on the consumer device by another display technology, such as Flash, Java, or WPF. Those of ordinary skill the art will also appreciate that some of the processes that in the present embodiment are performed within the server could be performed by software modules which are downloaded to or natively present on the consumer device.

In this example, product information and standard product images may be displayed in a catalog like catalog 111 described above. Therefore, a catalog display process 205 is provided. Process 205 constructs the portion of the display that presents a page of the product catalog. This page contains a representation either of a page of a category, a range of search results, or information about a single product.

A catalog search process 204 is provided as an interactive feature of the catalog. Process 204 may process a search query, construct a list of search results, and direct the catalog display process to display a range of search results, or a single catalog page. Both the catalog display process 205 and the catalog search process 204 are supported by a product data table 209. Product database 209 contains product category and detailed product information.

A catalog retrieval process 210 is provided that populates the catalog product database directly or indirectly via merchant feeds. The merchant feeds may be requested or pushed in some embodiments. New data arrives over network 100, for example from merchant 130.

A server cart manager process 206 is provided to interact with the Web server process to respond to requests for the contents of a user's shopping cart. The cart manager process 206 also processes network messages that client software sends when the user initiates commands that operate upon the interface or representation of the shopping cart on the client device. Such commands will be discussed further below.

A product image retrieval process or simply, image retrieval process 215 is provided and adapted to retrieve product images from feed suppliers, and to cache images received in a product image database or product image table 213. An image construction process 215 is provided and is adapted to automatically construct images with transparent backgrounds from the merchant-provided images using a unique transparency trimming mechanism described later in this specification.

An image editing process 207 is provided and is adapted for processing messages resulting from user interactions with the client to further refine product images. Both these categories of created images—automatically constructed, and user edited—are stored in an edited image database or table 208. In one embodiment, only the sequence of operations used to create and edit images are stored in the edited image database. This technique can be used to comply with merchant terms of service that restrict the period of time that a product image can be stored.

A decorative image process is provided and is adapted to store non-product images that can be used as collage backgrounds, or as decorative elements within a collage. An image upload process is provided and is adapted to upload images that are uploaded from the consumer device, or that are stored on other sites that the user and/or the server have access to. The uploaded images may include decorative images, word art, advertising, and images persona to the user such as images or avatars representing a likeness of the user. In one embodiment, images may be extended to include image animation files and short video clips.

One with skill in the art will appreciate that the server-side function is not limited strictly to the aggregation of processes described in this example. Other processes may be added depending on intended new features attributed to the interactive shopping cart of the present invention.

Figure 3:
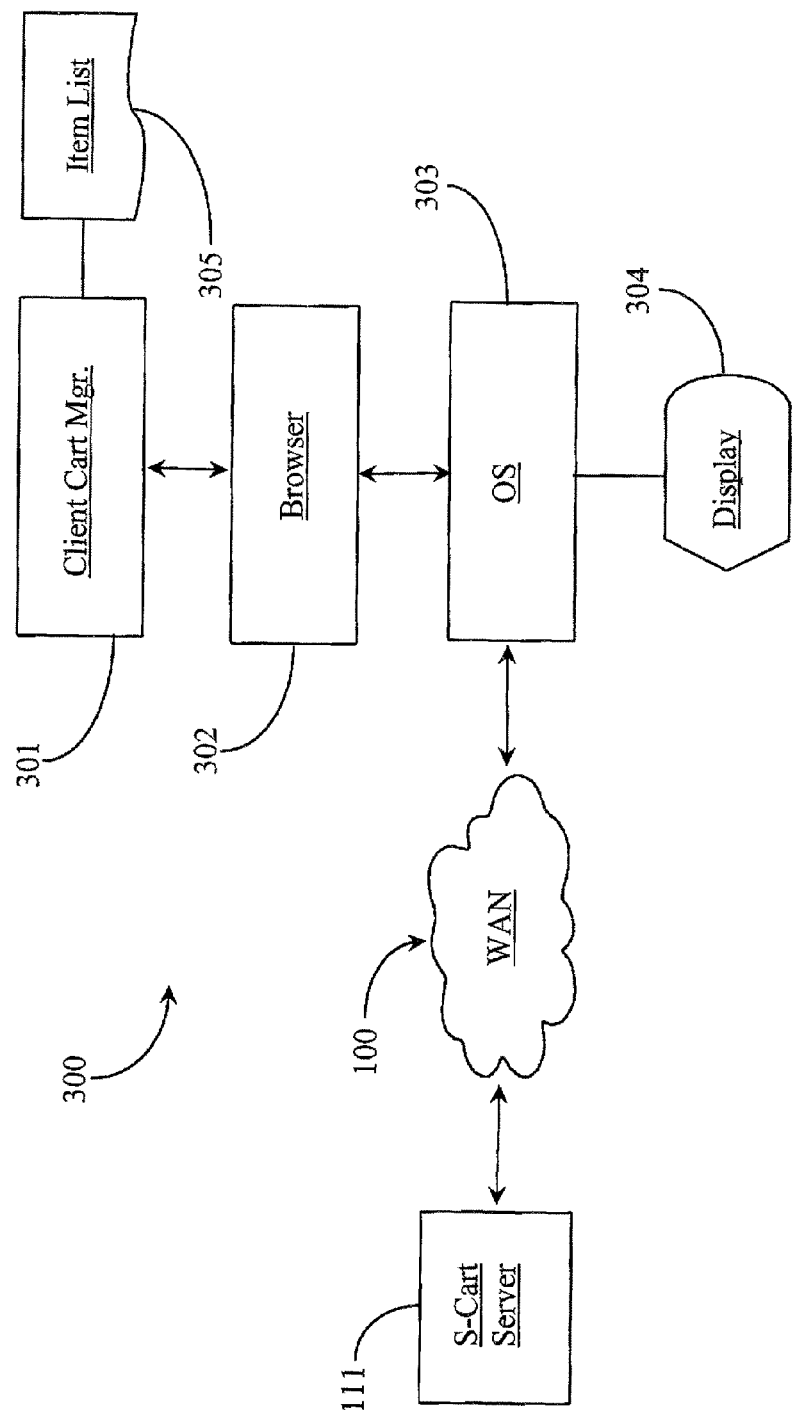
FIG. 3 is a block diagram of the client architecture 300 according to an embodiment of the present invention.

FIG. 3 is a block diagram of the client architecture 300 according to an embodiment of the present invention. Architecture 300 represents in part the software running on a consumer device analogous to device 120 described above. Architecture 300 includes an operating system 303, a browser application 302 enhanced with a collage viewer (not illustrated).

A client-side cart manager 301 is illustrated and may include the collage viewer described above. operating system 303 (OS) is responsible for communicating with the network 100, and for displaying images on a device screen or display illustrated herein as display 304. OS is also responsible for receiving events from input devices that are connected to the consumer device. The invention supports all operating systems including known examples such as Windows XP, Windows Vista, and Mac OS X.

Browser 302 represents any application program that uses the operating system to send HTTP requests to web servers and to interpret HTTP responses; to render images and HTML documents; and to execute JavaScript programs that are downloaded from web servers. Examples of supported browser applications include Mozilla Firefox, Apple Safari, and Microsoft Internet Explorer.

Figure 4:
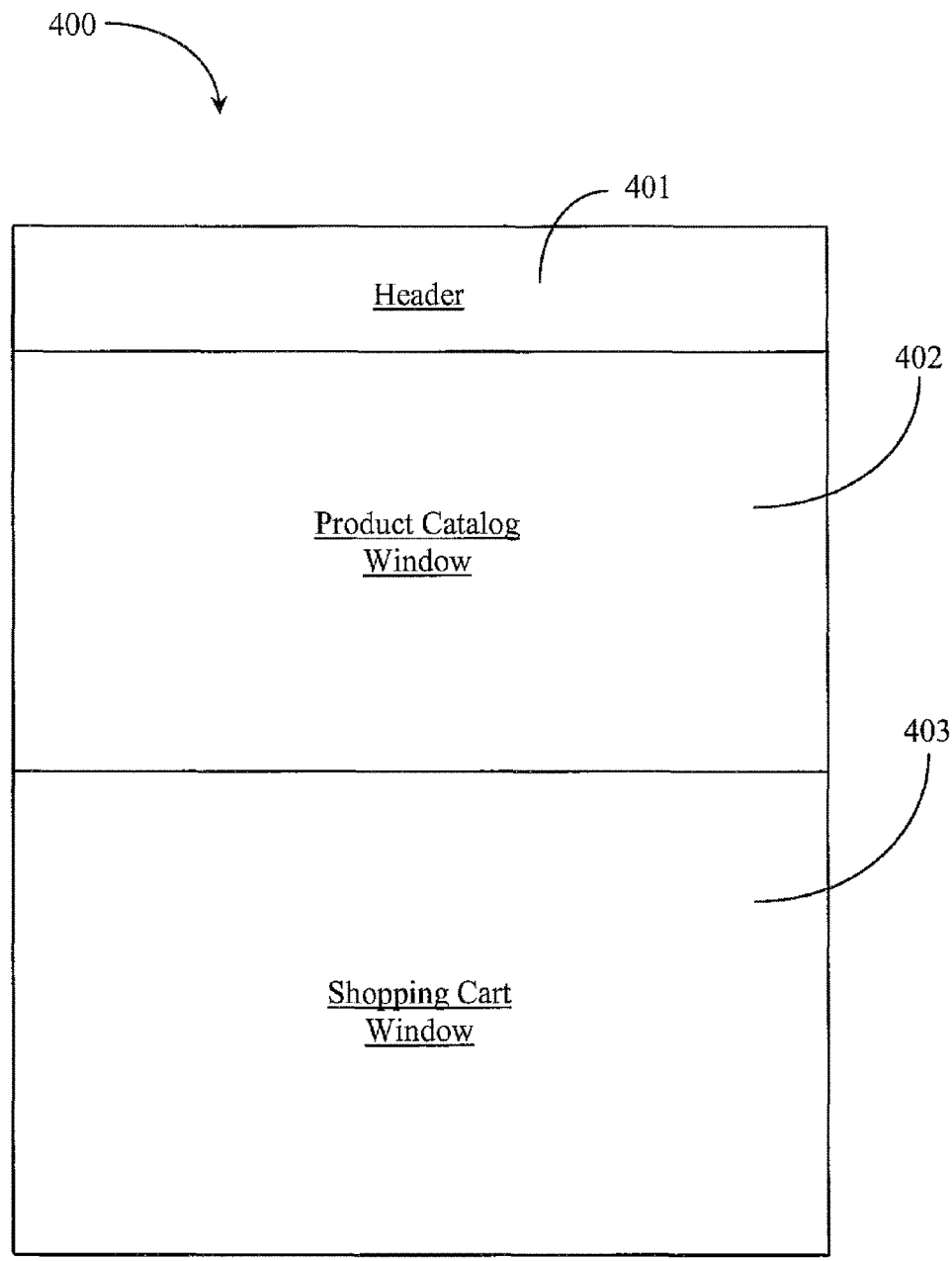
FIG. 4 is a block diagram of an exemplary screen of a consumer device illustrating spatial arrangement of a catalog relative to the interactive shopping cart of the present invention.

The collage viewer described above is a software component that is downloaded from shopping cart server 111 to the consumer device, and may be executed by browser 302. The collage viewer, which may be part of the client cart manager (client instance) is responsible for directing browser 302 to display the items in the user's interactive shopping cart, and for interpreting user interaction gestures as commands that result in requests to the shopping cart server. The view in the interactive client shopping cart can be an image view or a list view. A user may toggle back and forth between these views or use a combination of views within one shopping cart window. The spatial arrangement in FIG. 4 is just one possible division of space between the product catalog and the shopping cart. Other possibilities are enumerated in FIG. 5 and FIG. 6.

The header region displays branding information, product catalog information, user account information, and navigational elements. The product catalog region displays departments, categories, and products from the product catalog. The shopping cart region displays the content of the shopping cart.

Block diagram of an exemplary screen 400 of a consumer device illustrating a spatial arrangement of a catalog relative to the interactive shopping cart of the present invention.

Figure 5:
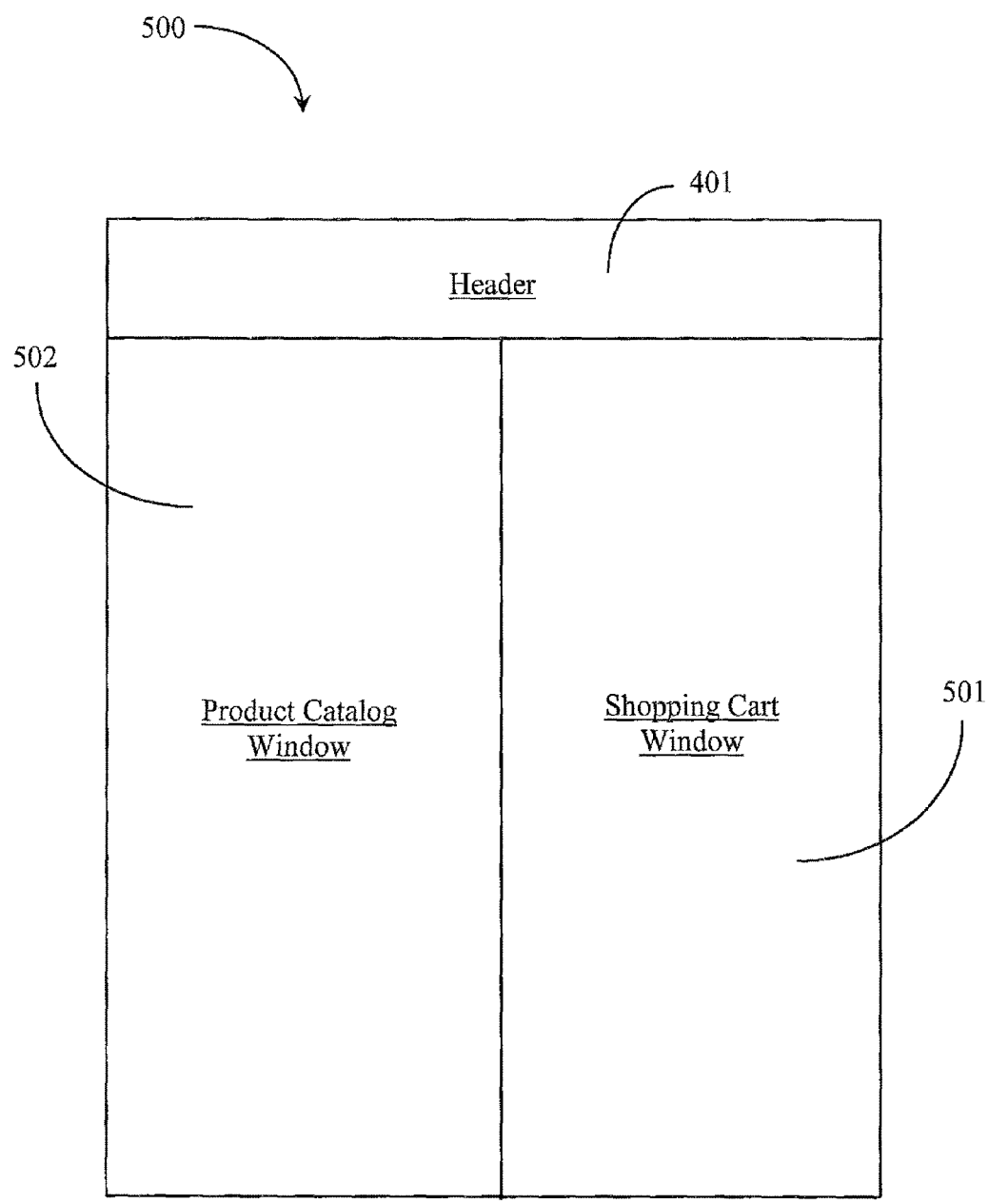
FIG. 5 is a block diagram of an exemplary screen of a consumer device illustrating another spatial arrangement of a catalog relative to an interactive shopping cart of the present invention.

FIG. 5 is a block diagram of an exemplary screen 500 of a consumer device illustrating another spatial arrangement of a catalog relative to an interactive shopping cart of the present invention.

Figure 6A:
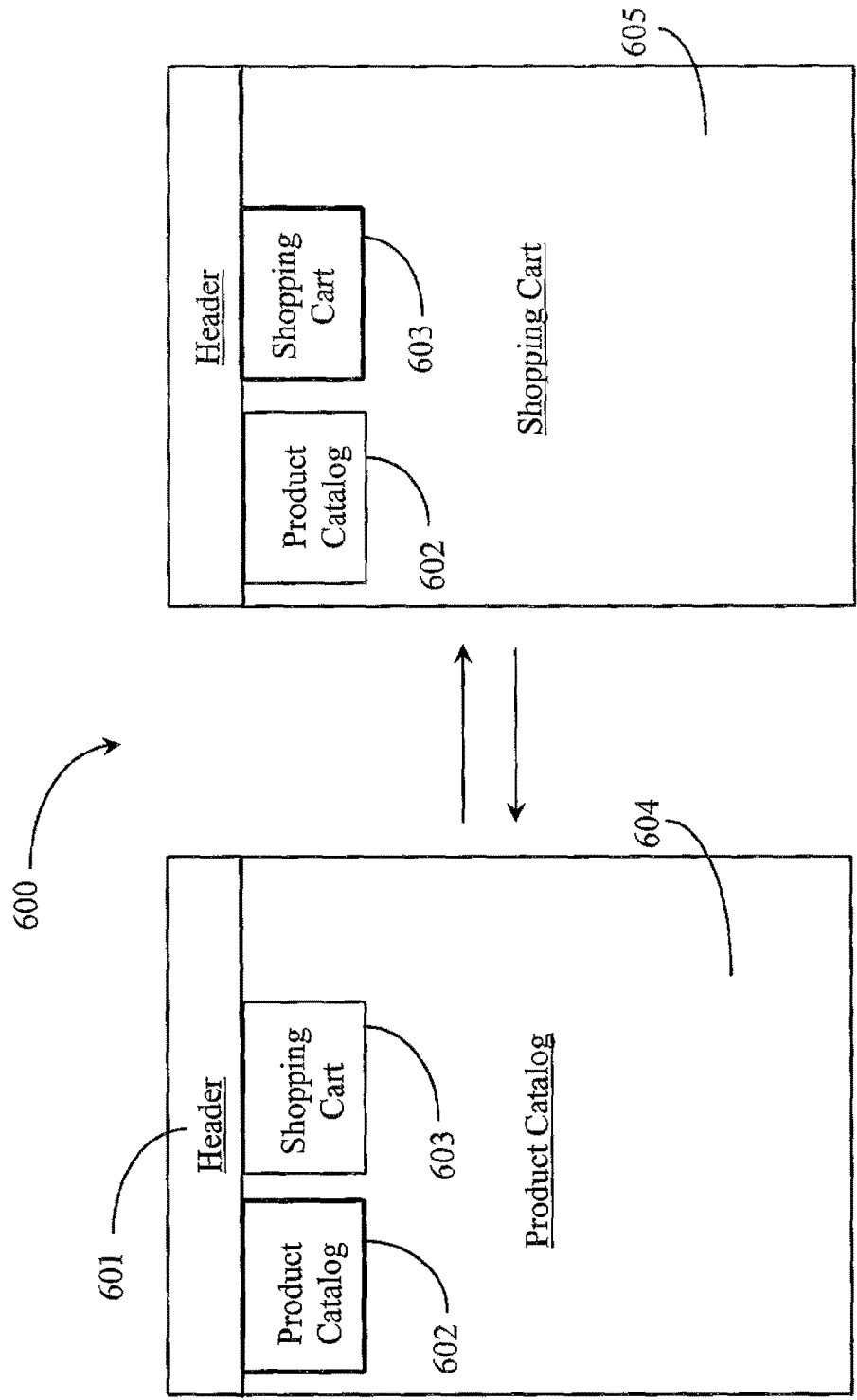
FIG. 6A is a block diagram of an exemplary screen of a consumer device illustrating another spatial arrangement of a catalog relative to an interactive shopping cart of the present invention.
Figure 6B:
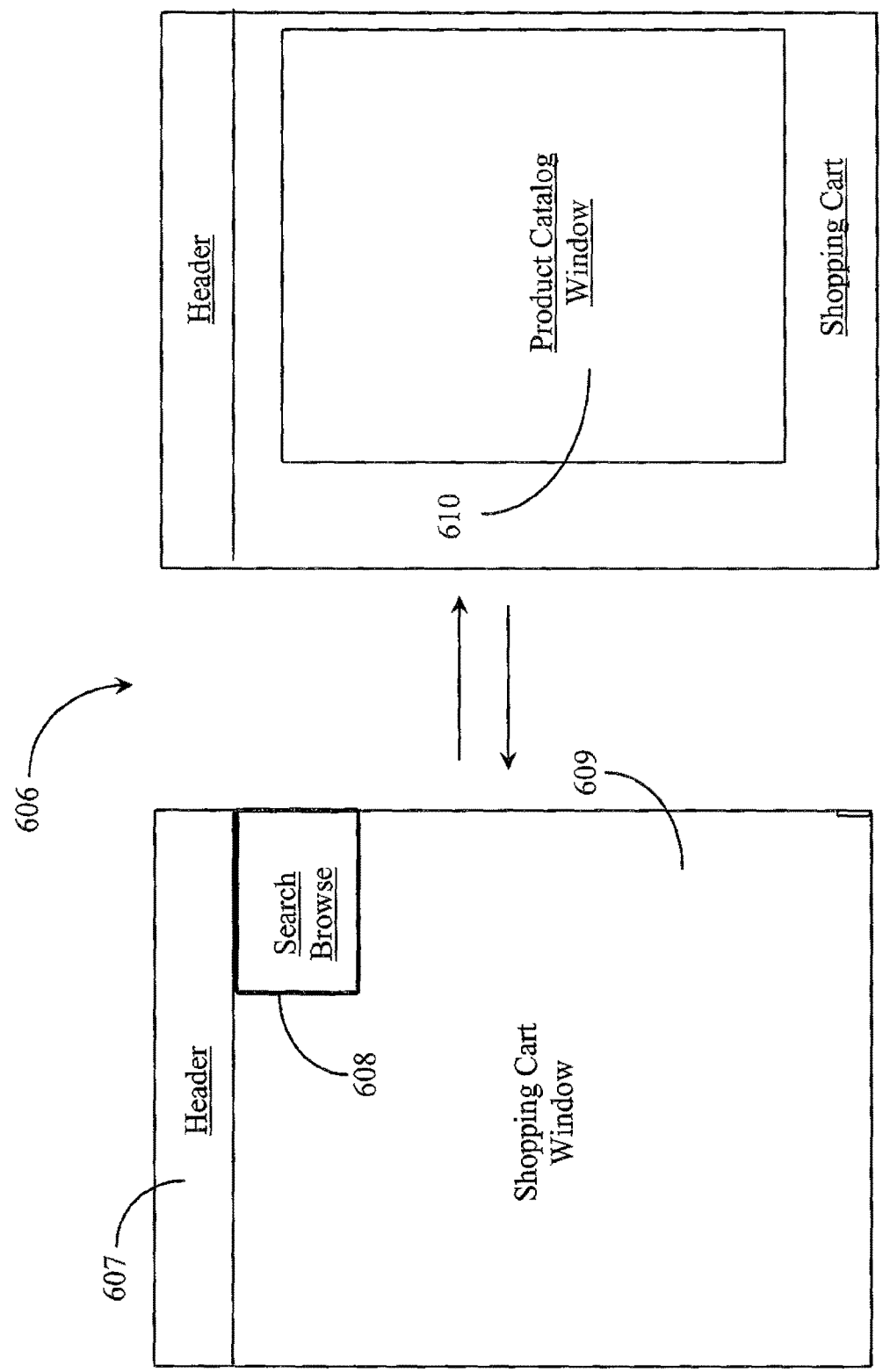
FIG. 6B is a block diagram of an exemplary screen of a consumer device illustrating another spatial arrangement of a catalog relative to an interactive shopping cart of the present invention.

FIGS. 6A-B are block diagrams of an exemplary screen 600 of a consumer device illustrating yet other spatial arrangements of a catalog relative to an interactive shopping cart of the present invention.

Referring now to FIG. 4, screen 400 represents an interactive screen for invoking a product catalog window 402 and an interactive shopping cart window 403. Screen 400 includes a standard header 401 across the top that may contain controls and other browser related options. The header region 401 displays branding information, product catalog information, and user account information, and navigational elements. In this example, the product catalog window 402 appears on top and the shopping cart window 403 appears on the bottom. The product catalog region displays departments, categories, and products from one or more product catalogs. The shopping cart region displays products in the shopping cart. The spatial arrangement in FIG. 4 is just one possible division of space between the product catalog and the shopping cart that may be caused to appear in screen 400. Other possibilities are enumerated in FIG. 5, 6A and 6B.

Referring now to FIG. 5, a screen 500 of a consumer device interacting with the shopping cart server displays header 401 as before, but the division of the catalog display 502 and the shopping cart window 501 is vertical. Like in FIG. 4 a user may interact with both utilities from the same window.

Referring now to FIG. 6A, a consumer device screen 600 includes a typical header 601, which is analogous to header 401. In this case, a product catalog display tab 602 is provided for displaying the product catalog in workspace window 604.

Alternatively, a shopping cart display tab 603 is provided to display the shopping cart in workspace window 605. Either one of the tabs may be invoked to create the associated display.

Referring now to FIG. 6B, a screen 606 illustrates a typical header 607 analogous to header 401 and a search/browse control 608 that is adapted to enable a user to search catalogs and, in some cases shopping carts and select the desired utilities for display. In this case, a shopping cart may be a default display and control 608 in the display may be invoked to select from a variety of catalogs for display such as in an embodiment where multiple merchants are providing products available through one checkout. Product catalog window 610 is illustrated in display as a window in window within the shopping cart.

Other unique displays may be created including displaying multiple catalogs within a shopping cart, displaying more than one shopping cart in the workspace such as a main cart and "sub-carts", or displaying partial information blocks containing catalog search results narrowed down by search query. There are many possibilities.

Figure 7:
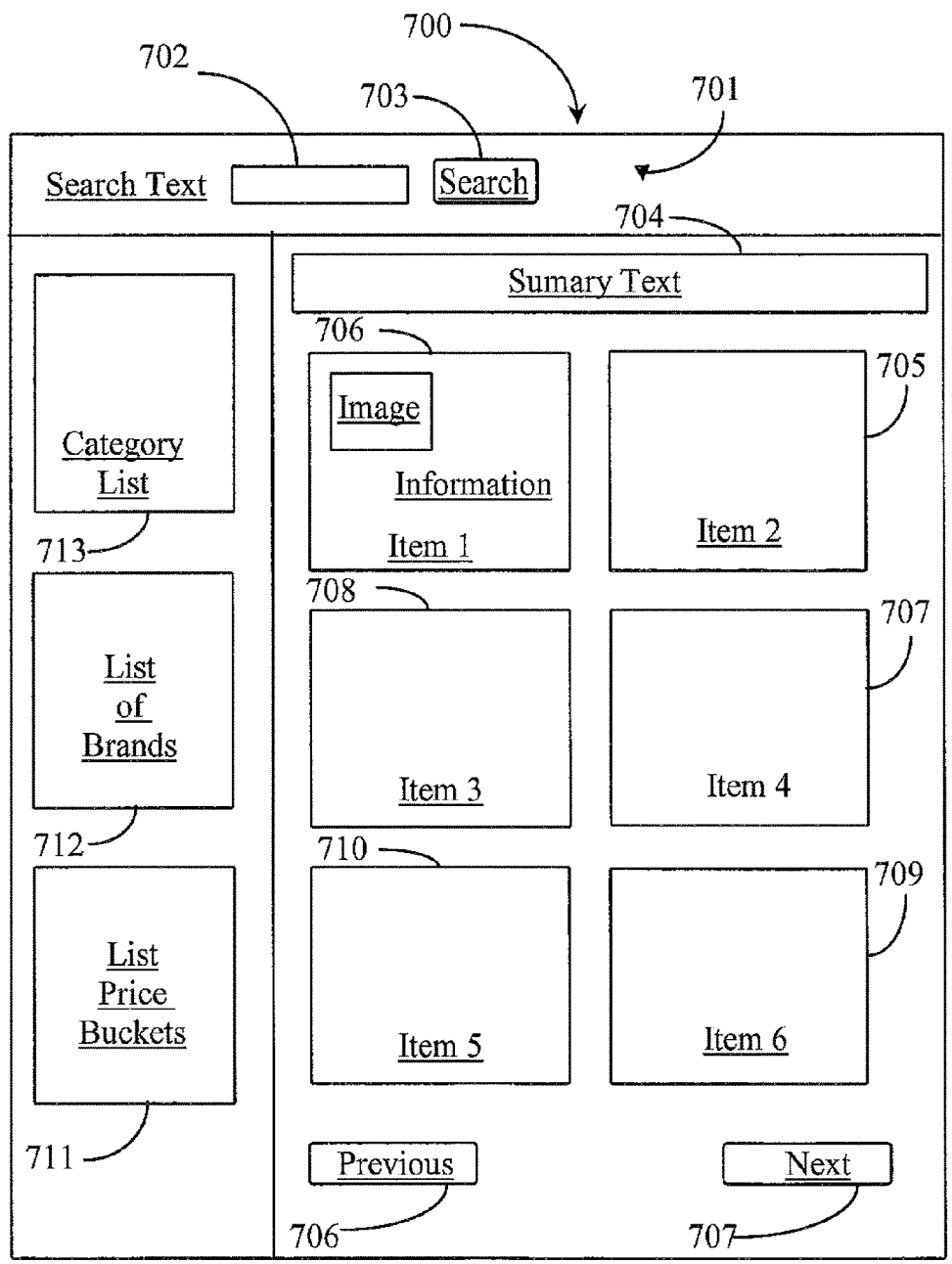
FIG. 7 is a block diagram illustrating a product catalog display window according to an embodiment of the invention.

FIG. 7 is a block diagram illustrating a product catalog display window according to an embodiment of the invention. In one embodiment, a product catalog display 700 includes a header 701 containing search controls, a text field for entering keywords or tags and a search button for invoking a sear of the product catalog.

In this example the display has a side bar containing a category list of products 713, a list 712 of the brands included in the catalog and a list of price buckets 711. Other user elements may be provided to enable a user to search within the catalog displaying search results or "catalog items" in the main window by various orders.

In the display window, a summary block 704 may appear that includes summary text of the items displayed in the main window as a result of a search. In the main window items 705-710 are displayed. Items may be displayed in the fashion of item 1 with a thumbnail image, product information and pricing. The items may be interactive and may include other features such as add buttons, search related items button, or a user may be able to open any item to learn more about the item. More information may be gleaned about an item via mouse over, double clicking the item.

At the bottom of the main window there are navigation buttons Previous 706 and Next 707 to navigate to the previous or next group of items. Scrolling within the window may also be available.

Figure 8:
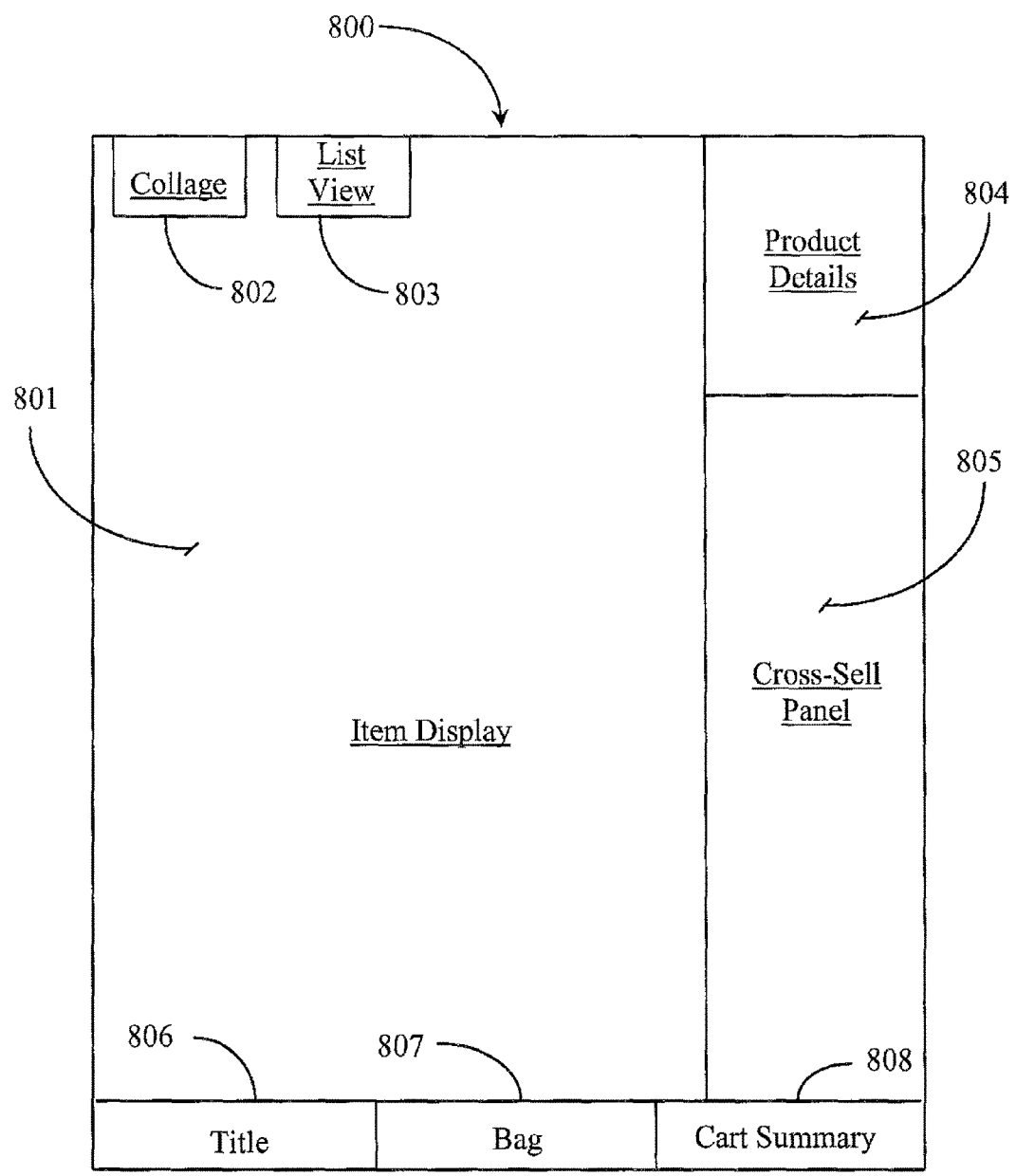
FIG. 8 is a block diagram illustrating a shopping cart according to an embodiment of the resent invention.

FIG. 8 is a block diagram illustrating a shopping cart display window 800 according to an embodiment of the present invention. Screen 800 has an item display window 801 for displaying catalog items placed in the shopping cart. A user can display a list of items, as in a conventional online shopping cart, or a collage of items, in which the items are arranged in space. A collage view tab is provided for displaying a collage view of items. A list view tab is provided for displaying a normal list view of items. As described above, item display region 801 displays a visual representation of the contents of the shopping cart.

There are many possible interactive features that are provided to manipulate items from within the shopping cart. A cross sell panel 805 is provided to display product recommendations based upon the shopping cart contents and other factors including purchase history, demographics and so on. A product details window 804 displays additional information about a selected item. A user may select an item within a list or a collage displayed in window 801 and the appropriate item details may appear automatically in window 804.

A title region 806 is provided for displaying a title of a collage of product items placed into the shopping cart. Title region 806 contains user interface elements (not illustrated) that allow the user to switch between multiple collages, and to create a collage.

A "bag" region 807 is provided and is adapted to display a representation of products that have been especially categorized. One example might be that of items that would be carried in a handbag. Bagging of items might be performed within the product catalog database or bags may be created by users working within the catalog.

Figure 9:
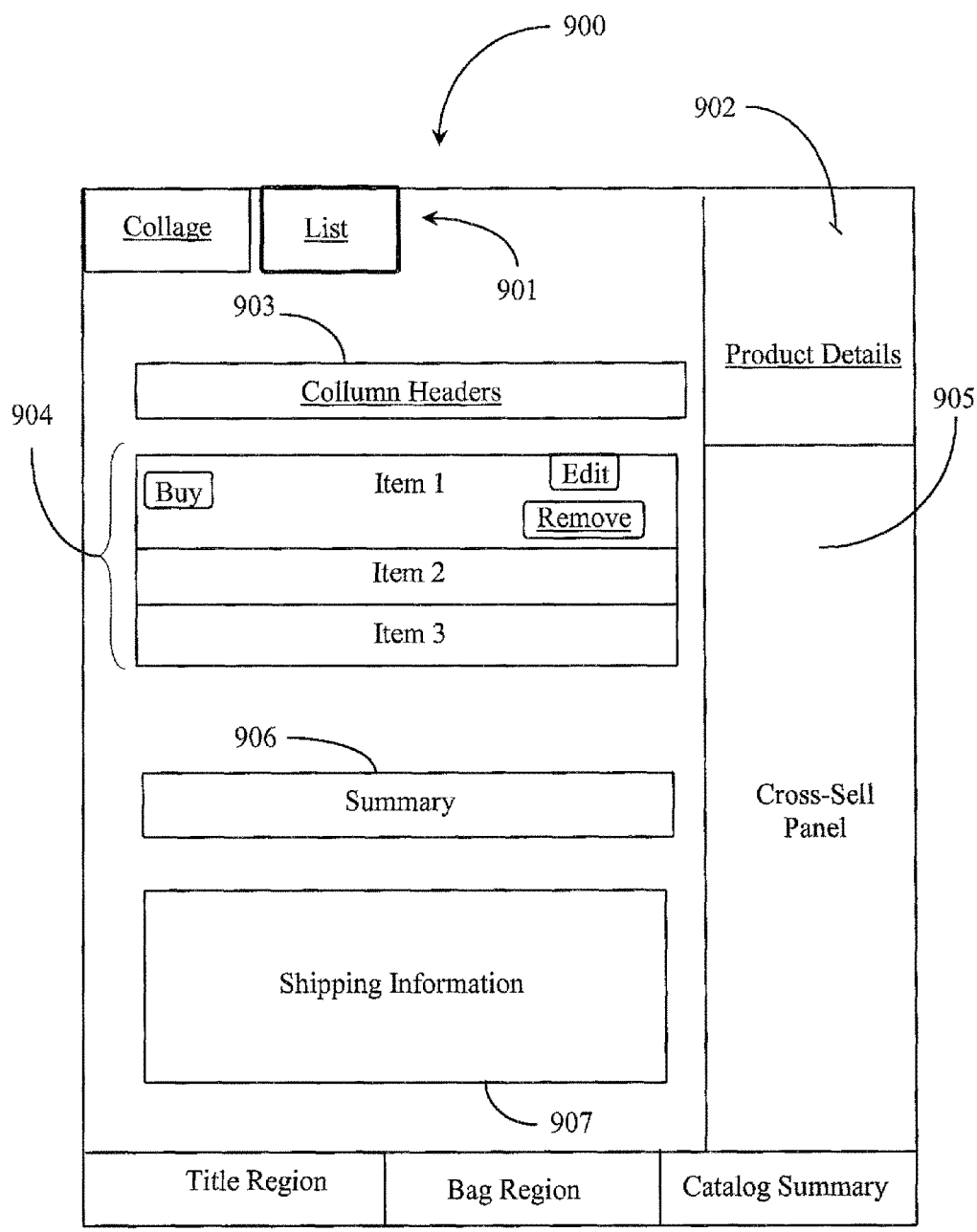
FIG. 9 is a block diagram illustrating an optional "list view" of an interactive shopping cart display according to an embodiment of the present invention.

FIG. 9 is a block diagram illustrating a "list view" 900 of an interactive shopping cart display according to an embodiment of the present invention. Screen 900 is displaying a list view of products. The List Tab in user elements 901 may be selected to invoke a list view of a shopping cart as opposed to a collage view. Both the list and collage views include the title, bag and catalog summary regions. Furthermore, a cross sell region 905 and a product detail window 902 are provided similarly to the example of the collage view. A thumbnail image of the product may accompany each line item of a list view.

In this example, there are three line items listed and illustrated as a list or group 904. Each line item may include the item SKU (e.g., size and color). The current item pricing and per-item shipping costs can be displayed. In one embodiment, the merchant is identified in each line item represented as text. A user interface control may be provided that displays whether this item will be included in the final order or held in the cart without tallying the particular pricing of the item. In one embodiment, a user interface control is provided that allows a user to edit the SKU of an item resulting in a search for availability of an item complying with the edited SKU. Items can be marked for hold, removed, reordered in a list, or grouped together in sub-lists. In one embodiment a collage of items may be represented in list view as a metadata object that can be opened to view the items in a collage view. There are many possibilities.

Figure 10A:
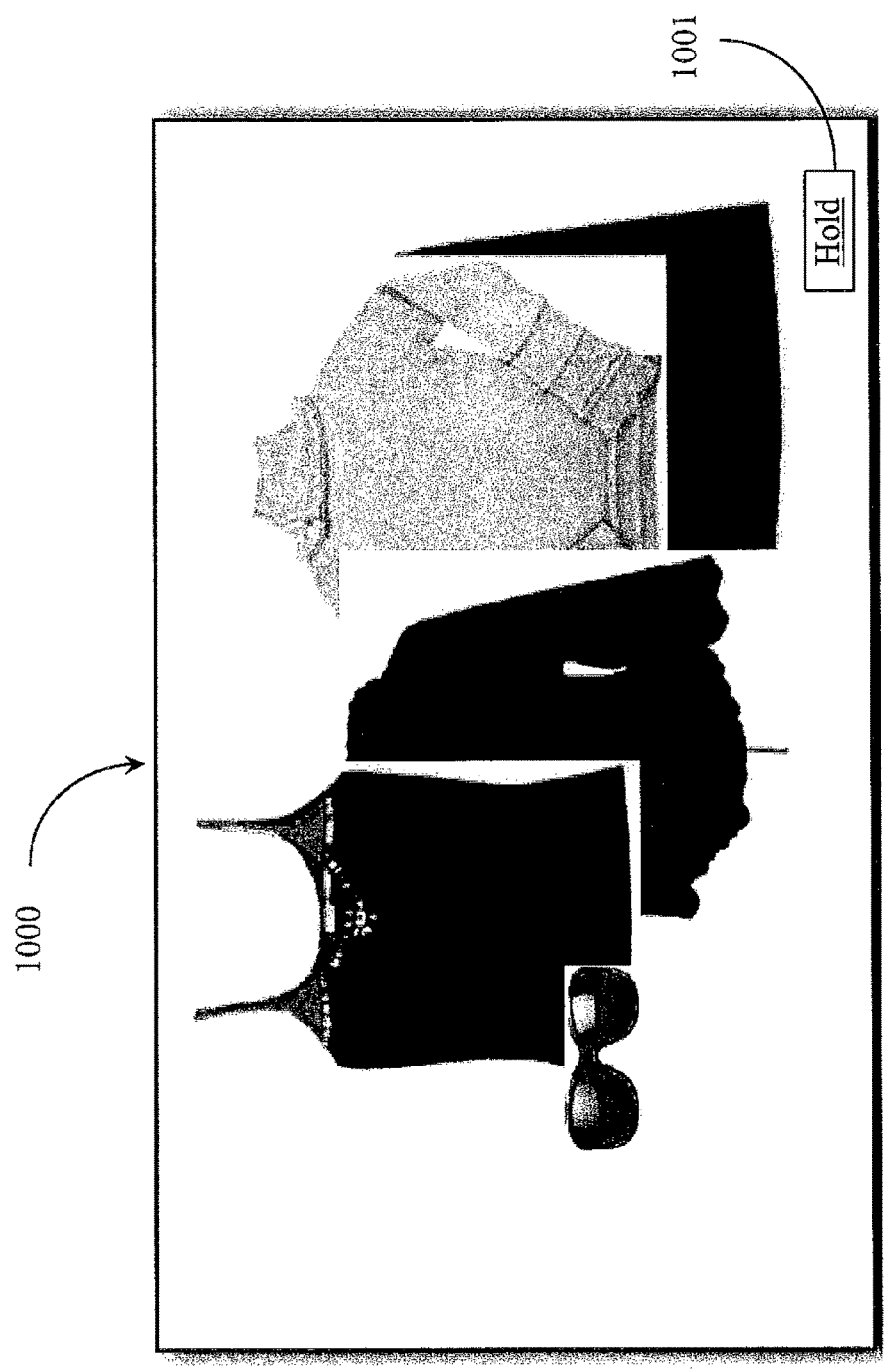
FIG. 10A is a block diagram illustrating a collage view of items in the shopping cart without transparency.

FIG. 10A is a block diagram illustrating a collage view 1000 of items in the shopping cart without transparency. View 1000 displays images that represent products, as well as background images, and decorative elements, (not illustrated) as defined further in the document. Background images may include backdrops that contain images of furniture, walls, a closet, a bed or other objects. Shopping cart collages may be created according to a theme based on inclusion of background images.

A shopping cart is divided into one or more collages. In the present embodiment, only one collage is shown at a time, and the terms "collage" and "shopping cart page" are used interchangeably. A user may select any item in the collage and activate a hold button 1001 that will mark the item selected for hold. All of the items marked for "hold" are not by default included in the checkout process. In one embodiment, items may be marked for "hold on payment". In this case, any such items are held in a special layaway or like account after checkout until payments on the items are completed at which time they may be shipped.

It is important to the utility of the system that product images have transparent backgrounds. It is noted herein that the items visible in collage view 1000 are laid over one another and those images on top have solid color rectangular boundaries that obstruct the visibility of underlying items. Images obscure each other in an artificial way, leaving less room for image display. Product images supplied by merchants generally do not include transparency. The system therefore needs to transform them into transparent images for use in the shopping cart interface. The inventor therefore provides a unique mechanism for automatically transforming the stock solid borders of an image into transparent background borders. An image may be transformed the first time that it is used in a shopping cart. In one embodiment, the mechanism may also be provided as a manual control.

The automated mechanism may be used as a filter to analyze all incoming images from merchants for edge semantics where the color of the image edge gives way to white or other color pixels. The area judged to be the border or solid image background is then selected for "no background color" or "none" with regard to background color as is the case with some imaging applications. A slider bar may be provided as an image editing tool to enable a user to adjust the transparency of the image background, which is typically white.

Figure 10B:
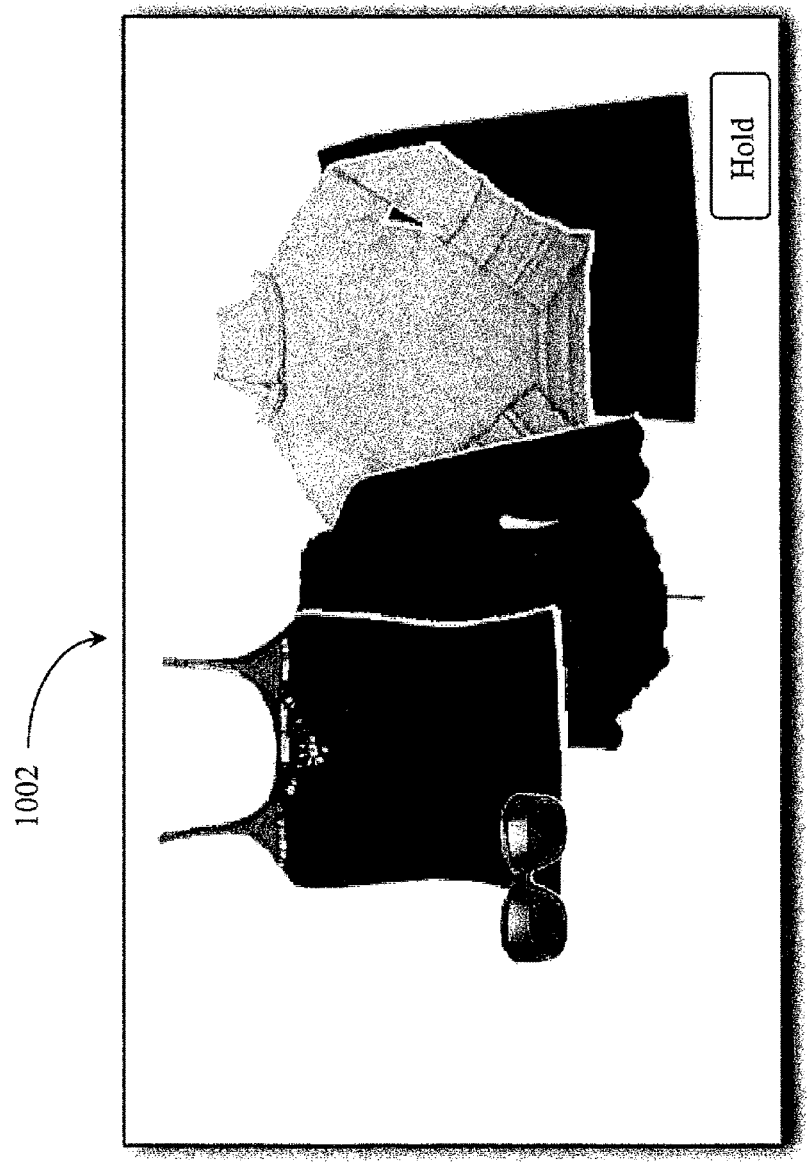
FIG. 10B is a block diagram of a collage view of items in the shopping cart with transparency activated.

FIG. 10B is a block diagram of a collage view 1002 of items in the shopping cart with transparency activated. In view 1002, the images have transparent border regions. Therefore, they can be placed in a collage overlapping each other without obstructing the view of the underlying items. The enables more space to be utilized in the shopping cart window for creating collages of items.

Figure 11A:
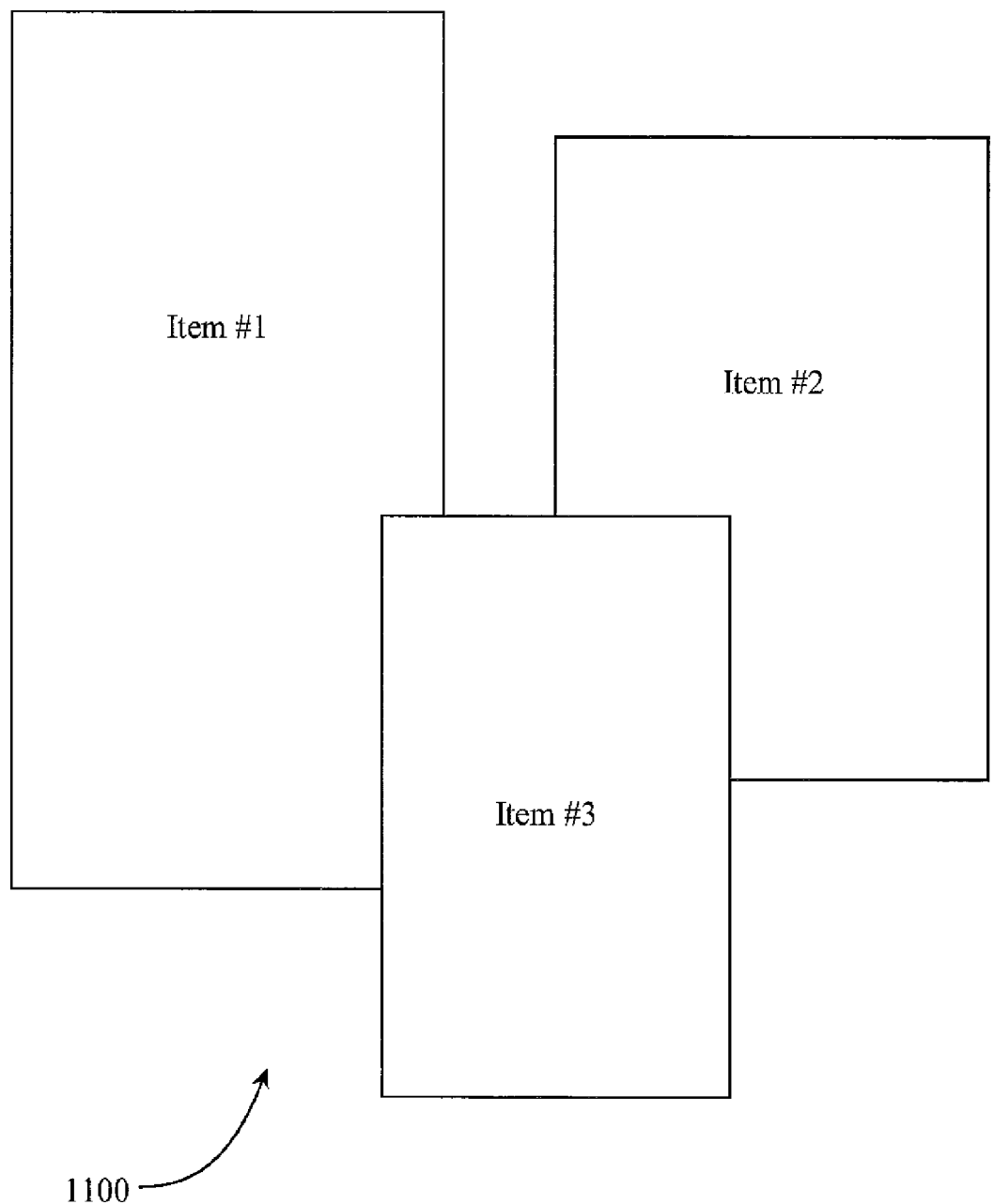
FIG. 11A is a block diagram illustrating collage items with control strips not visible due to lack of mouse over.
Figure 11B:
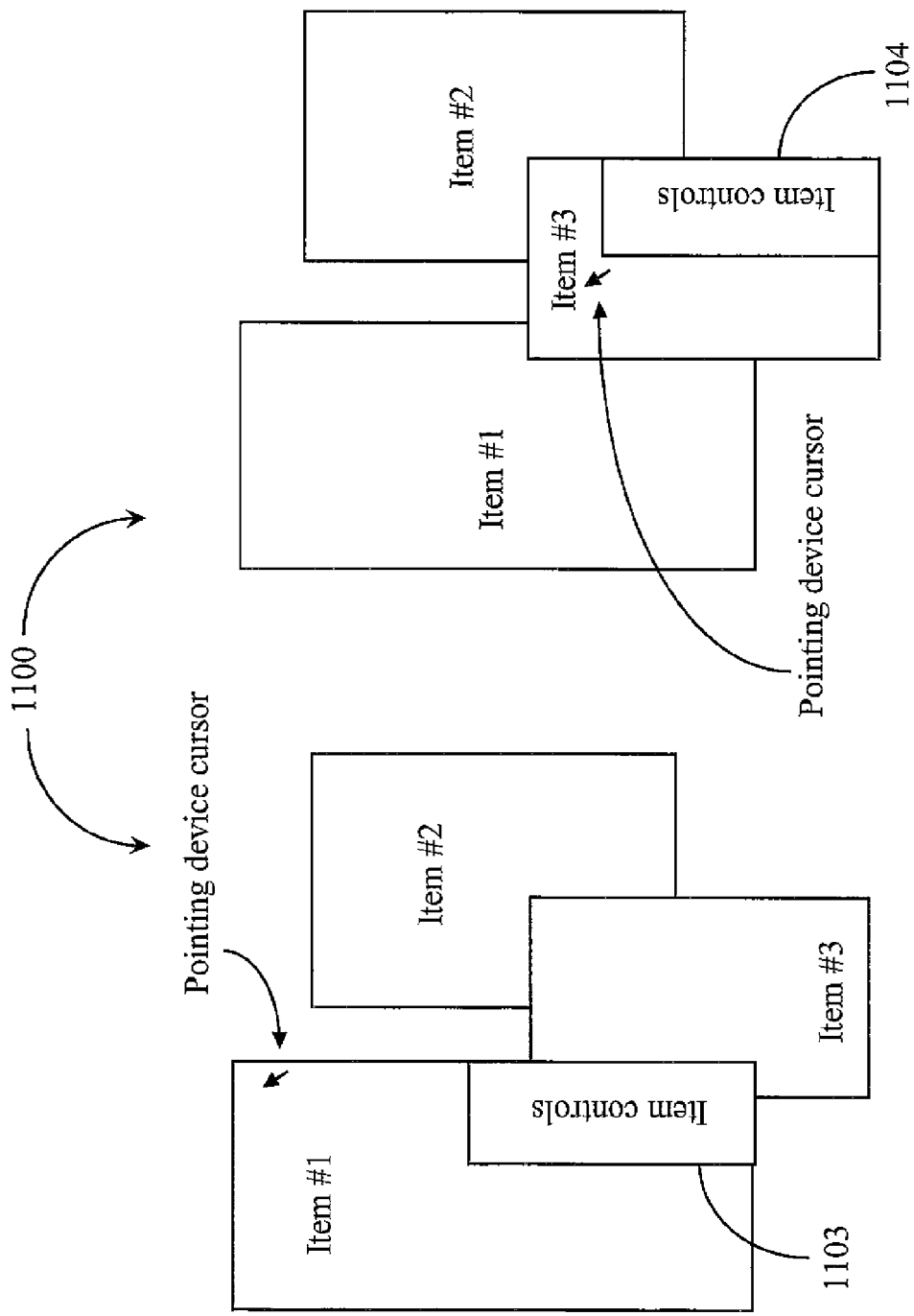
FIG. 11B is a block diagram illustrating the same collage items being moused over to illuminate the item control strip.

FIG. 11A is a block diagram illustrating collage items 1100 with control strips not visible due to lack of mouse over. FIG. 11B is a block diagram illustrating the same collage items 1100 being moused over to illuminate the item control strip. Referring now to FIG. 11A, collage items 1100 include items numbered one, two and three. Each of these items includes an associated control strip that comprises an array of user controls for manipulating the item such as controlling display aspects of the drawing or for learning more about the item. In this case, the control strips are hidden until they are moused over as illustrated below.

Referring now to FIG. 11B, the same items 1100 are now illustrated in two groups of the same items. On the left, a control strip 1103 appears when a user mouses over a specific area of an item, in this case, item one in the group. The control strip includes the user controls for manipulating the item as described above.

On the right, the user is mousing over item three. In general, when the mouse is moved over the bounding box of the image of an item in the collage view, the item is focused. A control strip, containing a set of user interface elements, is displayed alongside the focused item r within the boundaries of the item. When the mouse is moved out of the item's bounding box, or into the bounding box of an item that obscured (is placed in front of) the first item, the first item is defocused, and its control strip is removed from the display, but the second item is then focused and the control strip for that item becomes visible.

In an alternate embodiment, the hover controls (user interface elements) are displayed when the mouse is over an opaque portion of the image, rather than anywhere within the image bounding box. It is note herein that an image of a collage item may be, by default, smaller than the minimum size required to encompass the user interface elements in the control strip described above.

Figure 12:
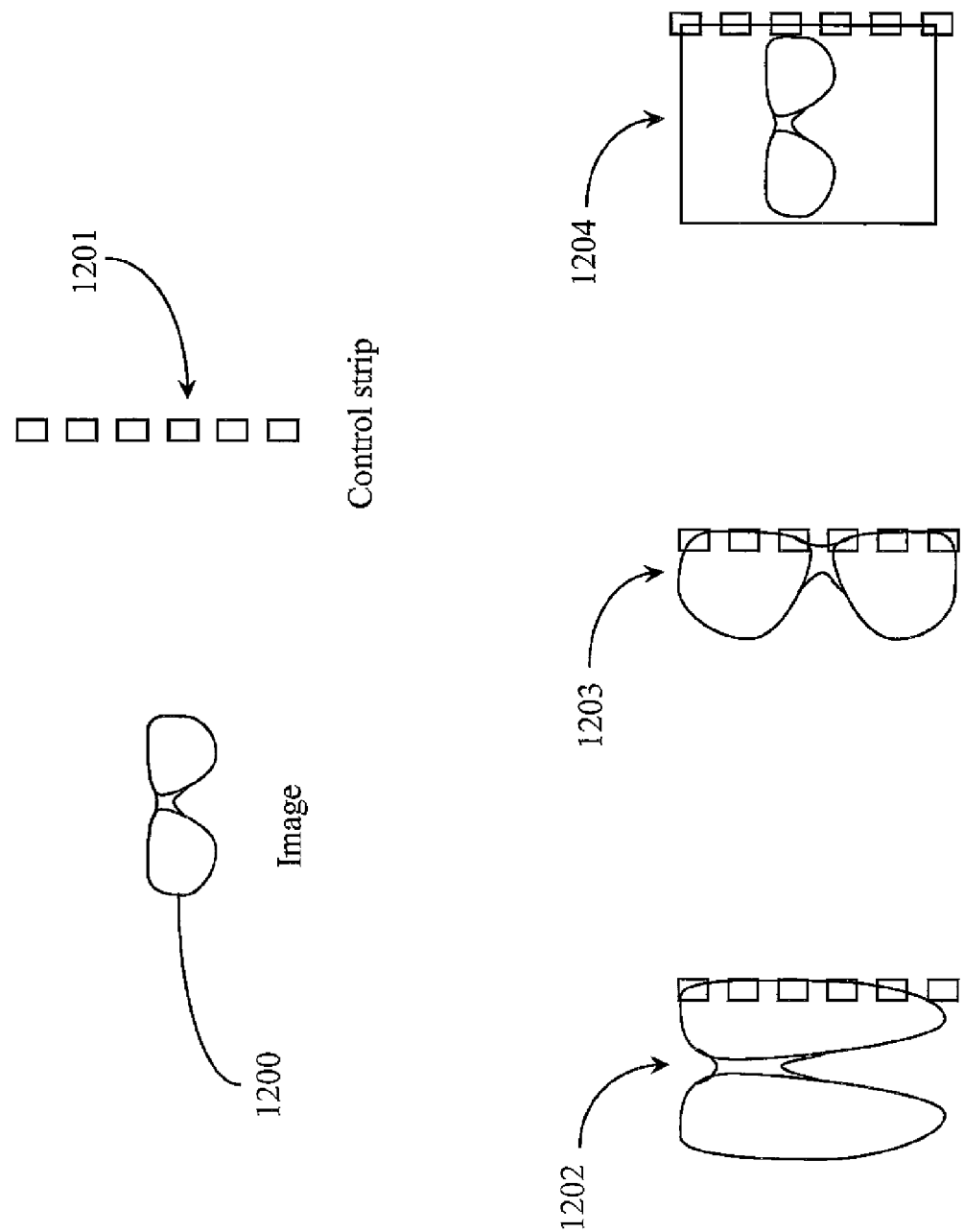
FIG. 12 is a block diagram illustrating an image 1200 stretched to fit a control strip 1201.

FIG. 12 is a block diagram illustrating an image 1200 stretched to fit a control strip 1201. In this case, an image 1200 of a sunglass is too small for a control strip 1201. In this case a stretching operation may be performed on the image to enlarge the image just enough to accept the full size of the control strip so that all of the user controls on the strip can be associated to the image.

In one case, as illustrated by association 1202, the image is stretched in its current orientation to fit the control strip. In this case, the image is stretched out of proportion. In association 1203, the image is first rotated in a position to align the length of the image to the length of the control strip so that less stretching is performed if any at all.

In association 1204, the image retains its original orientation, but an image border region is created or otherwise extended to accommodate the control strip without stretching the actual image. In general, the item may be temporarily stretched to the minimum width and height that is required in order to contain the user interface elements in the control strip. It may be rotated to better match the necessary aspect ratio, and then stretched. Or a background element may be temporarily added to the product image, to extend the bounding box of the image to the necessary spatial extent.

In general, when the mouse is moved over the item, it is decorated to demonstrate that it is the focus of interaction. The control strip consists of a set of user interface elements. In the preferred embodiment, a user interface element is activated by clicking the mouse button while the mouse is positioned within the bounding box of the element. Each user interface element in the control strip is associated with an operation. When the element is activated, the operation is applied to the focused item. The effects of these operations are described further below.

Figure 13:
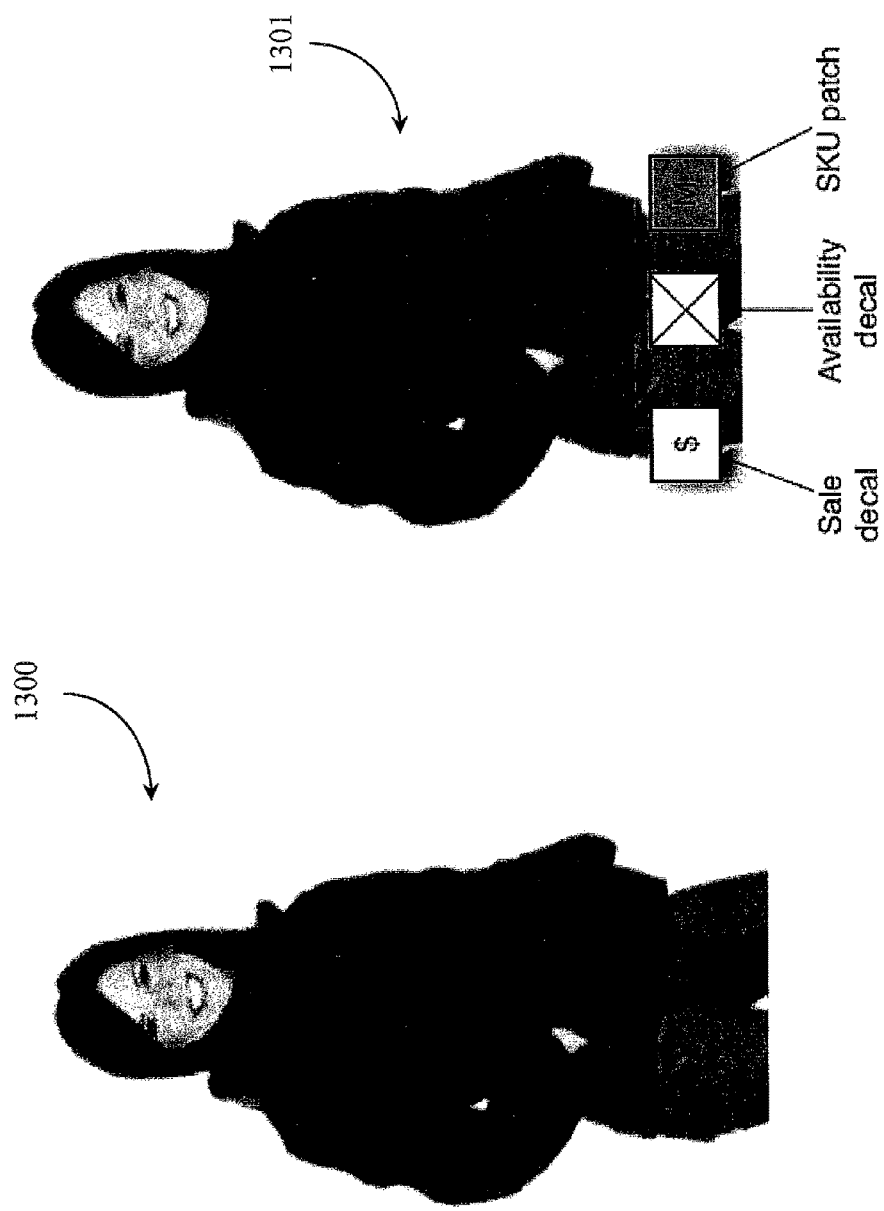
FIG. 13 is a view of an image 1300 with decals according to an embodiment of the present invention.

FIG. 13 is a view of an image 1300 with decals according to an embodiment of the present invention. The system may use electronic information buttons or "decals" to display additional information about an item. On the left is image 1300 with no decals or decals that are hidden. On the right is an image 1301 with three decals that display information about the item in the shopping cart. In one embodiment, decals are visible or "appear" only when the image is moused over or selected.

The "sale" decal indicates that the item is currently on sale. The "availability" decal indicates that the item is not currently available. The "SKU patch" displays the item's SKU. This last decal may be present only when several SKU's for a given product shares the same product image, so that the product image (and therefore the item image) do not represent the selected SKU.

Figure 14:
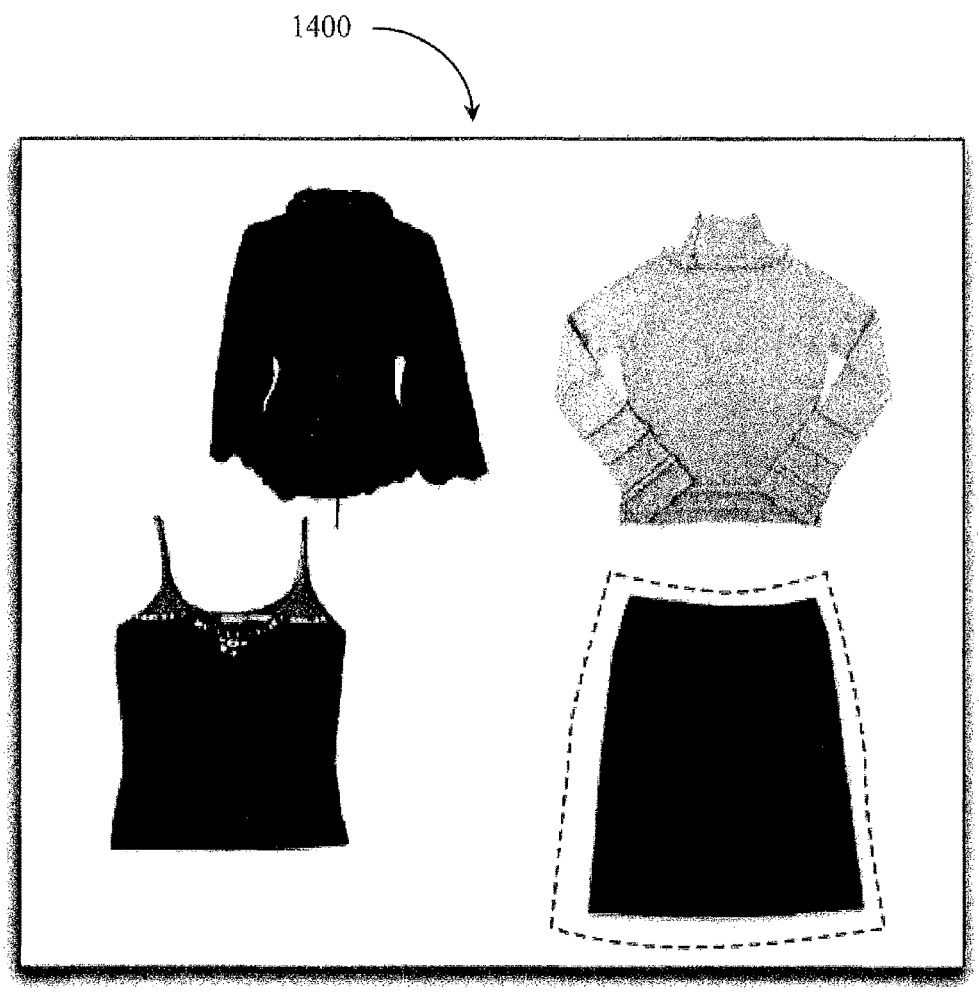
FIG. 14 is a collage view of items where one item is marked for hold.

FIG. 14 is a collage view 1400 of items where one item is marked for hold. In this example, the lower right item in collage 1400 has been marked "hold for later". This item will not be included in the list of items to be purchased, by default, during the checkout process. The "hold for later" status of this item is indicated via a dashed outline that is displayed around the image. Another embodiment could use a decal, or transparency, to indicate this status. Many other visual indicators could be used to indicate hold for later status such as item graying, blurring, distorting, flagging, etc.

Another embodiment could use a dashed boundary to instead indicate that an item is currently unavailable, that it has been purchased previously, that its SKU is underspecified, or a union of these conditions. The user marks an item as hold for later by activating the "Hold" user interface element of an item on the control strip, or a hold button somewhere else on the shopping cart as described further above.

The system responds to this action by redisplaying the item with appropriate decoration; setting the appropriate flag of the item's representation client page element list; and sending a message to the server that encodes an operation similar or identical to (SET_HOLD), the item ID, and the value "true". In this embodiment, if an item has been marked as hold for later, the user interface control will instead be marked as "Now". Selecting it will unmark the "hold" flag, and encode the operation SET_HOLD with the value "false".

Figure 15:
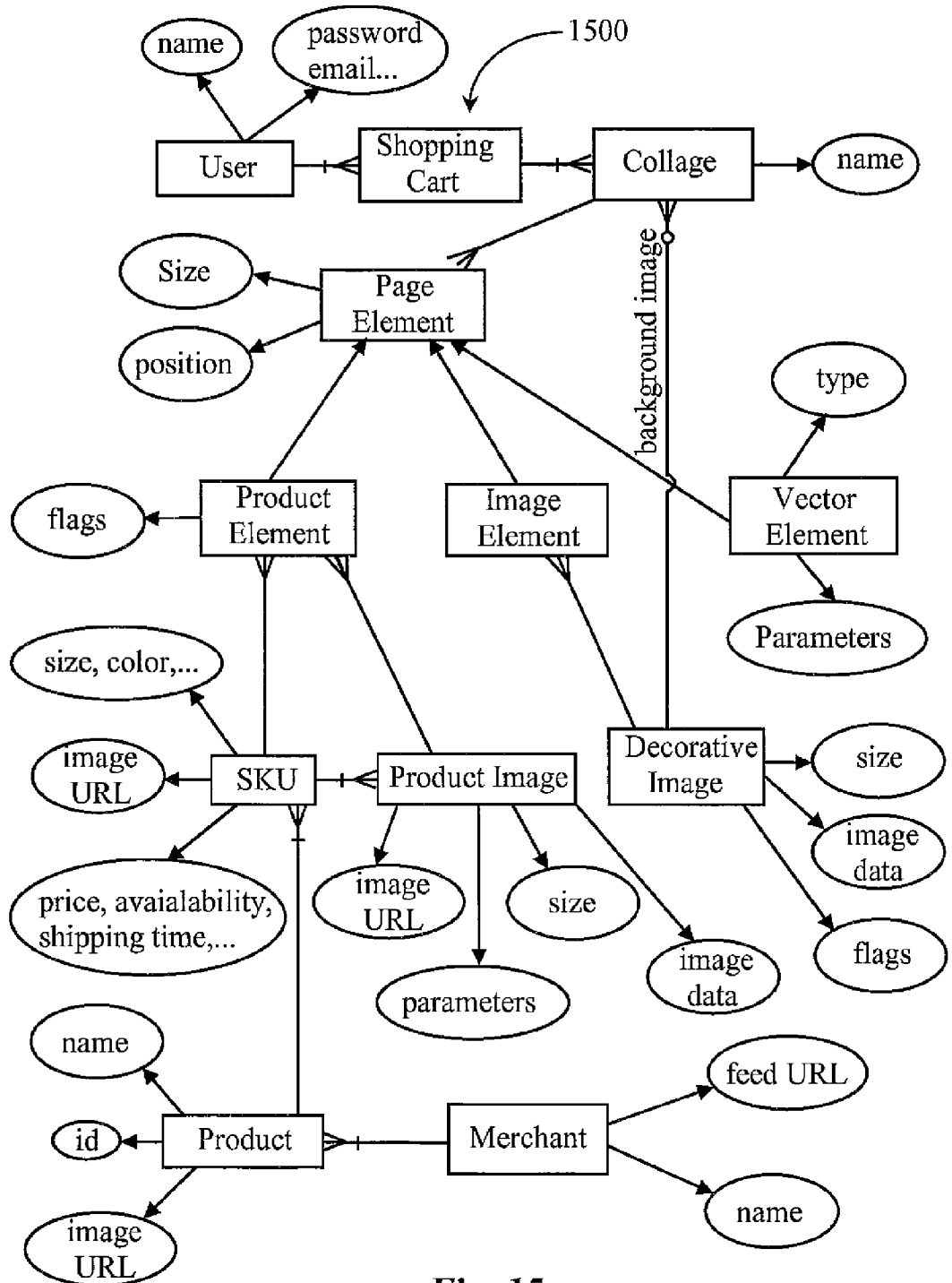
FIG. 15 is an entity relations chart illustrating a database schema for practicing the present invention.

FIG. 15 is an entity relations chart illustrating a database schema for practicing the present invention. The product, SKU, and merchant model embody the products and SKUs that are available for inclusion in the shopping cart. The product image and decorative image contain images that can be used in the visual representation of the shopping cart. The shopping cart, page, and page elements (Product Element, Image Element, and Vector Element) represent the contents of a page of the shopping cart.

A SKU, or (Stock Keeping Unit), represents a variant of a product—for example, a particular color and size of a product that potentially comes in multiple sizes and colors. The current embodiment uses SKUs to represent all items in the shopping cart, even if the user has not yet selected a color or size. It does this through the use of underspecified SKUs. A SKU without a color, a size, or both, can be added to the shopping cart. When the user checks out the shopping cart, she is prompted to specify a color or size in order to replace the underspecified SKU with a specific SKU, and complete the purchase.

A User represents a user of the system. Each user has one or more Shopping Carts, and each cart contains one or more Pages. A Page contains a list of Page Elements. Each Page Element is either a Product Element—representing a specific SKU of a product—or a decorative element. A decorative element is either an Image Element, which represents the placement of an image in the Decorative Image table; or a Vector Element, which contains a specification that allows it to be rendered upon request.

A cart has an owner, and a list of pages. A page has a name, and an optional background image (which is a decorative image). A page element has a position and a size. A product element additionally has a SKU ID, a product image ID, a quantity, and a set of flags to indicate whether the user owns the item and whether to include it in the next checkout or hold it for later.

An image element has the attributes of a page element. It is also associated with a decorative image ID. A Product Image has a SKU ID, an image source URL, a size, image data, and a set of parameters that indicate how the image has been modified from the image at the image URL—for example, the color that has been assumed to be the background color, and the tolerance within which a pixel is recognized as this color, for purposes of assigning transparency. A decorative image has a size, and image data. The image data for a product image and for a decorative image include transparency values at each pixel.

In one embodiment, a single decorative image in particular is used as a placeholder image on the client. This use is described below, under the description of the replace operation. A vector element has a type, which indicates whether the type of decoration that it represents (e.g. LINE, BORDER, or TEXT) and a set of parameters that define how to construct the image. For a TEXT element, these parameters include the text, font, size, color, angle, and text style. For a BORDER element, these parameters include the border type, weight, and color. For a LINE element, these parameters include the line type, line weight, and color. One who is familiar with the art will appreciate that a table could be used to associate more than one image URL with a product or with a SKU.

Figure 16:
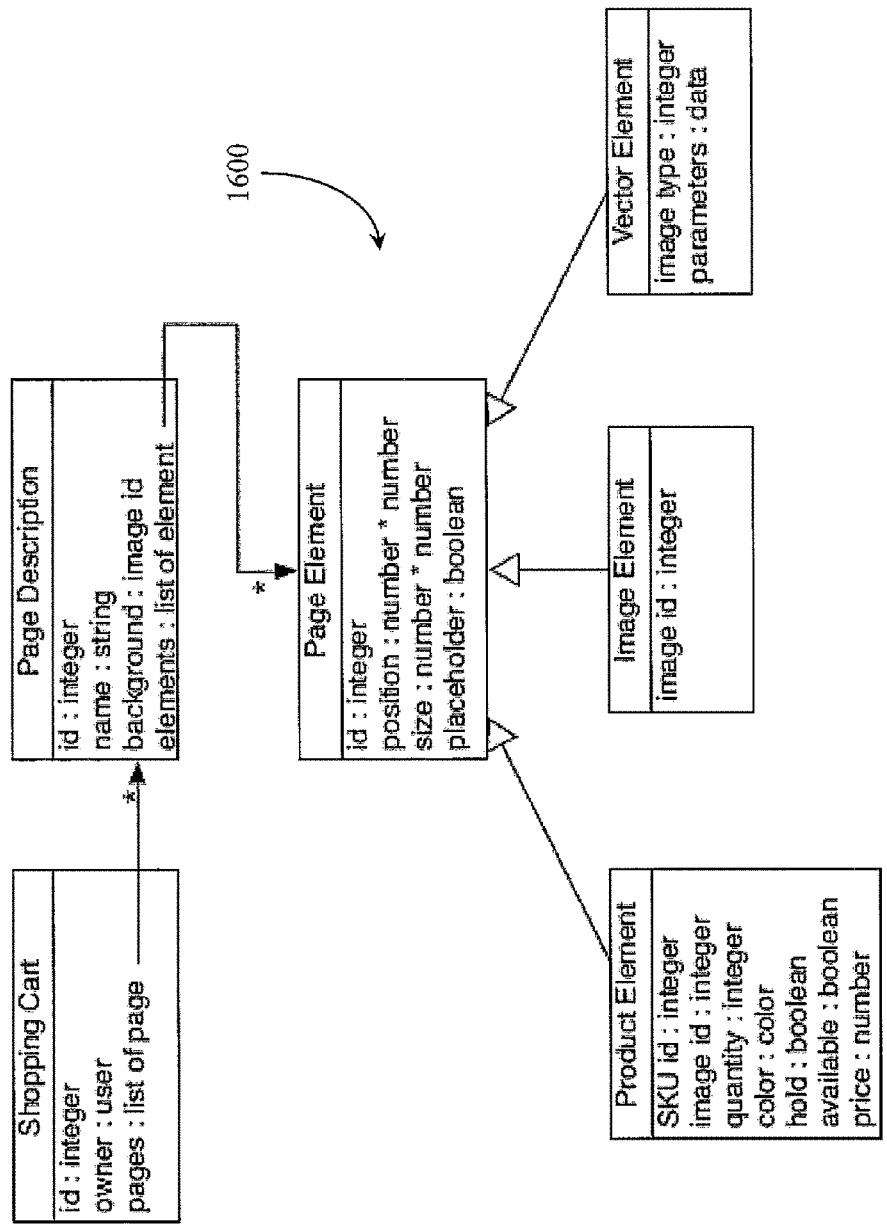
FIG. 16 is class diagram illustrating some data structures representing the shopping cart contents on the client.

FIG. 16 is class diagram illustrating some data structures representing the shopping cart contents on the client. A Shopping Cart has a list of Pages. A Page has an ID, a name, and a list of page elements. A Page Element is a product element, an image element, or a vector element. Each Page Element has a position, a size, and a flag that indicates whether it is the placeholder. A Product Element has a SKU ID, an image ID, a quantity, a price, a color, and a set of flags that describe whether the SKU is currently available, and whether it is marked for inclusion in the next checkout operation. The color is also available in the database entry for the SKU (which is stored on the server), but it can be convenient to have it readily accessible on the client. Image and Vector Elements are also present in the class diagram.

Figure 17:
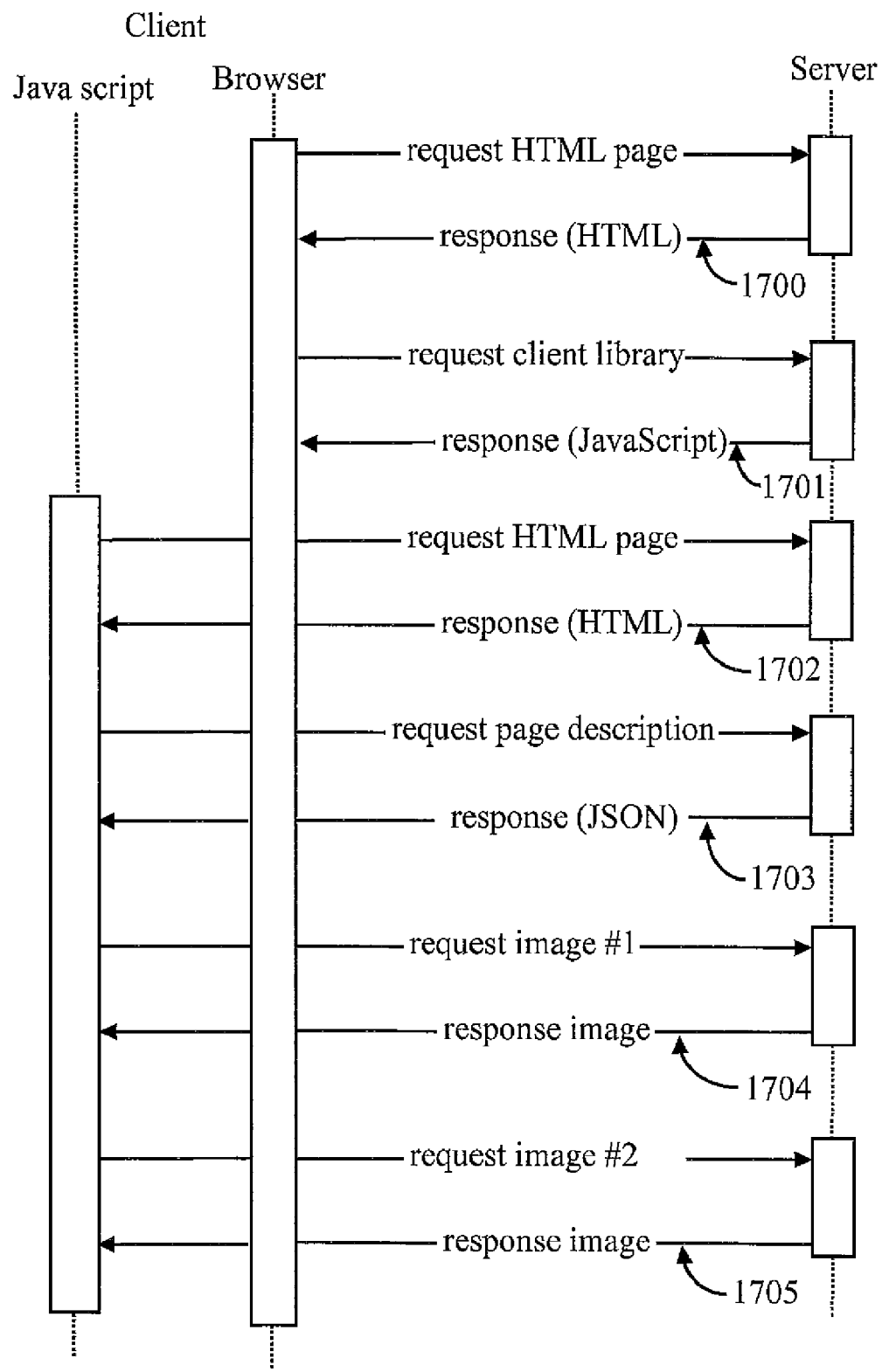
FIG. 17 is a sequence diagram of the process of loading an HTML page that displays a page of the shopping cart according to an embodiment of the invention.

FIG. 17 is a sequence diagram of the process of loading an HTML page that displays a page of the shopping cart according to an embodiment of the invention. A request/Response sequence 1700 is initiated. The browser within the consumer device initiates an HTTP request for an HTML page. The web server responds with an HTML page that includes a URL that references the code that implements the client page cart manager. Next, a request/response sequence 1701 is initiated wherein the browser dereferences this URL to request the client page cart manager code. The server responds to this request, with the client page cart manager code, which is Java in this example.

Next, a request//response sequence 1702 is initiated. The client (Java enabled) executes this code, initiating the client page cart manager. Once the client page cart manager has been loaded, it requests the user's shopping cart model (HTML) from the server.

Next, a request/response sequence 1703 is initiated. The server queries the database for the shopping cart (the pages, their backgrounds, and the page elements in each page), encodes the result, and responds with an encoding of this data.

Further request/response sequences 1704, 1705 and on represent interaction between the client and the shopping cart using the user control elements within the cart to request and receive data. The client chooses a default page of the page cart (in the current embodiment, the first page), and creates user interface elements that present the data in this page.

Figure 18:
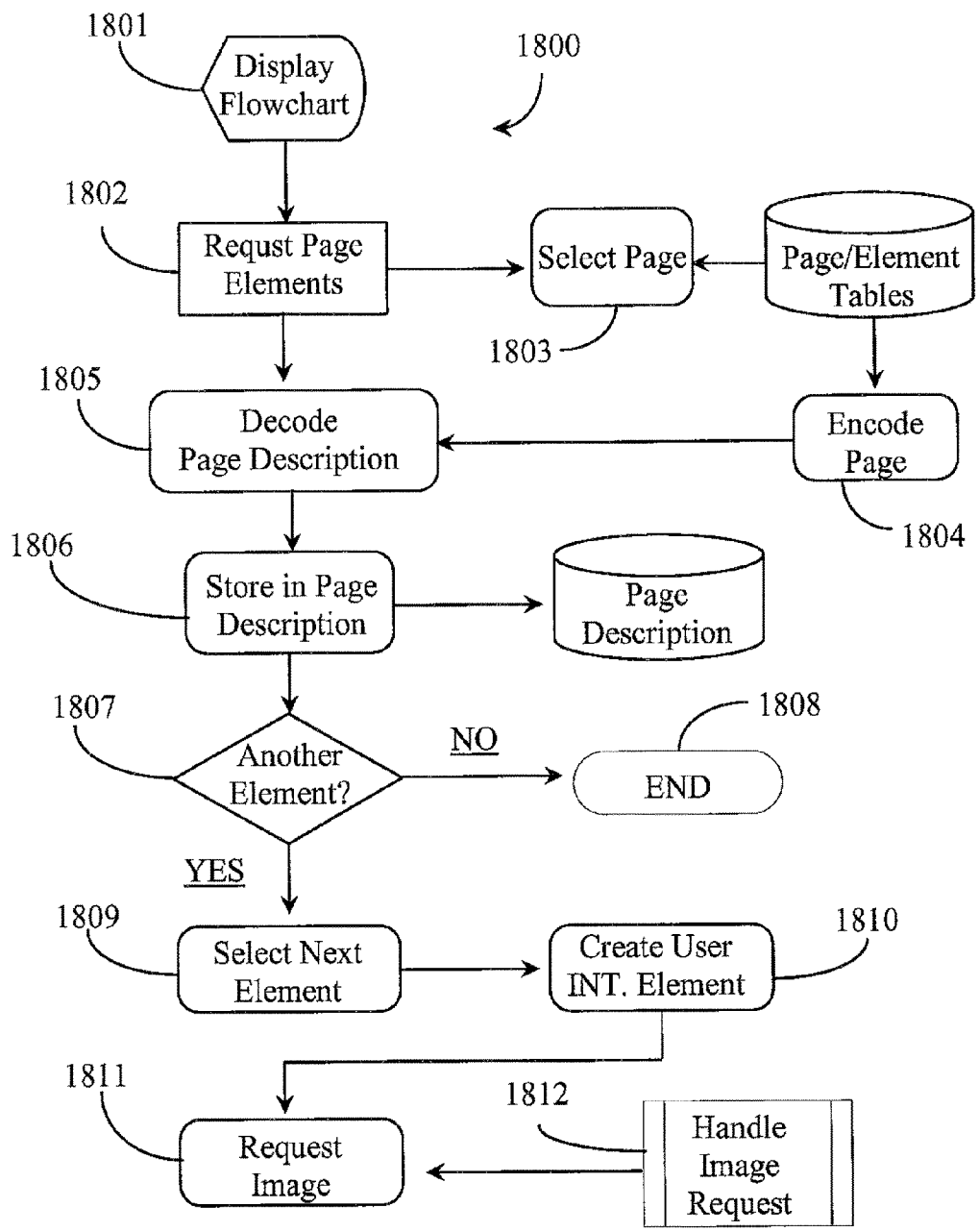
FIG. 18 is a flow chart illustrating client/server steps for shopping cart interaction according to an embodiment of the present invention.

FIG. 18 is a flow cart illustrating client/server steps 1800 for shopping cart interaction according to an embodiment of the resent invention. The steps describe creating the initial display of the items in a page in the shopping cart.

In 1801-1807, the client requests an HTML document. The HTML elements in this document include an area that will contain the items in the shopping cart. The document also contains a reference to a software component that will run on the client. When the client requests and then executes this component, the component requests a machine-readable description of the current users' shopping cart. This request includes the account information of the current user or a redirect to login or register for an account. The server responds to this request with a machine-readable representation of the shopping cart. This representation contains a list of representations pages. Each page representation contains these properties:

The image identifier of the collage background, if any, and its width and height.

A list of representations of page elements. Each page element is represented by a position, a width, a height, and an element type (PRODUCT_ELEMENT, IMAGE_ELEMENT, or VECTOR_ELEMENT).

A representation of a Product Element includes a product identifier; an image identifier; a price, title, and supplier; availability; estimated shipping cost; estimated shipping time; SKU; flags that indicate whether the user already owns the item, and whether the item has been marked "hold for later"; the position, width, and height of the image.

In steps 1807-1812, the client program processes these items as follows. For each item, it creates an HTML element with the specified size and position. (The position of the collage background is such that its lower left corner coincides with the lower left corner of the shopping cart display area.) It sets the element's source property to a URL that incorporates the image identifier. This last action causes the browser to request an image from the shopping cart server.

Figure 19:
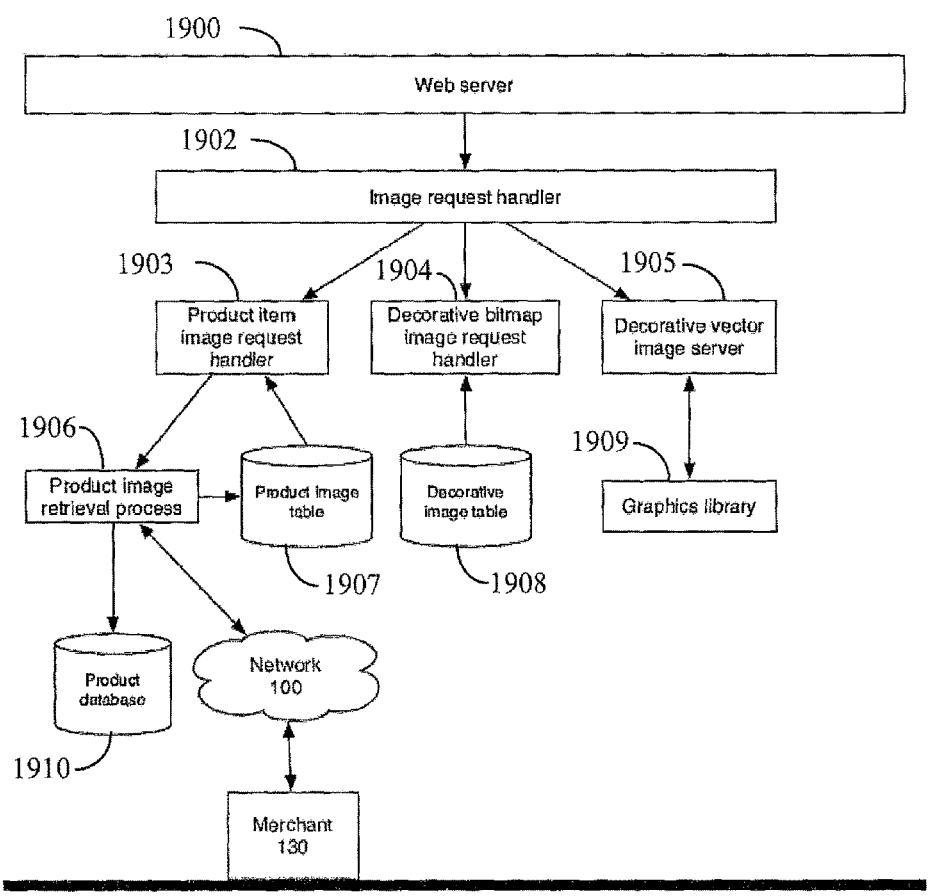
FIG. 19 is a block diagram illustrating server-side processing of an image request.

FIG. 19 is a block diagram illustrating server-side processing of an image request. A web server 1900 recognizes that the request is an image request, and routes the request to the image request handler 1902. The image server extracts the image descriptor from the request URL and routes it to the decorative image processor 1904, the decorative vector processor 1905, or the item image processor 1903, depending upon the image type encoded within the image descriptor.

The left column of this block diagram illustrates the processing of a request for a product item image. The product image processor 1903 extracts the item image id and the product ID from the image descriptor. It first selects the record with this ID from the product image database 1907. If the record does not exist, the product image retrieval process uses the product ID to select a record from the product database 1910. It requests this product's image URL from the merchant, applies the background removal process to the image, stores the result in the image database 1907, and responds to the request with this image. The center portion of this diagram illustrates the processing of a request for a decorative image. The image server 1902 extracts a decorative image ID from the image descriptor, selects the record with this ID from the decorative image database 1908, and responds to the request with this record's image.

The right portion of this diagram illustrates the processing of a request for a decorative vector. The decoration renderer 1905 decodes the decorative element type and parameters from the descriptor, uses an image processing library 1909 such as ImageMagick or Cairo to create an image, and responds to the request with this image.

A practitioner familiar with the art will see that the rendering of the vector could be cached in a database or a file system. As can be seen requested images may be served from internal system sources or may be retrieved or served from remote data sources without departing from the spirit and scope of the present invention.

Figure 20:
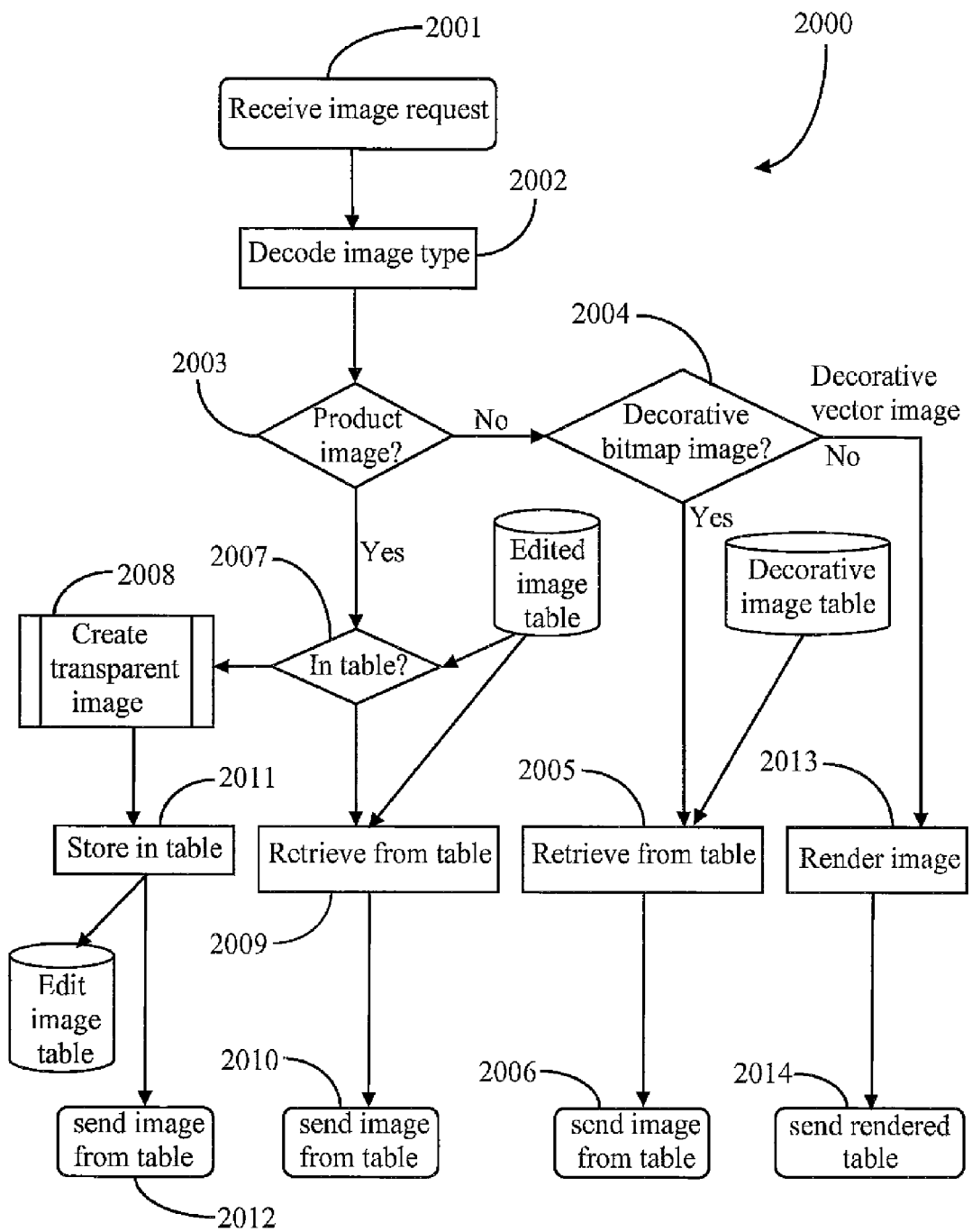
FIG. 20 is a flow chart illustrating steps for requesting a product image according to an embodiment of the invention.

FIG. 20 is a flow chart illustrating steps 2000 for requesting a product image according to an embodiment of the invention. This happens when a user adds a new product to the shopping cart via the "add to cart" operation, or chooses a new image via the "select image" operation. At step 2001 the system gets an image request, at step 2002 the system decodes the image type. At step 2003 it is determined if the image is a product image. If yes, then at step 2007 it is determined if the image is tabled. If not then at step 2008, the system creates a transparent image. In step 2111 the transparent image is stored and in step 2012 it is served. If the image is tabled in step 2007 then at step 2009 it is retrieved and in step 2010 it is served.

If the image is tabled at step 2007, the system retrieves the image at step 2009 and serves the image at step 2010. If at step 2003 in the process, the image is not a product image, then at step 2004 it is determined if it is a decorative bitmap image. If yes then at step 2005 it is retrieved from the appropriate table and served at step 2006. If at step 2004 the image is not a decorative bitmap image, then at step 2013 the system renders the image and at step 2014 the system serves the rendered or created image.

Figure 21:
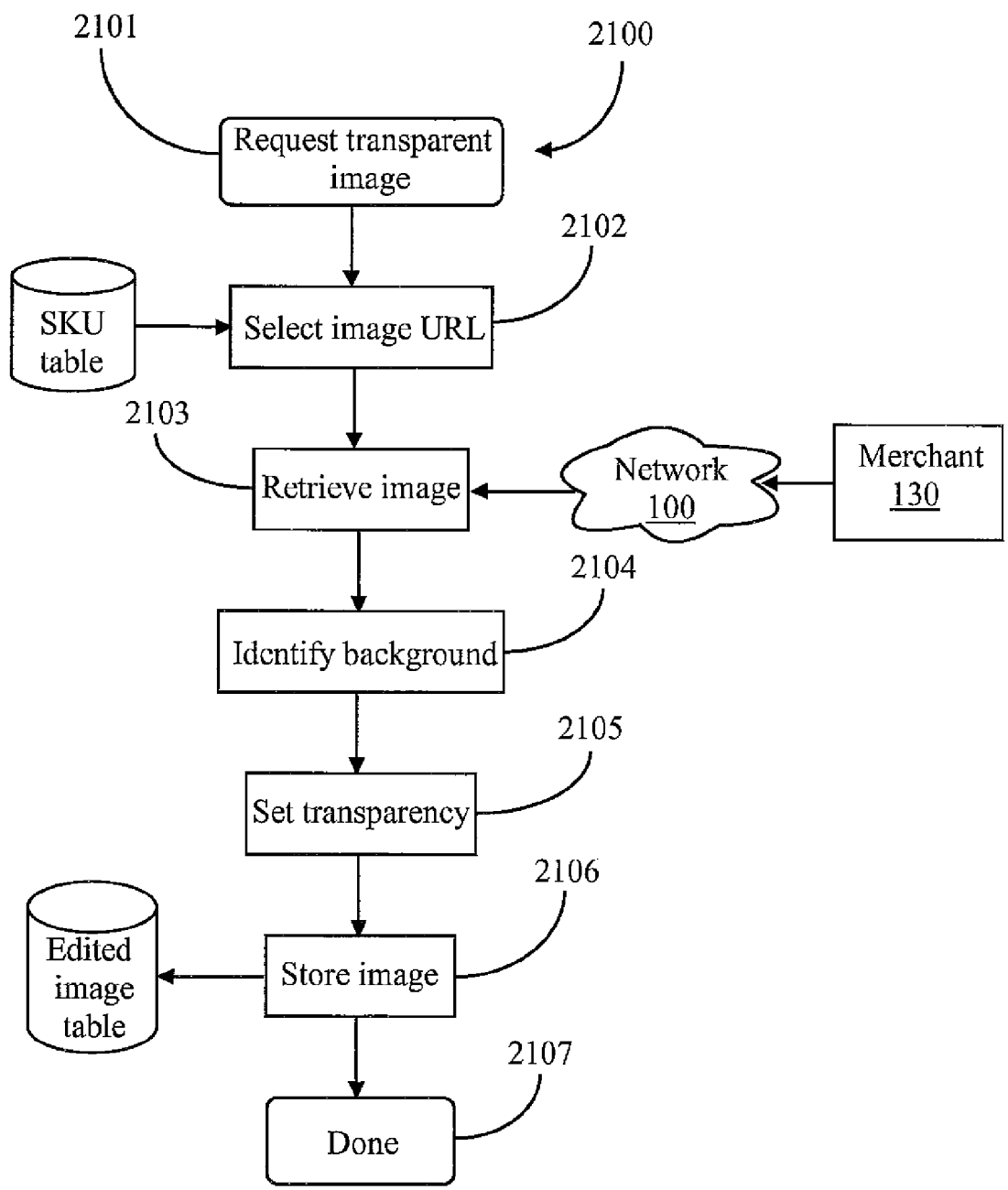
FIG. 21 is a process flow chart illustrating steps for setting transparency of an image according to one embodiment of the invention.

FIG. 21 is a process flow chart illustrating steps 2100 for setting transparency of an image according to one embodiment of the invention. At step 2101 a request is registered for a transparent image. At step 2102, the system selects the image URL from the image SKU table.

At step 2103 the system retrieves the image from the merchant if required through the network. At step 2104, the system identifies the mage background. At step 2105 the image transparency mechanism sets the image background to transparent. T step 206 the image is stored in the edited image table. The process ends at step 2107.

In one embodiment, the background is identified by sampling the pixels along the edge of the image. If the majority of these pixels are the same color, this can be assumed to be the background color. In this embodiment, pixels with this color set to transparent, to produce an image with a transparent background. In an alternate embodiment, additional adjustments to the image might be made. For example, it could be color balanced or calibrated to a standard white point, to match the background image, or to match the other images in the chart. The user can apply several commands to items in the shopping cart. These operations are described below.

Figure 22:
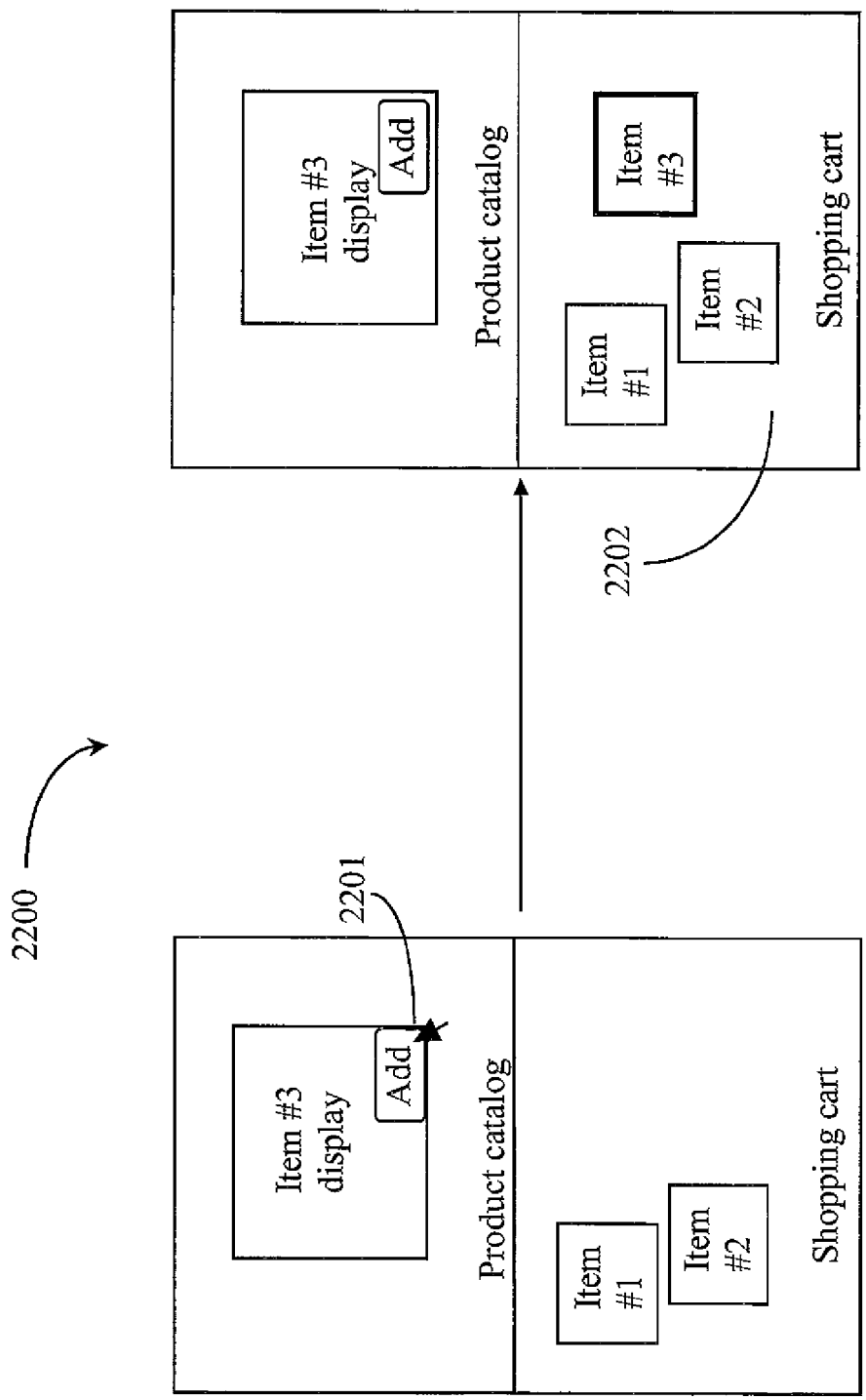
FIG. 22 is a block diagram illustrating a user shopping cart interface using drag and drop to add an item from the catalog to the shopping cart.

FIG. 22 is a block diagram illustrating a user shopping cart interface 2200 using an add user control element to add an item from the catalog to the shopping cart. Interface 2200 includes a horizontally divided workspace comprising the catalog above and the shopping cart space below. Catalog items numbers 1 and 2 are in the shopping cart space 2202 and item 3 is displayed in the catalog. The graphical representation of an item within the shopping cart contains an "Add to cart" user interface element (Add Button). An add button 2201 is provided as a user control element more particularly visible in item 3 in the catalog space as a user mouses over the item. Clicking on this element adds a new item, whose product is the product in the product catalog, to the current page of the cart as shown in space 2202

Clicking add button 2201 causes the item #3 to be added in the shopping space 2202 where it is illustrated as bolded item #3. The function is also described further below via a process flow.

Figure 23:
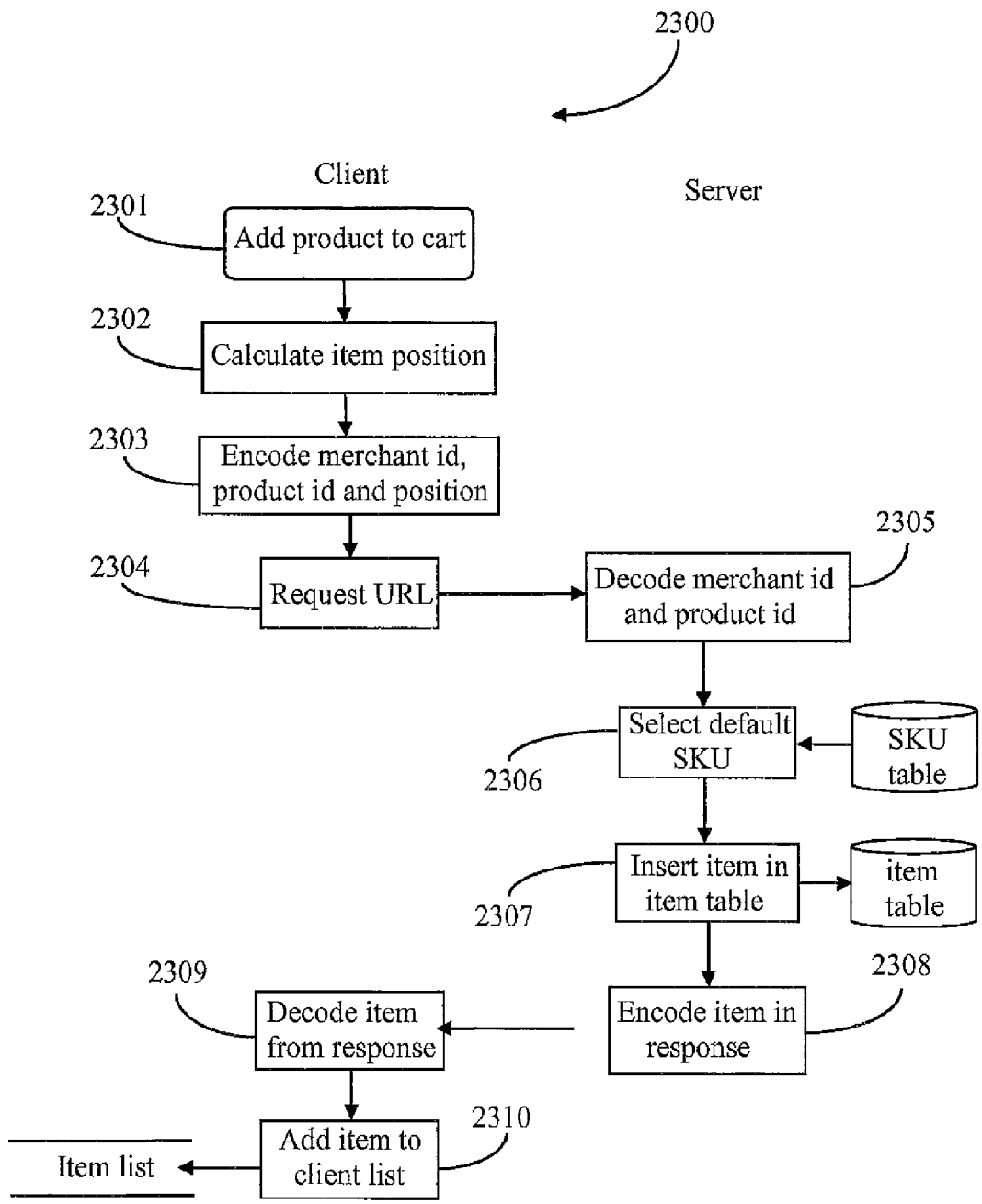
FIG. 23 is a process flow chart illustrating steps for adding an item to a shopping cart according to an embodiment of the present invention.

FIG. 23 is a process flow chart illustrating steps 2300 for adding an item to a shopping cart according to an embodiment of the present invention. In response to a click on the "Add to cart" user interface element at step 2301, the browser software calculates the future position of the item at step 2302 directs the client cart manager to add the item with the merchant ID of the current product catalog and the product ID of the selected item at step 2303. At step 2304, the client cart manager requests a URL and an item ID from the server cart manager. The request includes the merchant ID and the product ID.

At the server in step 2305, the merchant and product identification numbers are decoded. At step 2306, the server selects a default SKU for the product from an SKU table. At step 2307, the item is inserted in an item database or table. The item served in encoded in response in step 2308. The server responds at step 2308 with an item descriptor. The client cart manager adds at step 2309 a representation of the item to client-side representation of the shopping cart page, looks for an area to position the item's image, creates a graphical element (e.g. an HTML IMG element), and sets its size and position. The client then sets the element's image source to a URL that encodes the item's image identifier. This action initiates a request for the image from the server. The server responds to this request with the product image, as described above in the section on displaying the cart content.

The step that calculates the position for an item (2302) first inspects the list of page elements for an element whose placeholder flag is set. If such an item exists, it is removed, and its position and size are used for the newly added element. Otherwise, the item is placed at the upper left corner of the page. An alternate embodiment might use a more sophisticated algorithm to search for an area of the page that contained sufficient free space. At step 2310 the item is added to the shopping cart item list.

Figure 24:
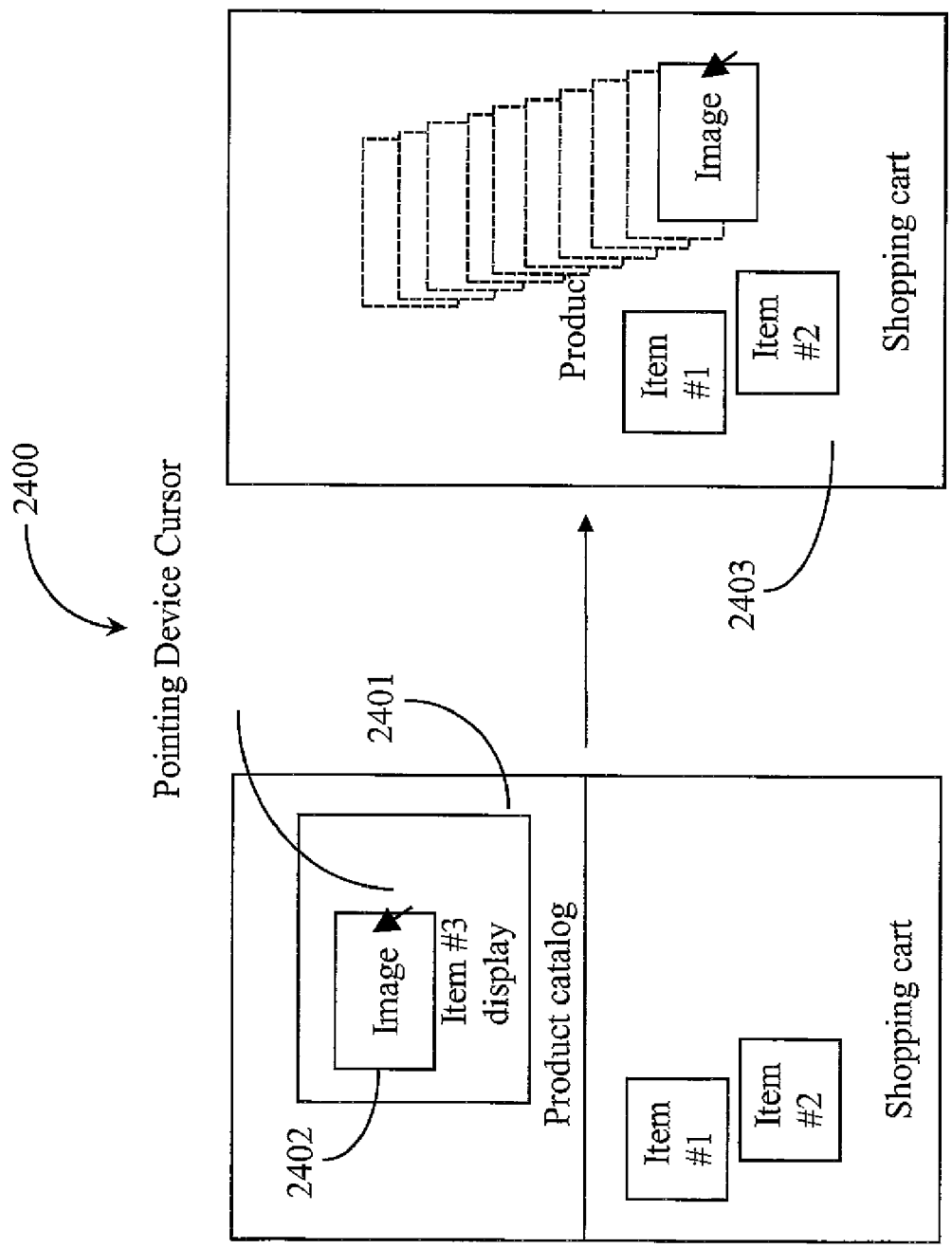
FIG. 24 is an interface for adding an item from a catalog to a shopping cart using drag and drop.

FIG. 24 is an interface for adding an item from a catalog to a shopping cart using drag and drop. In one embodiment, the user may take a pointing device to drag a user interface element that represents a product, from the product catalog area into the shopping cart area. This operation adds the product to the shopping cart, at the position selected by the user. The behavior of the software system during this operation is the same as that illustrated in FIG. 23, except that the initial position of the item is that chosen by the user, and is not computed by the system.

Interface 2400 is horizontally divided with respect to catalog and shopping cart workspace. Catalog space 2401 contains an item display including an item image #3 2402. Items #1 and #2 are already in the shopping cart workspace 2403. A user simply drags the image from the catalog over to the shopping cart workspace 2403 to a position decided on by the user resulting in the addition of the catalog item #3 into the shopping cart collage or list view.

In an extension of this mechanism, items that are already in the shopping cart may be resized or repositioned to make room for the new item. In another extension, the initial size and image for a SKU are computed based upon how users have previously modified representations of that SKU within their shopping cart. The mechanisms for aggregating and using this data are described below, at the end of the sections that describe resizing an item and selecting an image for an item, respectively.

In another extension, the initial size and image is selected based upon properties of the image associated with the product, and optionally the current cart contents. For example, the shape or color profile can be used to identify images that contain skin tones, so that an image without skin tones can be selected. In another extension, the initial size and image are selected based upon the area of the collage that at which the item is positioned. Furthermore, an image whose profile indicates that it is in a specific orientation more suitable for collages can be selected and/or an image whose color profile is more compatible with the collage background or with other images can be selected.

Figure 25:
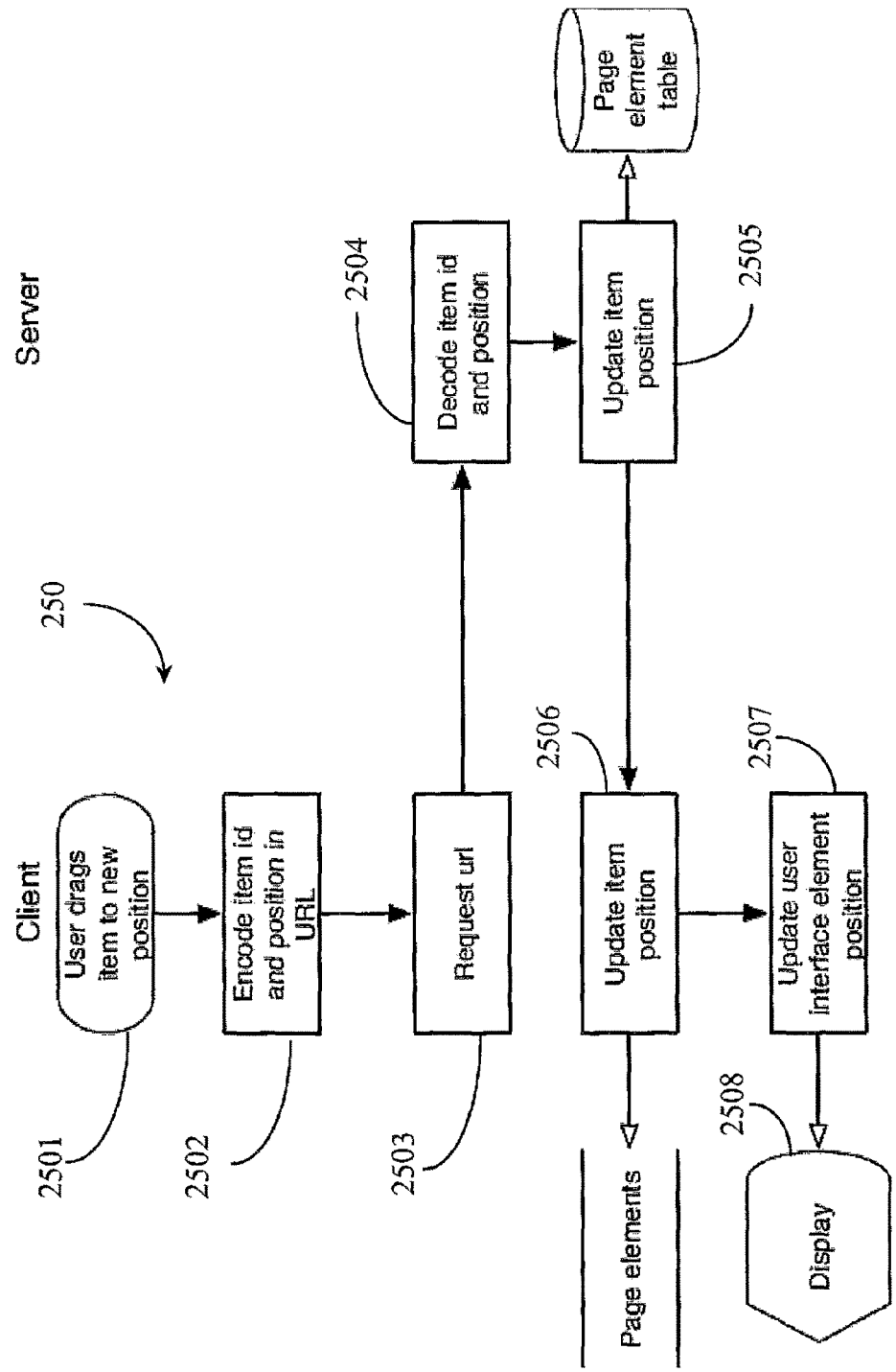
FIG. 25 is a process flow chart illustrating steps 2400 for adding a catalog item to the shopping cart via drag and drop utility.

FIG. 25 is a process flow chart illustrating steps 2400 for adding a catalog item to the shopping cart via drag and drop utility. The user can reposition an item on a shopping cart page by dragging it with a pointer device. Each item has a draggable region, which is the area of its bounding box minus the areas of the controls in its control strip. (In an aforementioned alternate embodiment, this region is instead the area of the non-transparent portion of the item's image minus the areas of these controls.) When the user depresses the mouse button while the mouse pointer is within the draggable region and then moved, the item moves with the mouse.

When the mouse button is released, these actions occur. First, issues an HTTP request to the server, whose URL encodes the operation (MOVE_ITEM), item ID, and the new position. The server extracts the item ID from the URL and updates the specified record of the item table of the server database with the new position. Then the client cart manager updates the position attribute of the affected item in the client-side representation of the shopping cart page, so that subsequent viewing of the same shopping cart page will show the item at its new position. Finally, it updates the user interface element to the new position.

At step 2501, a user drags an item from the catalog to a new position in the shopping cart. The client encodes the item ID and new position in URL at step 2503. At step 2504, the client requests the URL. At step 2504, the server decodes the item ID and position. At step 2505, the server updates to the new position of the item and stores it in the page element table.

At step 2505, the server also sends the new position and URL to the client, which updates the item position at step 2506 and stores the update in page elements. At step 2507 the client updates the user interface element position and at step 2508, the newly moved item is displayed at the intended position in the shopping cart.

Figure 26:
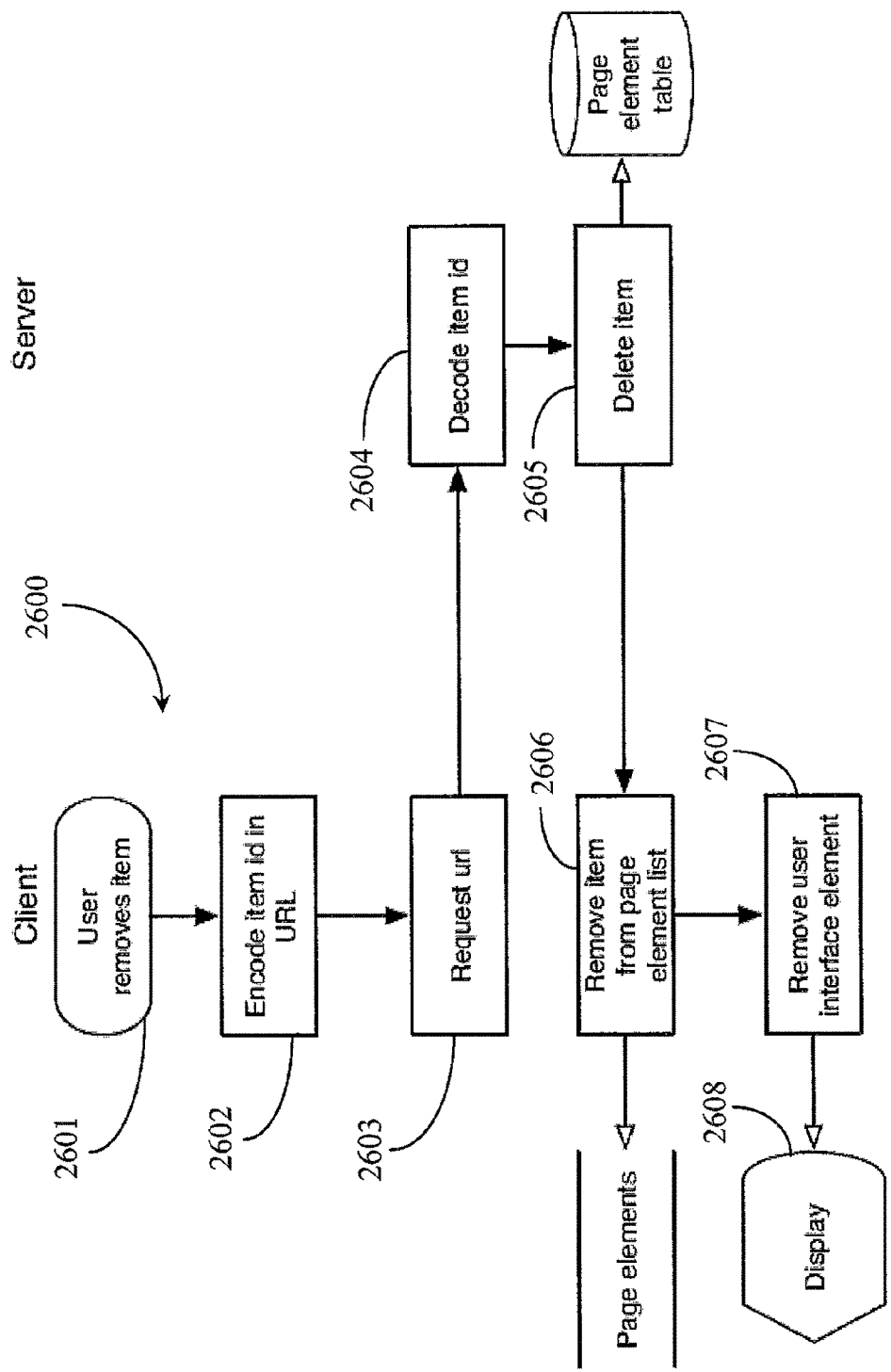
FIG. 26 is a process flow chart illustrating removal of an item from the shopping cart of the invention.

FIG. 26 is a process flow chart illustrating removal of an item from the shopping cart of the invention. The user can remove an item from the shopping cart by selecting an item's "Remove from cart" interface element. This operation removes the item from the shopping cart page. When the user removes an item, the client cart manager encodes the operation (DELETE_ITEM), and the item ID in a URL. It requests this URL from the server. The server deletes the item from the item table of the database. Then the client removes the item descriptor the list of page elements for the current page. Finally, it deletes the item's user interface element from the display list.

More specifically at step 2601, the user removes an item from the shopping cart. At step 2602, the client encodes the item URL and sends it to the server in a request to remove item. At step 2604, the server decodes the item ID. At step 2605, the server deletes the item (sever-side) and removes the information from the page element table.

The server response directs the client to remove the item from the page element list in step 2606 and remove the item from the client-side page element table. At step 2607, the client also removes the user interface element. At step 2608, the removed item disappears from the shopping cart.

Figure 27:
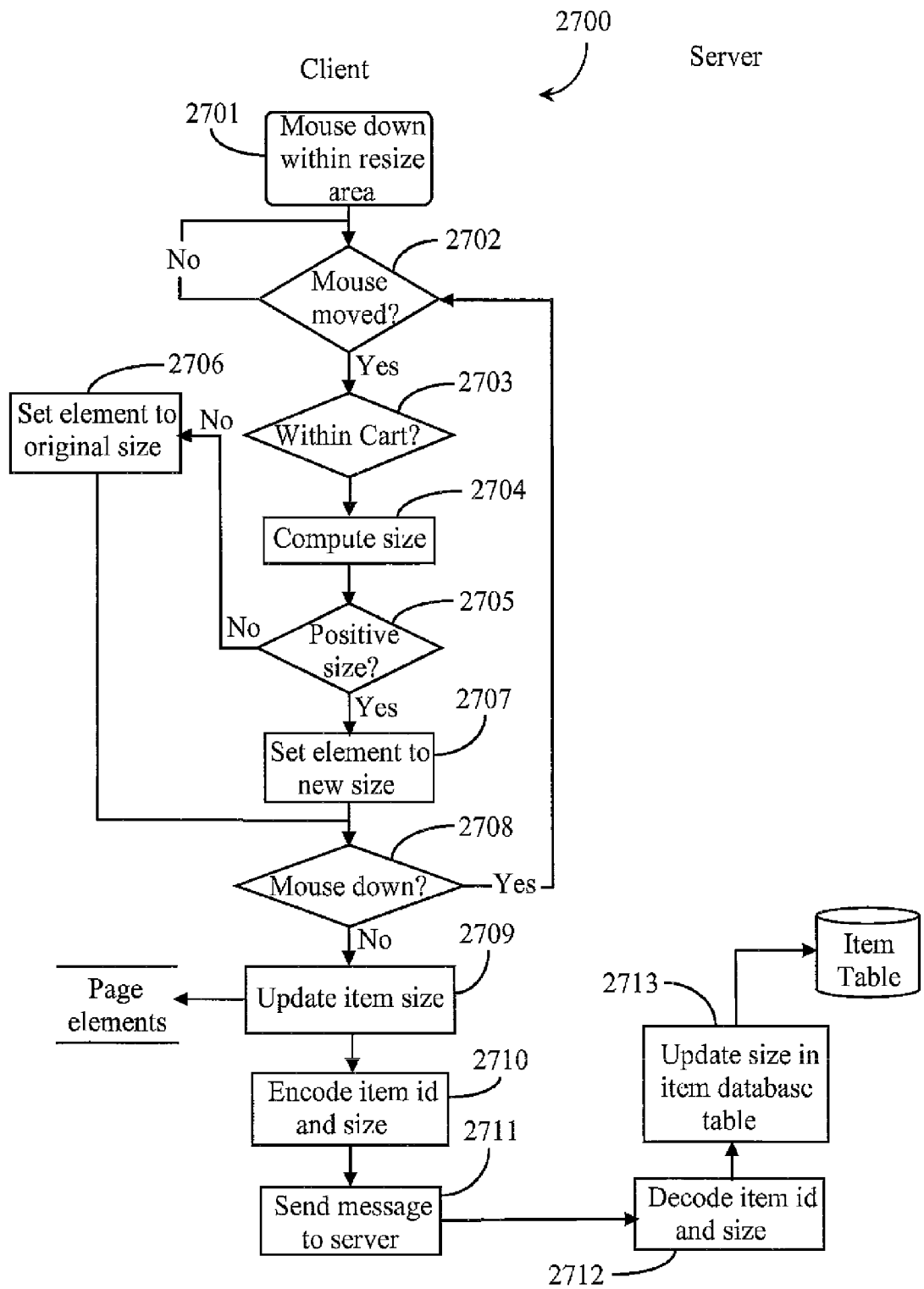
FIG. 27 is a process flow chart illustrating steps for resizing an item according to an embodiment of the invention.

FIG. 27 is a process flow chart illustrating steps 2700 for resizing an item according to an embodiment of the invention. The user can resize an element in the shopping cart. The user performs this operation by pressing the mouse button while the pointer is positioned within the area of the item's "Resize" interface element (user interface/control element). At step 2701, a user mouses down (depress and hold) within the resize area of an item. At step 2702, the system determines if the Pointer has moved. If the pointer has moved in step 2702, the system determines at step 2703 if the movement was within the resizing area of the item.

If at step 2703, it is within the area, then at step 2704, the client computes the size of the item. The sizing element is within the shopping cart display area and below and to the right of the upper left corner of the user interface element, this element is shown at a size such that its area is the smallest rectangle that preserves the aspect ratio of the original item, and such that the pointer lies along either the right or bottom side of the rectangle. When the pointer is outside of the shopping cart display area or it is not below and to the right of the upper left corner of the user interface element, this element is shown with the size that it had before the operation started. When the mouse button is released, the size of the item is updated to the new size.

At step 2705, the client determines if the computed size is a positive size. If yes, then at step 2708 the system determines if the mouse is still down. If it is the process moves back to step 2702. If at step 2705 the system determines that it is not a positive size, then at step 2706 the client sets the size to the original size.

If at step 2708, the system determines the mouse is not depressed (mouse down) then at step 2709 the system updates the item size. The client also updates the page elements table. At step 2710, the client encodes the item ID and new size. At step 2711, the client sends a message to the server with the new update. At the server in step 2712, the server decodes the ID and new size data and updates the size in the server-side item database table at step 2713.

In this way, the system has information about how which size each user has chosen which sizes to represent each product. This information is present in the shopping cart table, and can be retrieved by selecting all shopping cart items that reference a specific SKU, or that reference SKUs of a particular product. This information can be used to select a default image for use in the representation of a particular product, when a user subsequently adds an item to the cart.

Figure 28A:
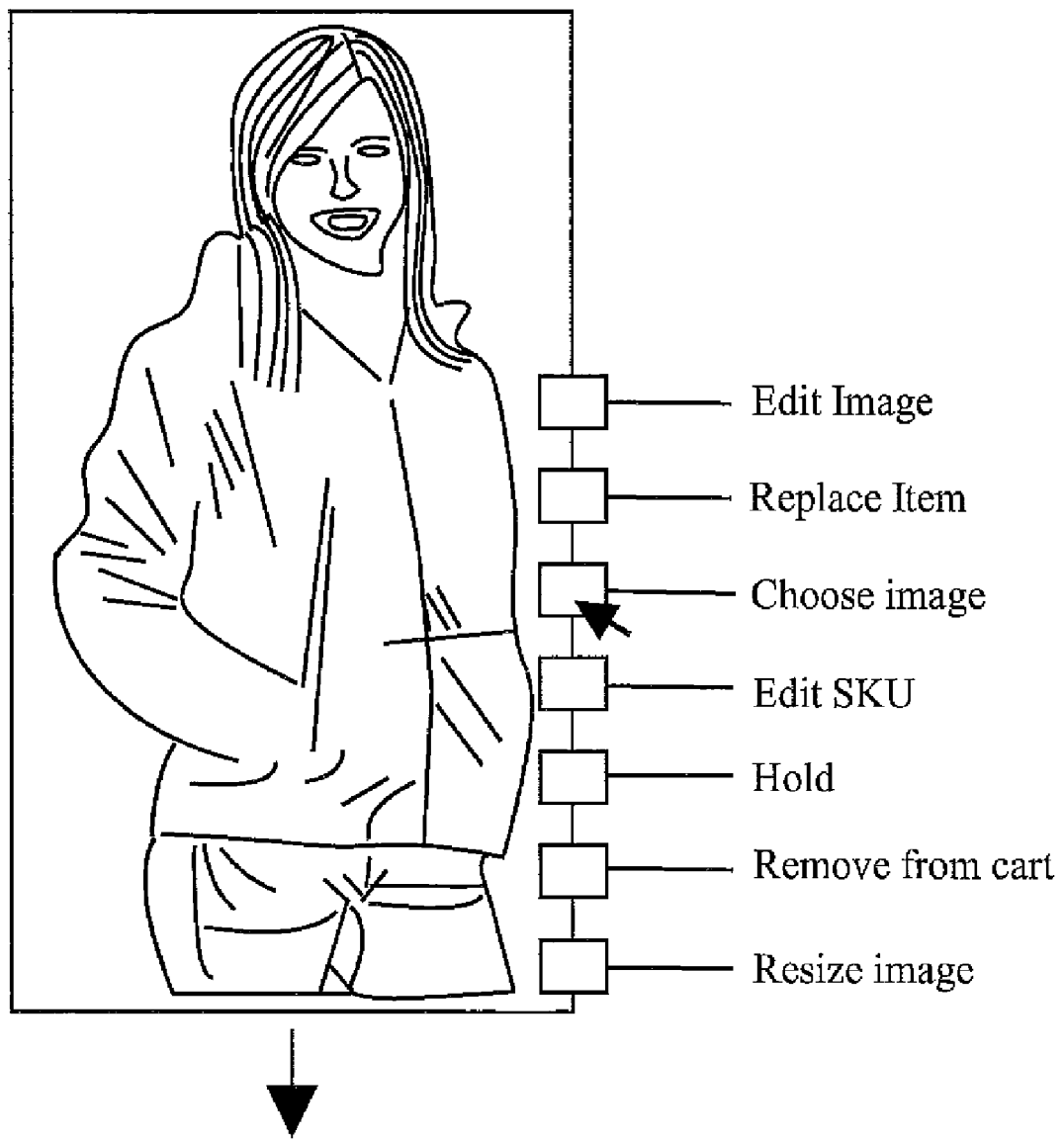
FIG. 28A is a front view of an image with a control strip having an element for choosing an image to represent a product.
Figure 28B:
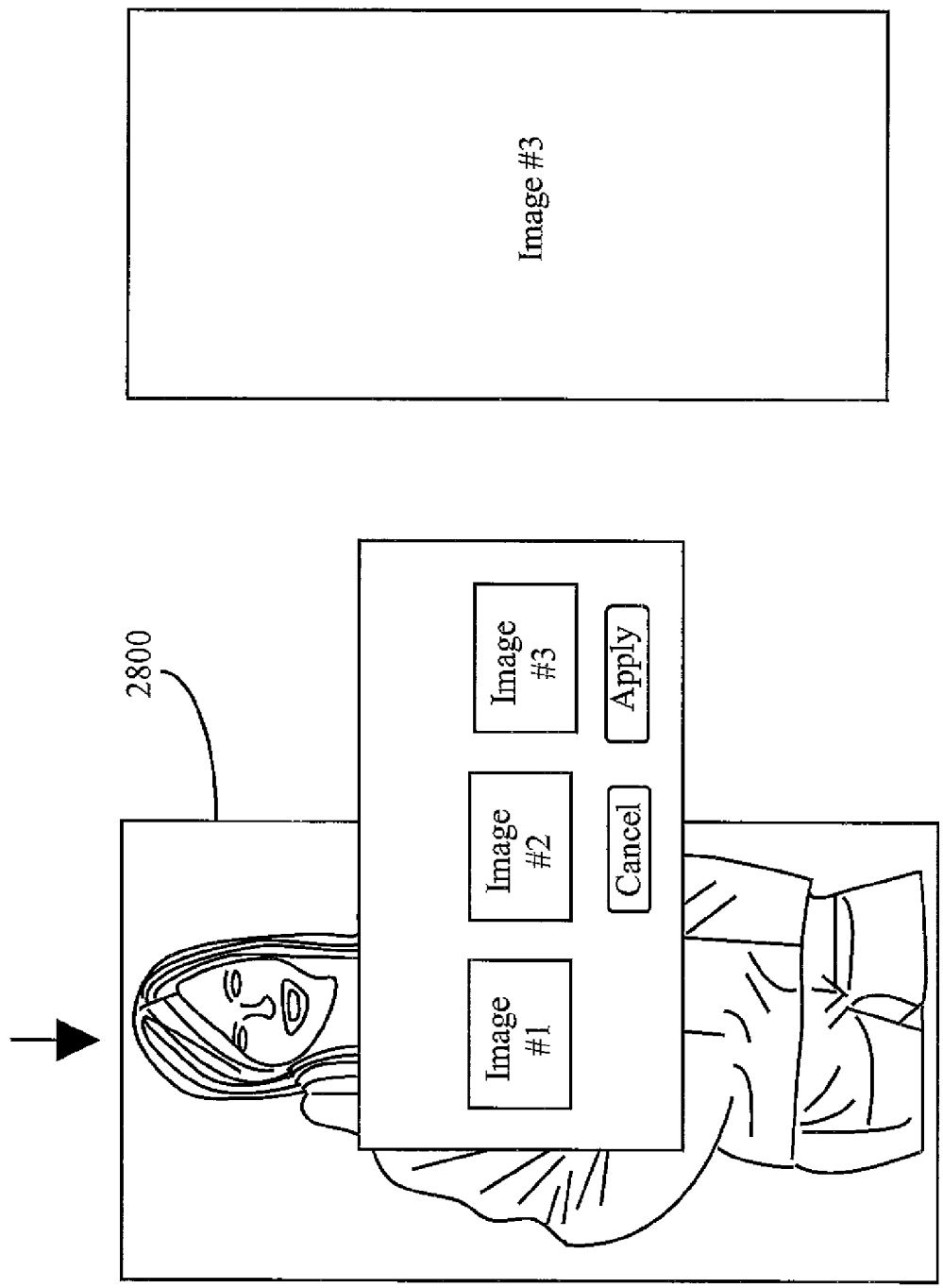
FIG. 28B is a front view of the image of 28A with candidate images displayed for selection of which image will represent a product.

FIG. 28A is a front view of an image 2800 with a control strip 2801 having an element for choosing an image to represent a product. FIG. 28B is a front view of the image of 28A with candidate images displayed for selection of which image will represent a product.

Referring now to FIG. 28A a product or SKU may be associated with more than one image. Control strip 2801 includes a "choose image' option (shaded). The "choose image" control option allows the user to select the image that is used for an item.

Referring now to FIG. 28B, the choose control option displays a selection dialog which lists the available images that can represent the product according to compatible SKU. If the user selects a new image, the client modifies the item description in its list of page elements to refer to the image ID of this new image; it encodes the image ID in a URL and updates the user interface element that displays this item to display the new URL; and it makes a request to the server that encodes the operation (SET_IMAGE), the item ID, and the image ID. In this example the images available for representing the product are images #1, #2, and #3.

The available images for a fully specified SKU are those listed for the SKU's product, and for the SKU itself. The images for an unspecified SKU are the images for any fully specified SKU that is compatible with the unspecified SKU. Two SKUs are compatible if every field that is not NULL in one SKU, has the same value in both SKUs. For example, a white size 8 shoe with product ID 1001 and merchant ID 31 is compatible with a size 8 shoe of unspecified color, with product ID 1001 and merchant ID 31, and also with a white shoe of unspecified size with this product and merchant ID, but not with any shoe that has a color that is not white, that has a size that is not 8, or that has a product ID other than 1001 or a merchant ID other than 31. If the user selects an image that is associated with a different SKU than the item's current SKU, the item's SKU is changed to this different SKU. This will be the case if the current SKU is underspecified, and the image is associated with a specific SKU.

In this example, a user has chosen image #3 by selecting an interactive control option labeled apply. The user may select another option cancel to cancel the transaction to the new image for product representation. In one embodiment, images selected for representing a product might include unique applications such as for example, a pair of shoes sitting on some stairs as one image, the same pair being worn in another image, and the same pair sticking partially out of a shoebox in another representation. Such renderings may be created and stored at the server and at the client.

In an alternate embodiment, the "Choose image" and "Edit SKU" interface elements are combined, and the list of available images for a SKU includes images from all other SKUs that are associated with the same product, even if the current SKU is fully specified. For example, the user could change the SKU from white shoes to red shoes but replacing an image of white shoes with an image of red shoes.

The system has information about how many users have chosen which images to represent each product. This information is present in the shopping cart table, and can be retrieved by selecting all shopping cart items that reference a specific SKU, or that reference SKUs of a particular product. This information can be used to select a default image for use in the representation of a particular product, when a user subsequently adds an item to the cart. In an alternate embodiment, this information is persisted even after an item has been removed from a cart, either explicitly or by buying it during the checkout process.

In an alternate embodiment, the user drags an item into a position within the display area of a distinguished user interface element, such as a trash can, in order to delete it from the page.

Figure 29A:
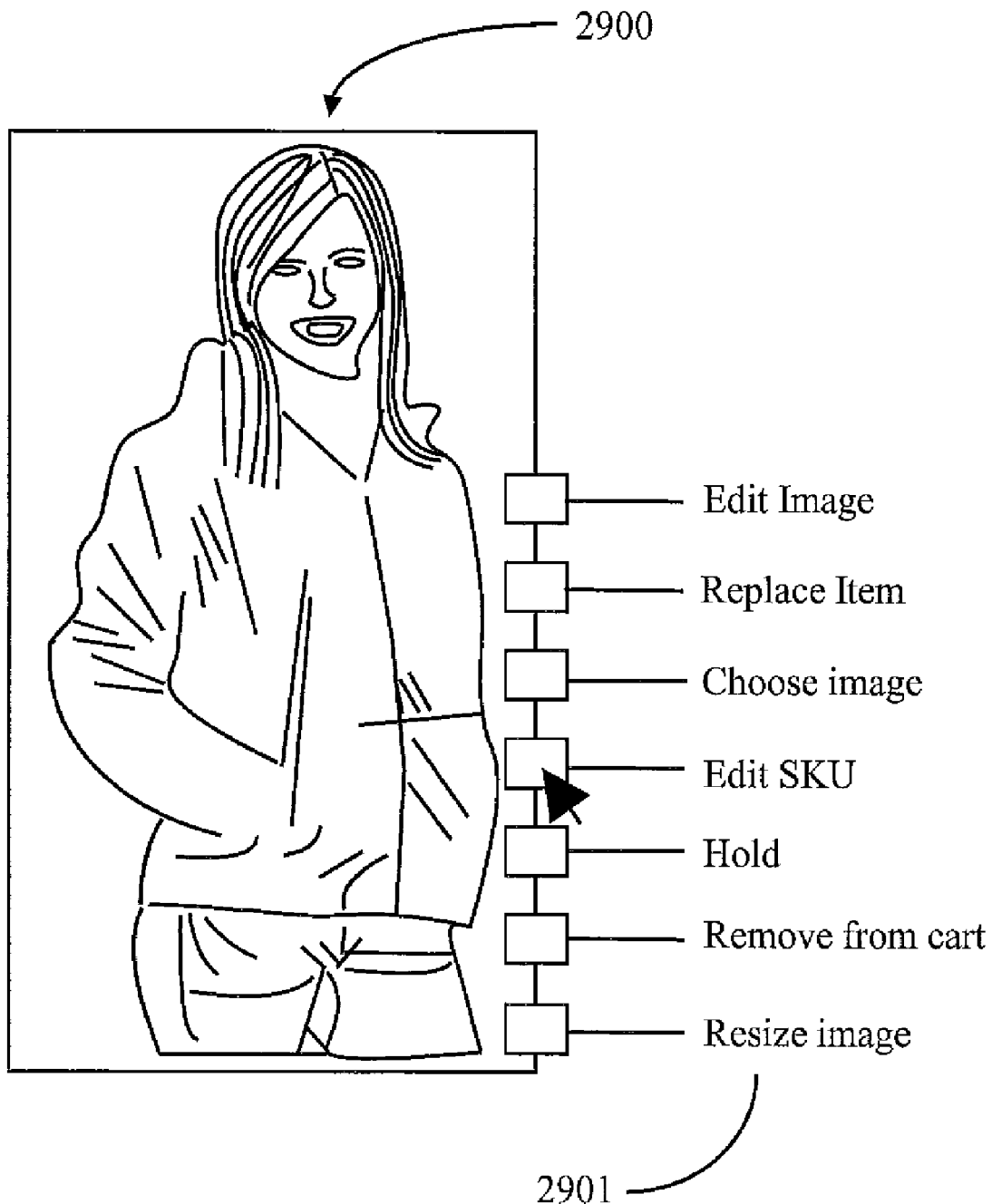
FIG. 29A is a front view of a product image 2900 having a control strip 2901 with an option for editing an SKU according to an embodiment of the present invention.
Figure 29B:
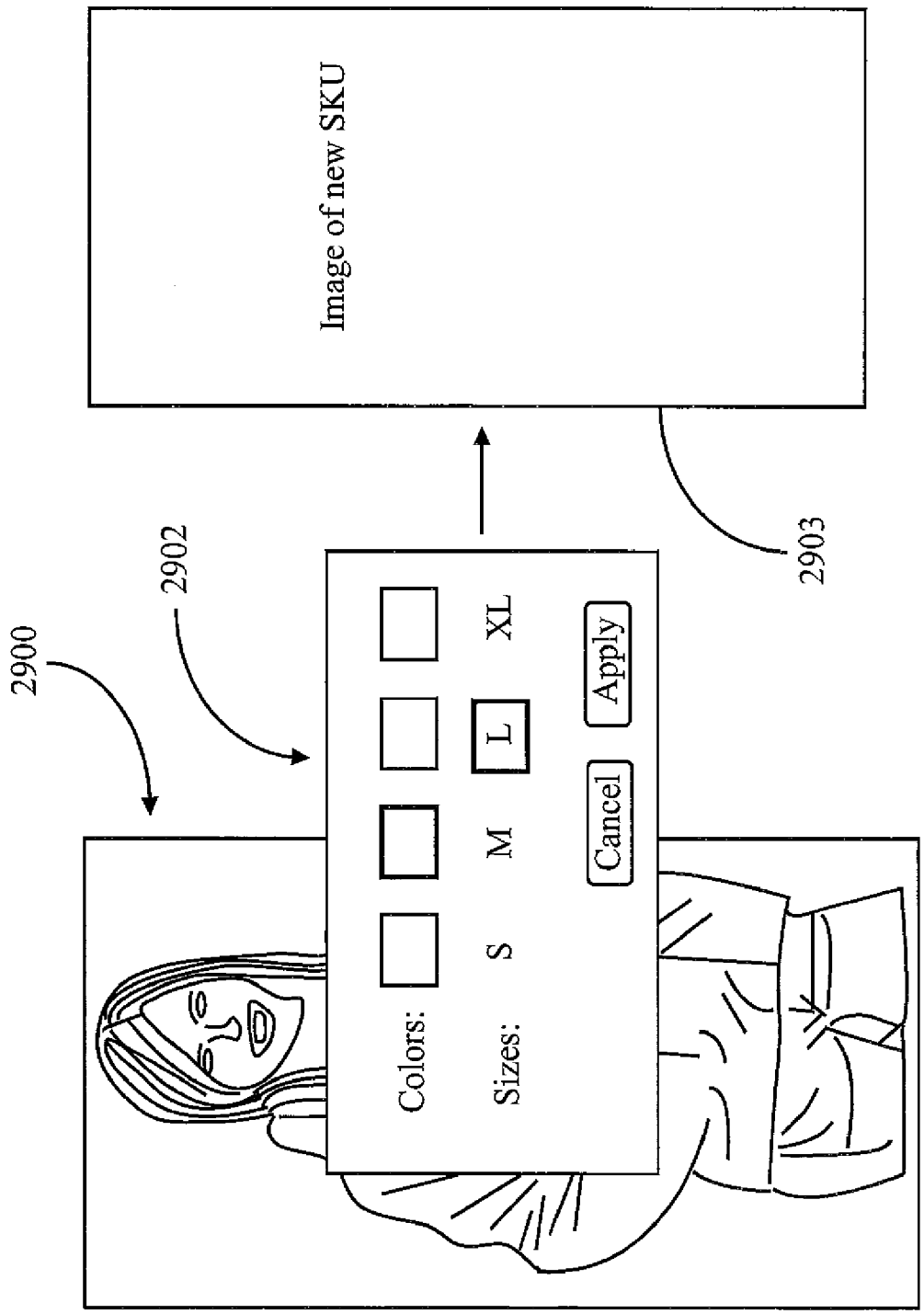
FIG. 29B is a front view of the image of FIG. 29A with an SKU edit panel displayed.

FIG. 29A is a front view of a product image 2900 having a control strip 2901 with an option for editing an SKU according to an embodiment of the present invention. FIG. 29B is a front view of the image of FIG. 29A with an SKU edit panel 2902 displayed.

Referring now to FIG. 29A, a user activates the "Choose SKU" option on control strip 2901 associated with image 2900. Mouse over can be used to highlight the control strip. Edit SKU is selected as illustrated by shading.

Referring now to FIG. 29B selecting the edit SKU option or "user control element" brings up a panel 2902 for changing aspects of the SKU. A user can change the color and size of the product in this example and can select "apply" or cancel. Selecting apply changes brings up a new image 2903 representing the product according to the new SKU.

Figure 30:
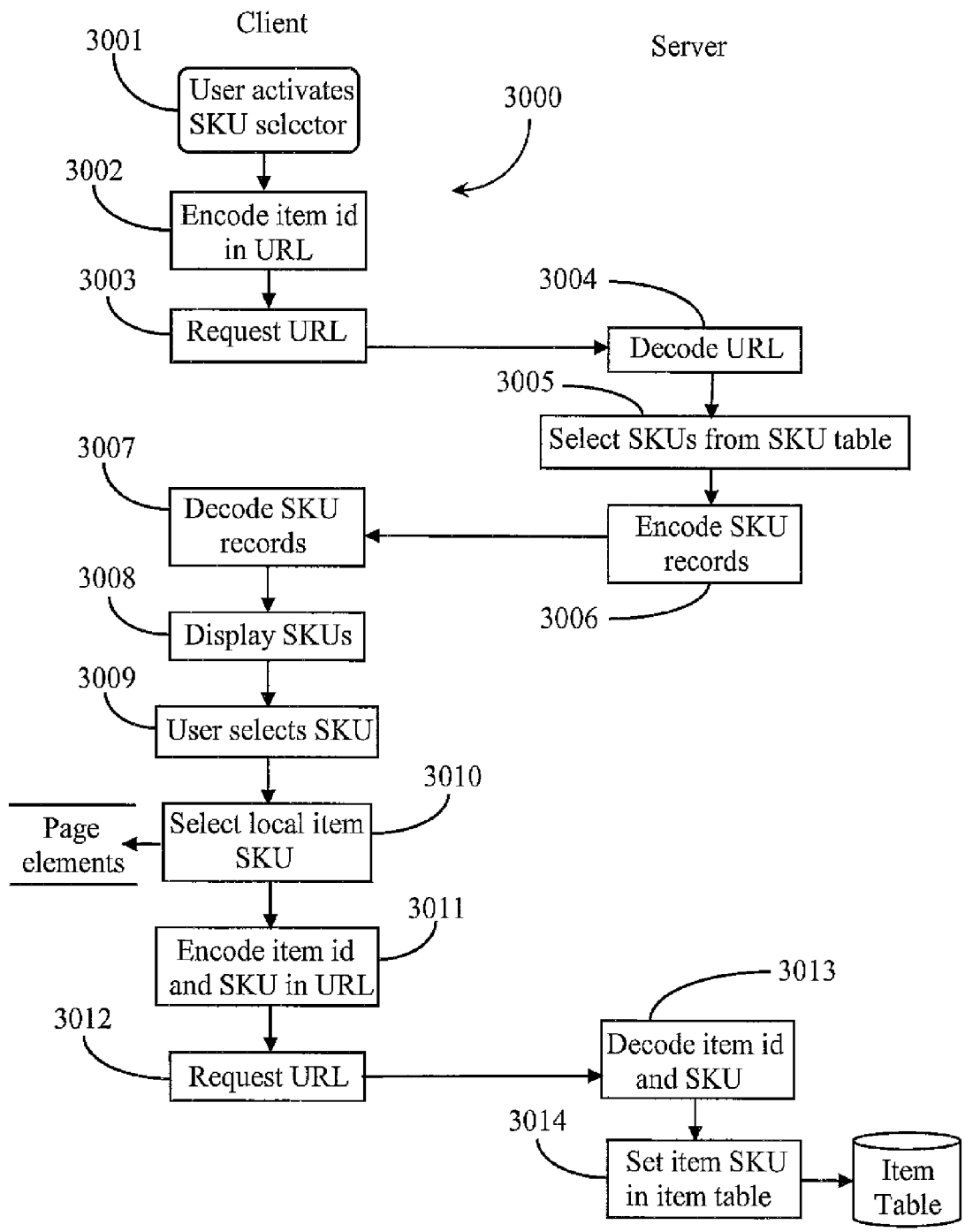
FIG. 30 is a process flow chart illustrating steps for editing an SKU according to an embodiment of the present invention.

FIG. 30 is a process flow chart illustrating steps 3000 for editing an SKU according to an embodiment of the present invention. The client requests a list of SKUs from the server. The server responds with a list of descriptions of SKUs. Each description includes a color description, size description, availability, and an optional image URL. The client displays an interface that allows the user to select a SKU. The client then updates the item record in the client item list with the selected SKU, encodes the item ID and the SKU ID in a URL, and requests this URL. The server decodes the item and SKU ID from the URL, and updates the item's SKU field to refer to the new SKU.

If the item was displaying the default image for the previous SKU, and the new SKU has a different image, the client may modify the item's image to refer to the image for the new SKU. The server updates the item in the server item table to refer to the new SKU's image under these same conditions.

More particularly at step 3001, the user activates the SKU selector or editor option illustrated above in FIG. 29A. At step 3002, the client encodes the item ID and URL. At step 3003, the client requests the URL. At step 3004, the server receives the request and decodes the URL. At step 3005, the server pulls SKUs from the SKU database or table. At step 3006, the server encodes the SKU records and sends them to the client per the URL request 3003.

At step 3007, the client receives the records and decodes them. At step 3008, the client displays the available SKU's in the user interface. The user may then select an SKU from the available options served at step 3009. The client then sets the local SKU for the item and stores the information in page elements. The client then encodes the new information namely ID, SKU, and URL at step 3011.

At step 3012, the client sends another URL request to update the server with the new data. The server receives the data and decodes it at step 3013 and stores the new SKU information in the item table or database at step 3014.

Figure 31A:
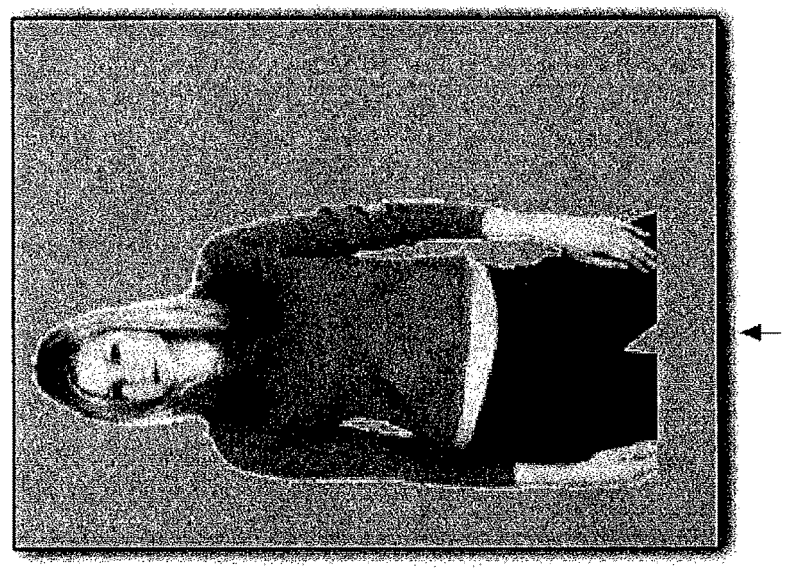
FIG. 31A is a front view of a product item having a control strip with an option for editing the transparency of the item image background according to an embodiment of the present invention.
Figure 31A:
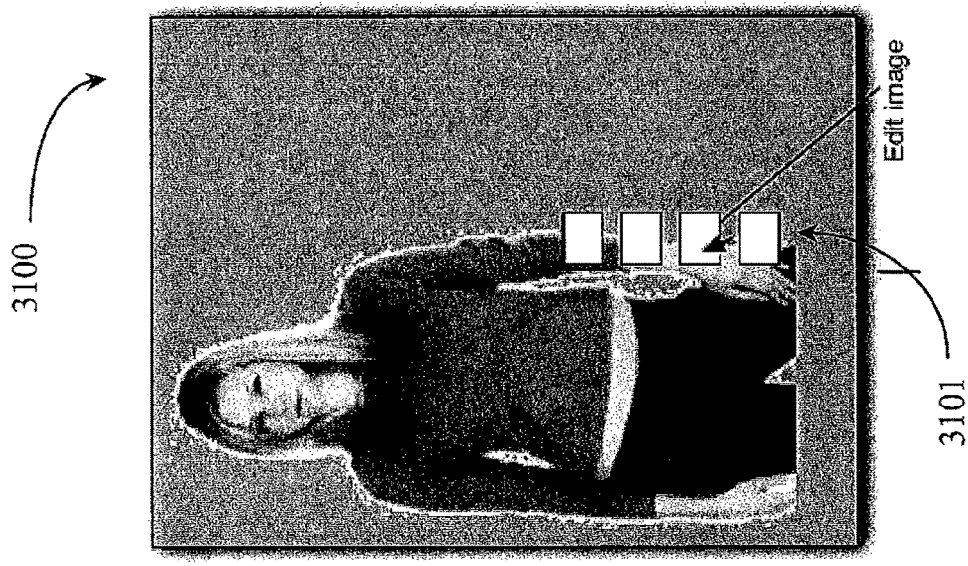
Figure 31B:
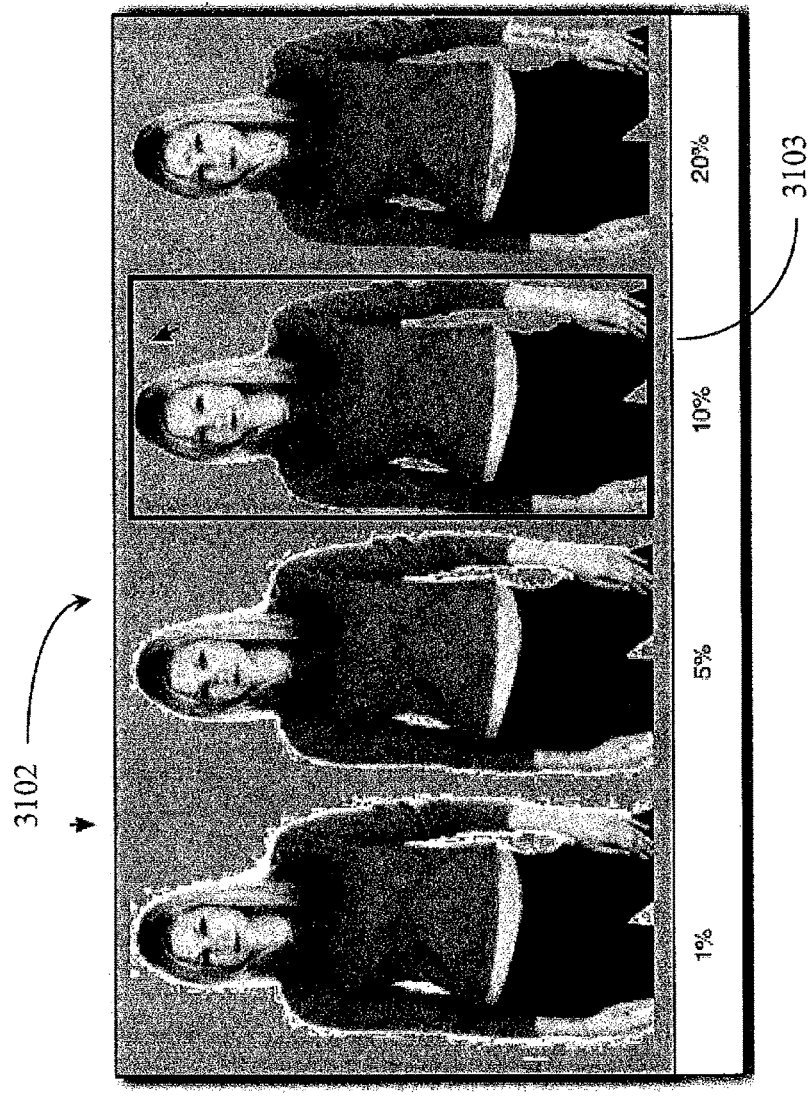
FIG. 31B is an array of selectable product images with varying degrees of transparency.

FIG. 31A is a front view of a product item 3100 having a control strip 3101 with an option for editing the transparency of the item image background according to an embodiment of the present invention. FIG. 31B is an array of selectable product images 3102 with varying degrees of transparency.

Referring now to FIG. 31A, the automatic image adjustment mechanism described further above that is used to add transparency to an image may not yield the best result every time. For example, original image 3100 has a poorly applied transparency against a gray background. The user can adjust the parameters of the image adjustment algorithm. By selecting adjust transparency manually from the control strip 3101. To the right, an image with better transparency is displayed.

Referring now to FIG. 31B, the user activates the control element "adjust transparency" that displays alternate adjusted images in an image panel 3102. The user may then select the best resulting image, and this image, image 3103, is subsequently used to represent the product, as shown at right in FIG. 31A.

In general when a user selects an alternate image adjustment, an image with this adjustment is added to the edited items database. This image subsequently becomes available as an image to represent this product. Edits made by one user thus add to the available default images available to subsequent users. In conjunction with the information collected about the frequency of different images to represent different products, an edited image can even be used as the default image when a product is newly added to a shopping cart. Edited image data stored from frequent user edits can be used to refine the automatic mechanism for creating the first transparency in new images. In addition to product images, the collage can contain decorative elements. This section describes the operation of the commands that add these decorative elements to the shopping cart page.

Figure 32A:
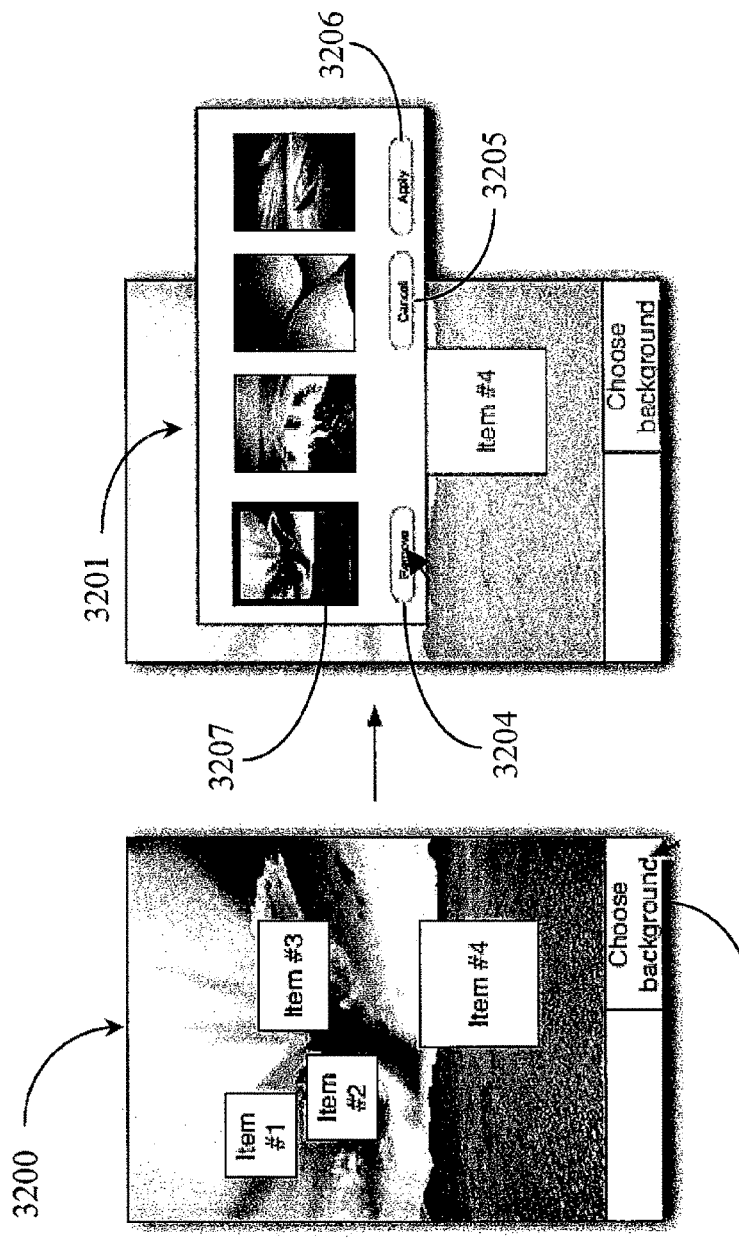
FIG. 32A is a front view of a shopping cart collage 3200 with a background replacement control element 3203 for changing the background of the collage.
Figure 32B:
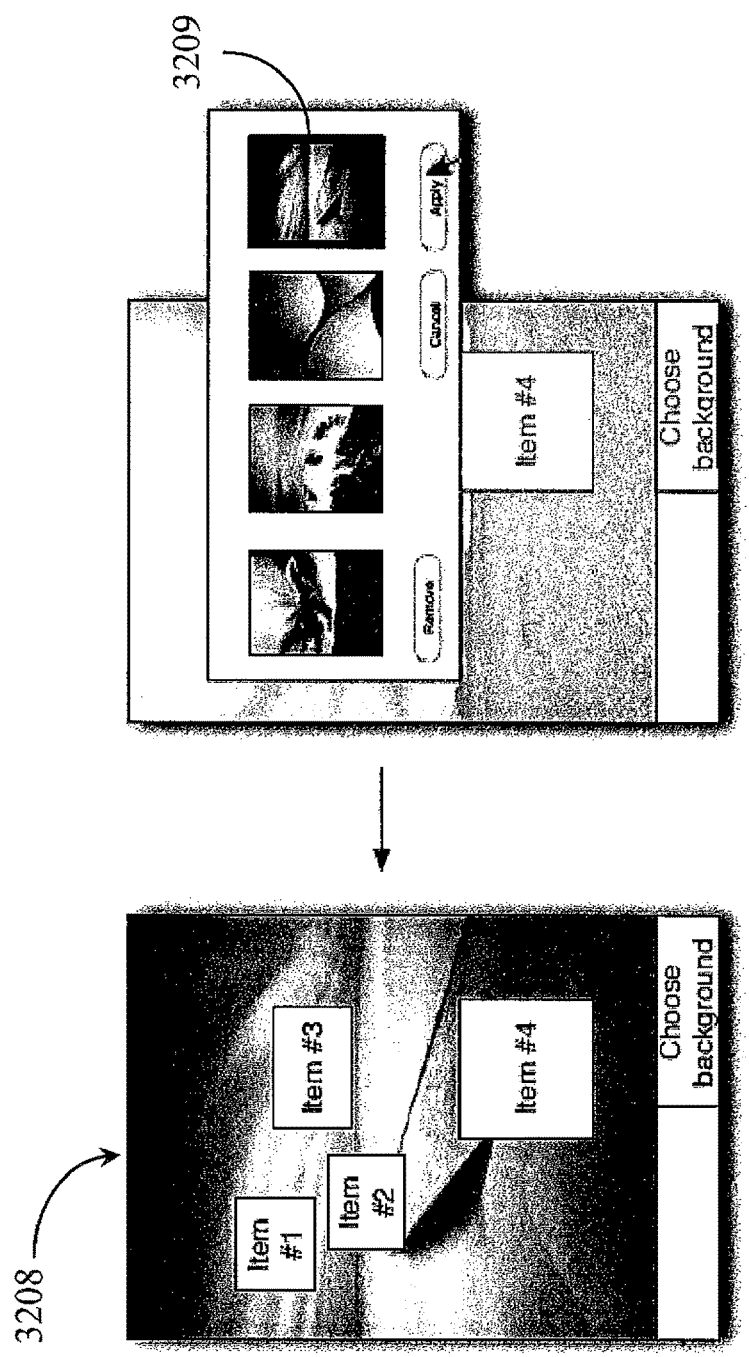
FIG. 32B is a front view of a collage 3208 with a new background.

FIG. 32A is a front view of a shopping cart collage 3200 with a background replacement control element 3203 for changing the background of the collage. FIG. 32B is a front view of a collage 3208 with a new background.

Referring now to FIG. 32A, the user interface (shopping cart space) 3200 includes a user interface element 3203 for changing the background image for the collage or page. Selecting "Choose Background" 3203 brings up a panel 3201 of available decorative backgrounds served to the interface for user selection. In this example, a background 3207 represents the existing background. Panel 3201 includes a button 3204 for removing the existing panel, which is highlighted by a strong border in this example. Clicking on remove deletes the old background. Panel 3201 includes a cancel option 3205 and an apply option 3206 for applying a new selected background to replace the old background.

Referring now to FIG. 32B, new collage 3208 is created by selecting a new background in panel 3201 and clicking on "apply" to insert the background image into the collage space underlying the collage items placed in the shopping cart. Backgrounds with branding, or other themes can be provided. In one embodiment, a background can be an animation without departing from the spirit and scope of the present invention.

Figure 33:
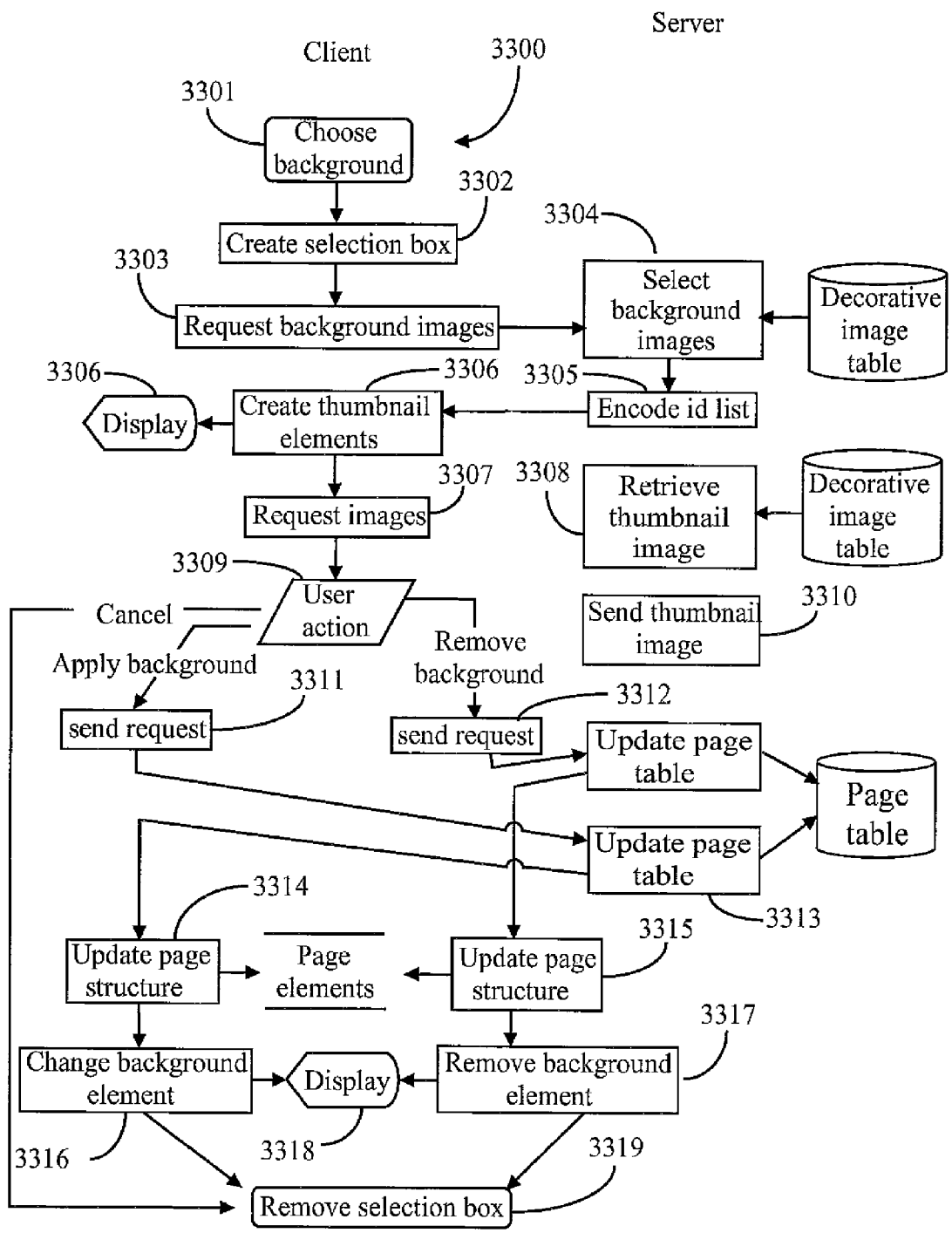
FIG. 33 is a process flow chart illustrating steps for changing a decorative background for a shopping cart collage according to an embodiment of the present invention.

FIG. 33 is a process flow chart illustrating steps 3300 for changing a decorative background for a shopping cart collage according to an embodiment of the present invention. At step 3301 a client chooses background control element. At step 3102 the action invokes a selection box. At step 3303, the client requests available backgrounds from the server.

At step 3304, the server selects background images from a decorative image table. At step 3305, the server encodes and records the ID list of the images to be served. At step 3308, the server retrieves the thumbnail image to serve. At step 3310 the thumbnail image of the background is served. The client receives the server response at step 3306. Those are displayed at step 3320 for selection. At step 3307 the client requests the images.

User action begins at step 3309 in terms of removing or applying a new background image. At step 3312, the user may click "remove" existing background. This is a request to the server that gets recorded server side at step 3313 (update page table) and then a response from the server arrives at step 3315 to update local page elements at step 3314.

Similarly if the user selects apply background at step 3311, all of the server side and client side interaction steps also occur. The resulting display steps are 3317 where the existing background is removed and 3316 where the new background is displayed. Finally, the selection panel is removed in step 3319. T step 3309, if the user selects cancel, the selection box is removed at step 3319 and the original background remains.

It is noted herein that the synchronization of the process may be such that first a user has to remove an existing background before selecting and applying a new background. In one embodiment, applying a new background may be default result in automated overwrite of any background that was there before.

In general when the user activates the choose background option or element, the client requests a list of background images from the server. The server selects the images from the decorative image database that have the "background image" flag, and returns a list of the identifiers of these images to the client.

The client displays a selection box that contains a user interface element for each image, and sets the image source for each element to the request URL for the image with the corresponding ID. The server responds to each request with the thumbnail for the corresponding image. If the user activates the Cancel control, the selection box is removed from the screen.

If the user activates the Remote control, the client sends a request that encodes the REMOVE_BACKGROUND operation to the server; the server sets the background field of the selected page to NULL; the client sets the background property of the current page to nil; and the client removes the background image from the display.

If the user clicks on an image and then on the Apply control, the client sends a request that encodes the SET_BACKGROUND operation and the background image ID to the server; the server sets the background field of the selected page to the background image ID; the client sets the background property of the current page to the background image ID; and the client adds an image to the display whose source is the URL that encodes the background image ID.

One who is familiar with the art will also appreciate that the above algorithm can be extended with standard database and request paging techniques and with scroll bars or "next page" and "previous page" controls to accommodate a list of background images that is larger than will fit in the background selection box.

Figure 34A:
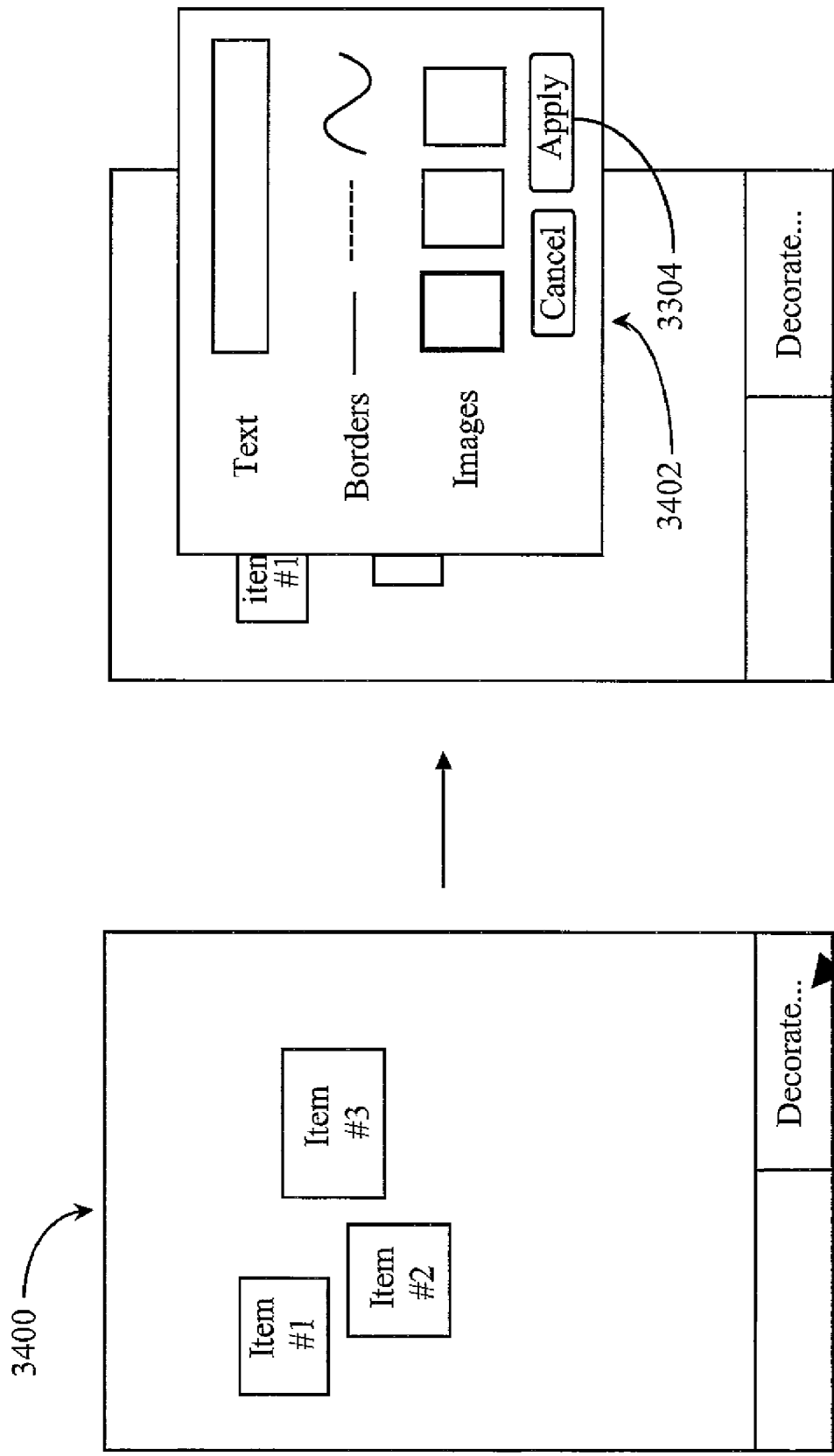
FIG. 34A is a block diagram illustrating a shopping cart collage view with a user control element for adding a decorative vector image to the display.
Figure 34B:
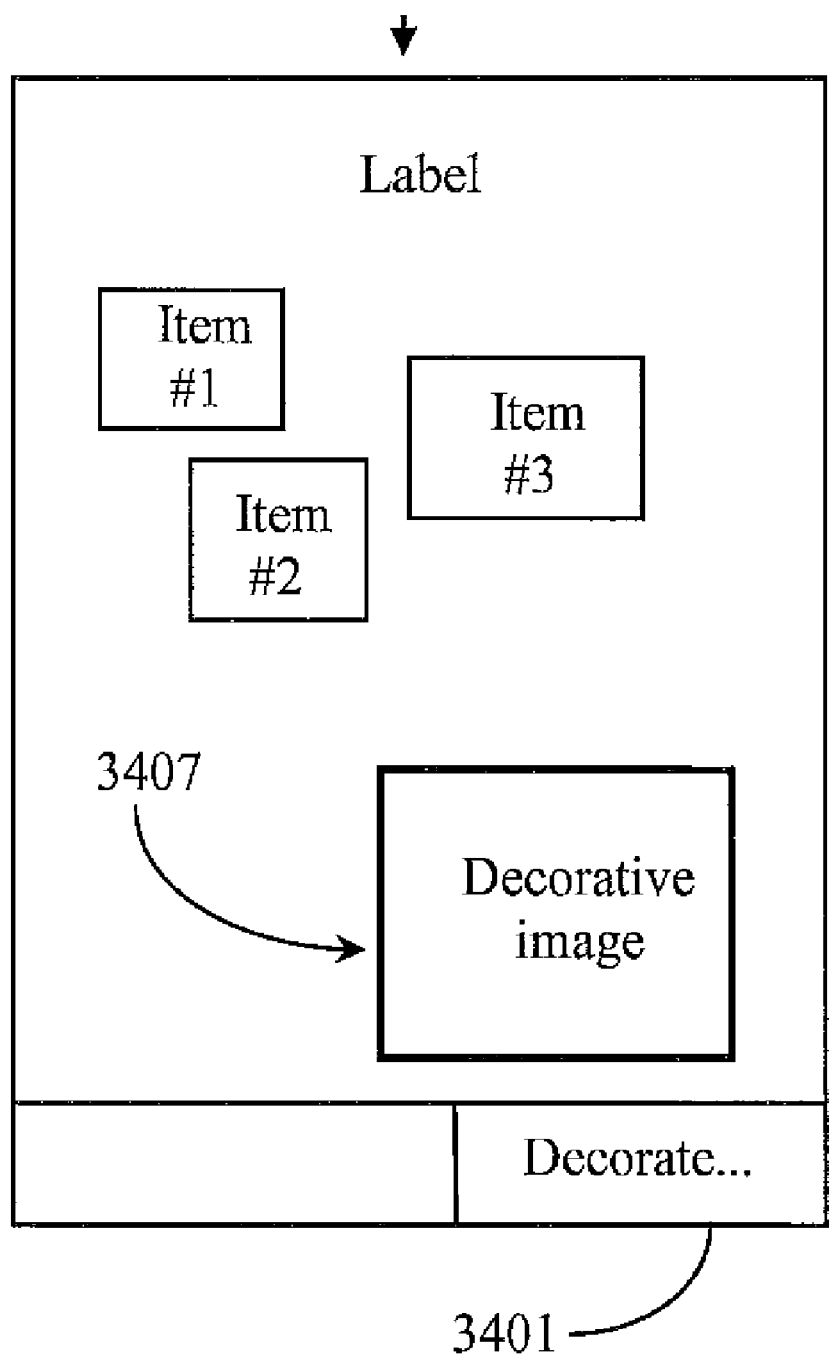
FIG. 34B is a block diagram illustrating the addition of the vector image to the display of FIG. 34A.

FIG. 34A is a block diagram illustrating a shopping cart collage view with a user control element for adding a decorative vector image to the display. FIG. 34B is a block diagram illustrating the addition of the vector image to the display of FIG. 34A.

Referring now to FIG. 34A, the user can add decorative images to a page of the shopping cart. These elements can be bitmap images, which are selected from a database of decorative images, or vector images, which are specified as a type of image such as line, box, or text, together with parameters that specify how the image is rendered.

Collage view 3400 includes a user interface element 3401 "decorate". The control is a user interface for selecting a decorative image to add to a page of a shopping cart. Selecting the user interface bring up a box or panel 3402 that the user works in to select or define a decorative image for application into the shopping cart interface. The user selects an image from this panel.

If the image is a vector image type, the user additionally specifies image parameters such as color, line width, and text content. The system adds a page element with this image to the page, at a computed initial position and size which the user can then modify as with any page element. In this case, panel 3402 contains the options decorative text, decorative borders, and decorative images. A cancel button 3403 and an application button "apply" °.

Referring now to FIG. 34B, the final result of selecting a decorative element from panel 3402 is the display of the decorative element or image 3407 as is the case here.

Figure 35:
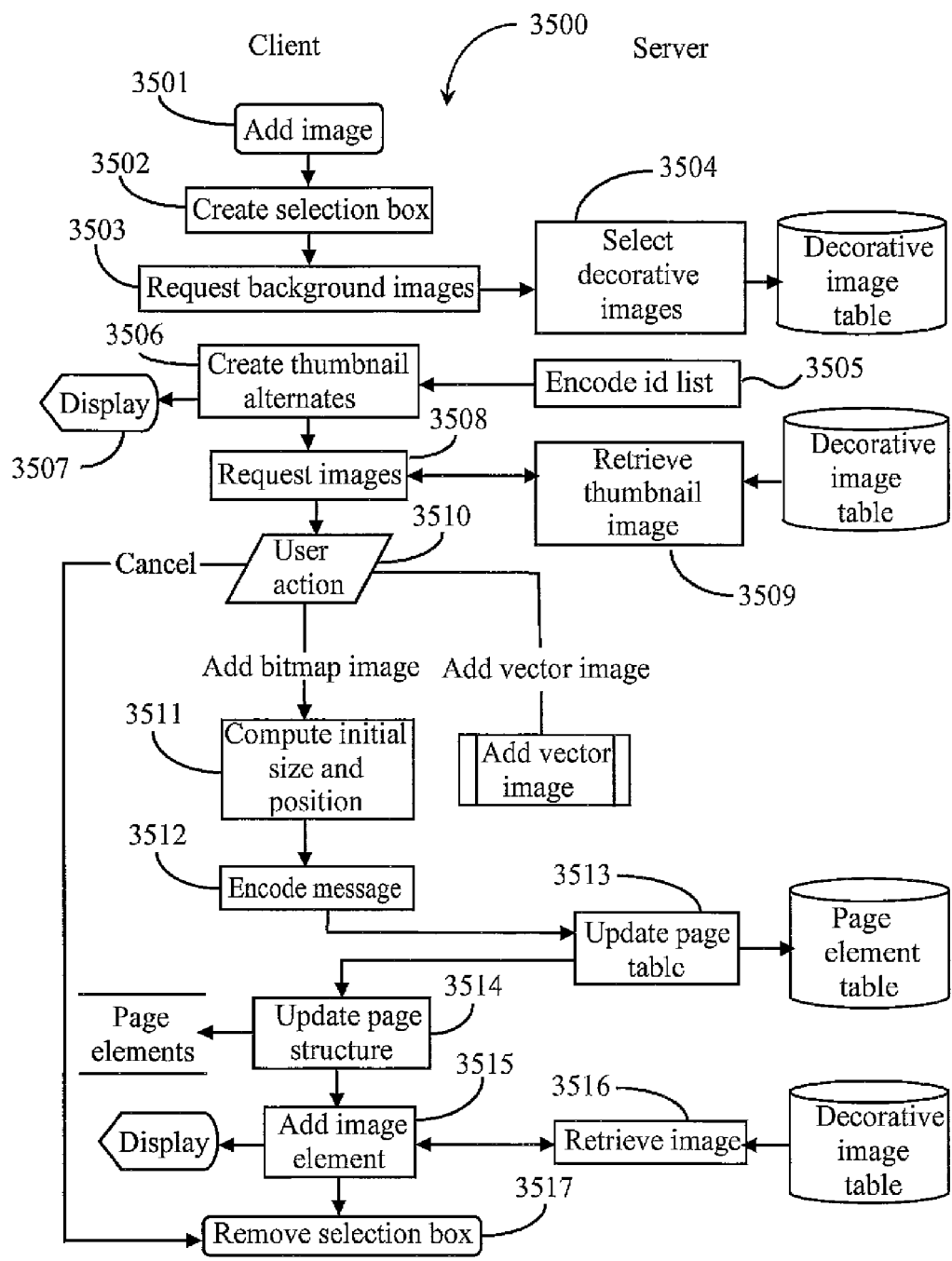
FIG. 35 is a process flow chart illustrating steps for ordering a decorative element in the form of a bitmap image to display in a shopping cart according to an embodiment of the invention.

FIG. 35 is a process flow FIG. 34A is a block diagram illustrating a shopping cart collage view with a user control element for adding a decorative vector image to the display. FIG. 34B is a block diagram illustrating the addition of the vector image to the display of FIG. 34A.

FIG. 35 is a process flow chart illustrating steps 3500 for ordering a decorative element n the form of a bitmap image to display in a shopping cart according to an embodiment of the invention. T step 3501 the user selects add image. At step 3502, the selection panel is generated. At step 3503, the client may request available images including background images from the server.

At step 3504, the server selects images, encodes them in step 3505 and sends them in a response to the client. At step 3508, the client requests thumbnail images. At step 3509, the server retrieves and sends the thumbnail images representing the real images.

At step 3510 the user initiates a selection action. In this step the user may select to add a bitmap image. An alternative is to add a vector image. That case is presented later in this specification. A step 3511, the client computes the position in the shopping cart space where the image will be added. At step 3512 the client sends an encoded message to the server to update the page element table with the new "add data".

At step 3514, the local database is updated. At step 3515, the image is added and displayed. In one case the image is served at step 3516 directly from the decorative image table. At step 3517, the image selection panel is removed.

In general use when the user activates the user interface control for adding an image, the client creates a selection box, and requests a list of decorative images from the server. The server selects the images from the decorative image database for which the "background image" flag is not set, and returns a list of the identifiers of these images to the client. The client displays a selection box that contains a user interface element for each image, and sets the image source for each element to the request URL for the image with the corresponding id. The server responds to each request with the thumbnail for the corresponding image. If the user activates the Cancel control, the selection box is removed from the screen. If the user selects a vector image, the flow of control continues at the "Add vector image", which is detailed in a subsequent diagram.

If the user selects an image, the system computes an initial size and position for that image. It encodes the ADD_IMAGE operation, the image id, and the size and position, and sends this message to the server. The server creates a new page element with these values, and returns the id of the element to the client. The client inserts a new page element with the page element id, the image id, and the size and position, into the client page element list. It then creates a user interface element whose image is sourced at a URL with the encoded image id, and inserts it into the display list. This creates a request to the server for the image. Finally, the client removes the image selection box. One who is familiar with the art will also appreciate that the above algorithm can be extended with standard database and request paging techniques and with scroll bars or "next page" and "previous page" controls to accommodate a list of images that is larger than will fit in the background selection box.

Figure 36A:
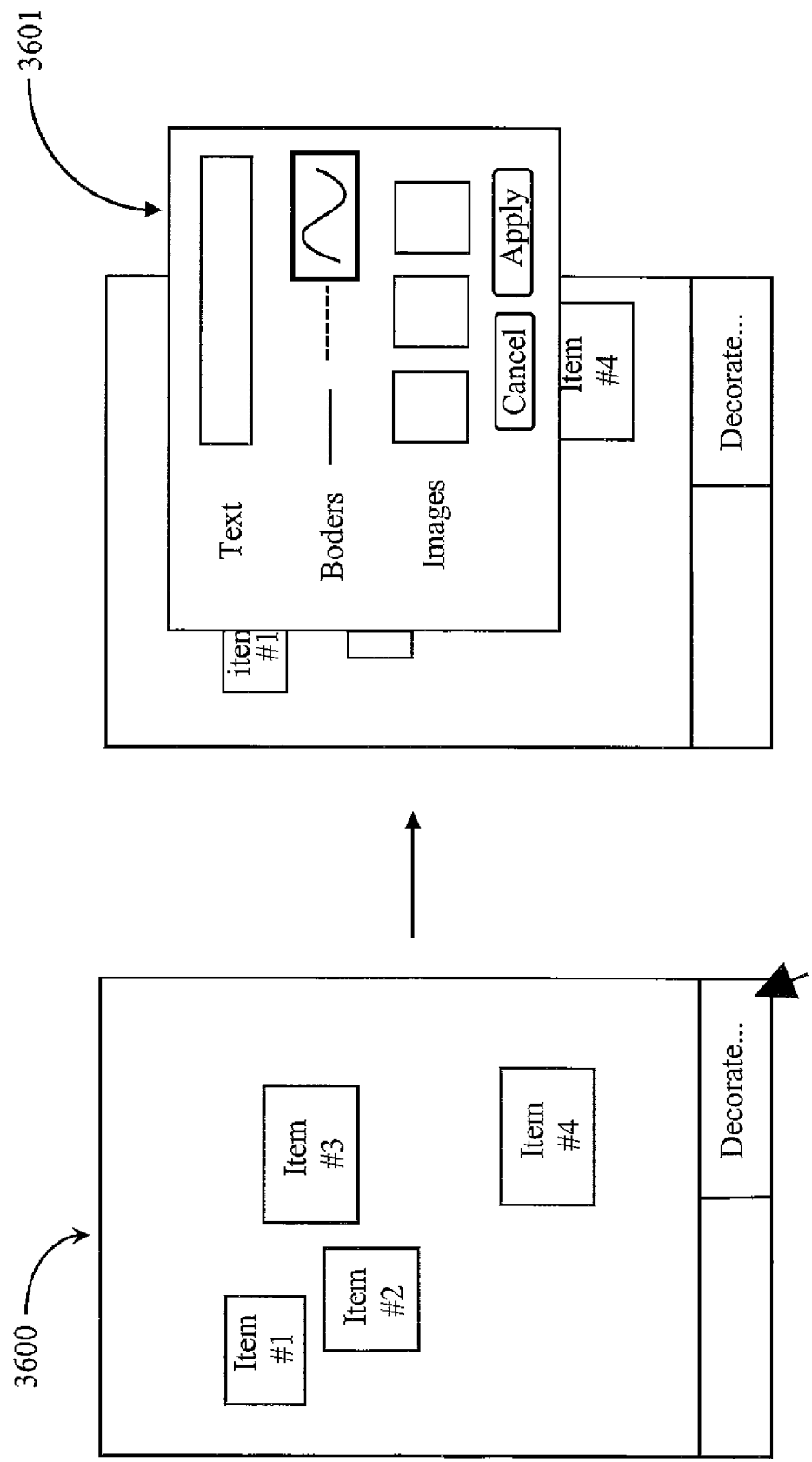
FIG. 36A is a front view of a collage view 3600 of a shopping cart with a control element for invoking an add vector image panel 3601.
Figure 36B:
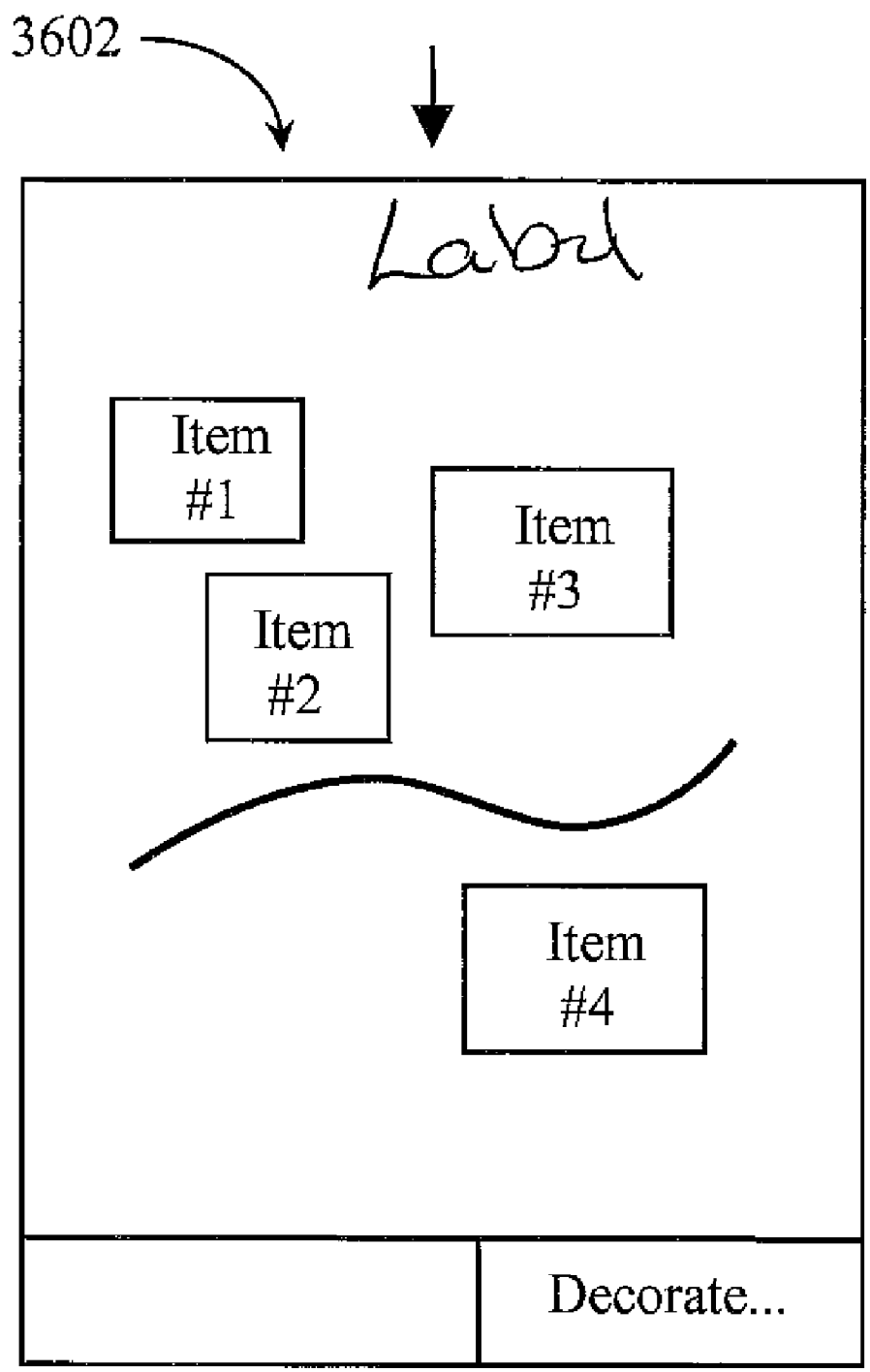
FIG. 36B is a front view of the interface of FIG. 36B with a vector image added.

FIG. 36A is a front view of a collage view 3600 of a shopping cart with a control element for invoking an add vector image panel 3601. FIG. 36B is a front view of the interface of FIG. 36B with a vector image added.

Referring now FIG. 36A, the interface is similar if not identical to the interface illustrated further above. Interface 3600 is a shopping cart interface presenting a collage view including a decorative image add button or control for adding a vector image to the collage space. As described above for background or bitmap addition, selecting the control brings up a separate image selection panel 3601. Panel 3601 includes options for text, borders and images as described earlier, and a cancel and apply button.

Referring now to FIG. 36B, the result of user selection in panel 3601 is an added vector image displayed within the shopping cart space (3602).

Figure 37:
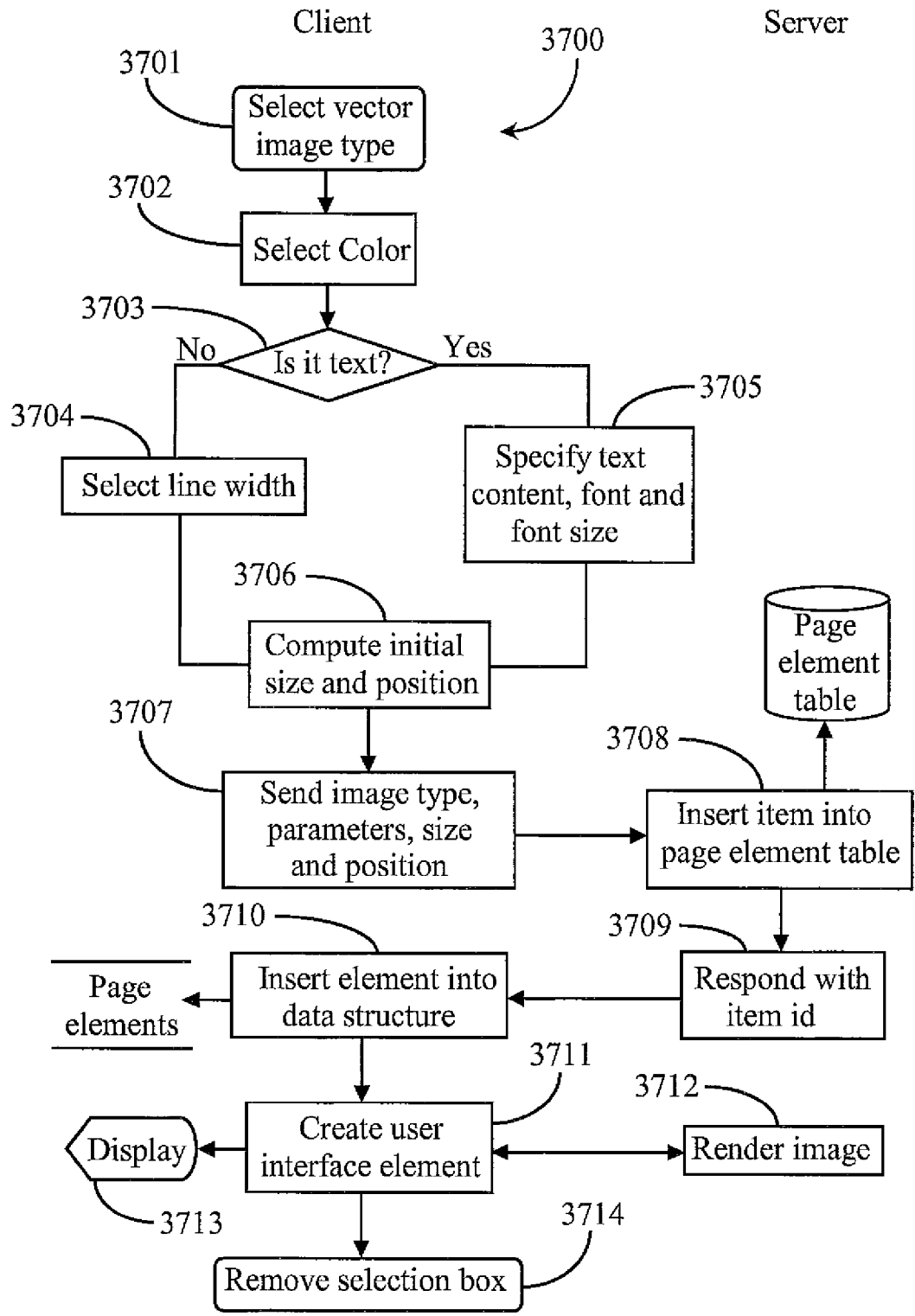
FIG. 37 is a process flow chart illustrating steps 3700 for adding a vector image to a shopping cart collage.

FIG. 37 is a process flow chart illustrating steps 3700 for adding a vector image to a shopping cart collage. The process is very similar to the process for adding a bitmap image. The process assumes that the vector selection panel is activated and displayed. At step 3701, the user selects a vector image type. At step 3702, the user selects a color. At step 3703 the client determines if it is a text vector image. If it is, the process moves to step 3705 for specifying text content, font style, and font size. At step 3703, if it is a border, then at step 3704, the user selects line width.

The process then moves to step 3706 where the client computes initial size of the image and the position in the collage space where it will be added. At step 3707, the client sends all of the data to the server where at step 3708, the server inserts the item into the page element table.

At step 3709, the server responds with an item ID. At step 3710, the client inserts the item into page elements. At step 3711, the client creates a user interface element to render the image. At step 3712, the image is rendered to the client from the server and displayed on the client device in the collage at step 3713. At step 3714, the selection panel is removed from the interface or hidden as the case may be.

In general application, once the selection box has been displayed and the user has selected a vector image type. The user selects the color of the image. If the image type is text, the user specifies the font, font size, and text content; otherwise, the user selects a line width. These are the image parameters. The system computes an initial size and position for the image. It encodes the image type, parameters, size, and position in a message, which it sends to the server.

The server creates a new page element with these attributes, and responds with the page element ID. The client inserts a page element with this ID into the page element list, and creates a user interface element whose image source is a URL that encodes the page element ID and size, and that is positioned and sized according to the position and size computed earlier. The addition of the user interface element to the display list causes the client to request the image from the server, and finally removes the image selection box.

When the server receives a request for a vector image, it retrieves the image type and properties from the image table. It uses these properties together with the image size to create a bitmap image, which it then sends to the client. The client displays the image. One who is versed with the art will appreciate that the rendered image can be cached on the server.

Figure 38A:
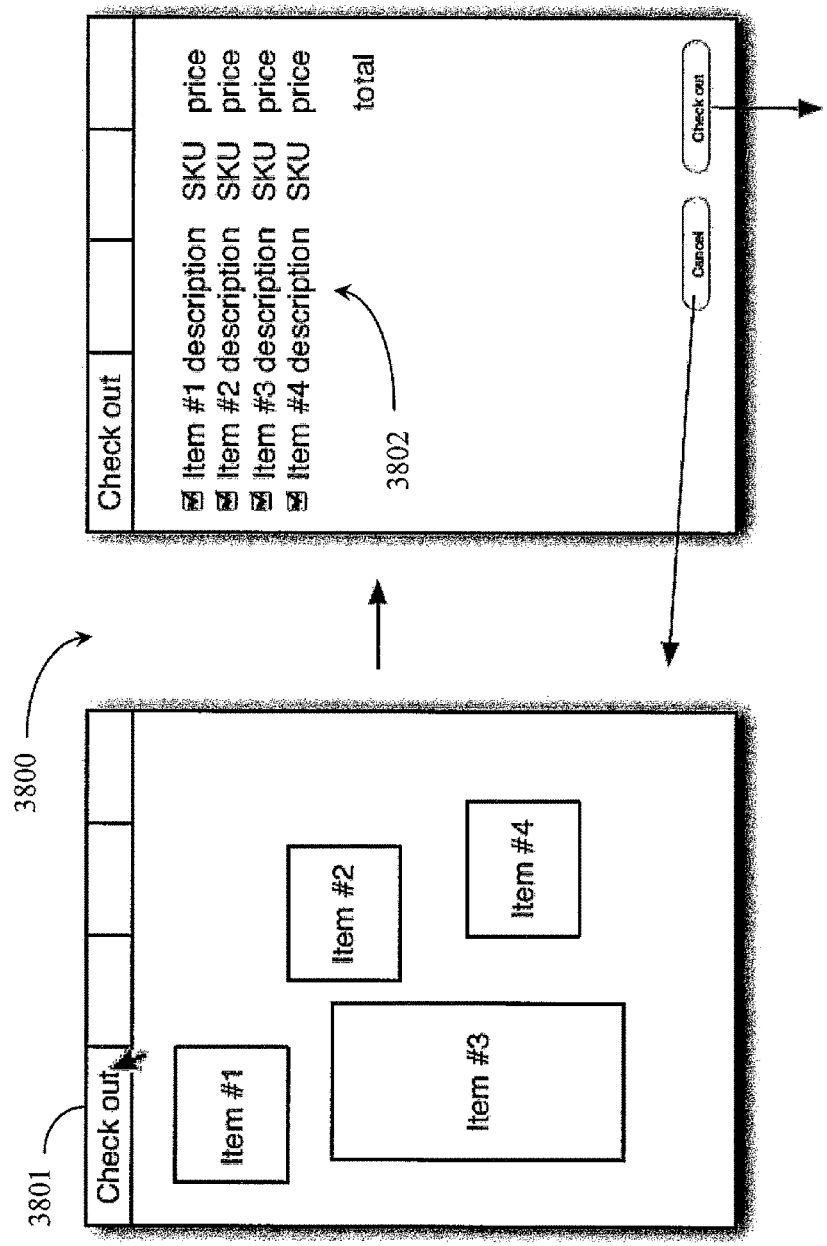
FIG. 38A is a front view of a shopping cart collage with a checkout control for proceeding to checkout according to an embodiment of the present invention.
Figure 38B:
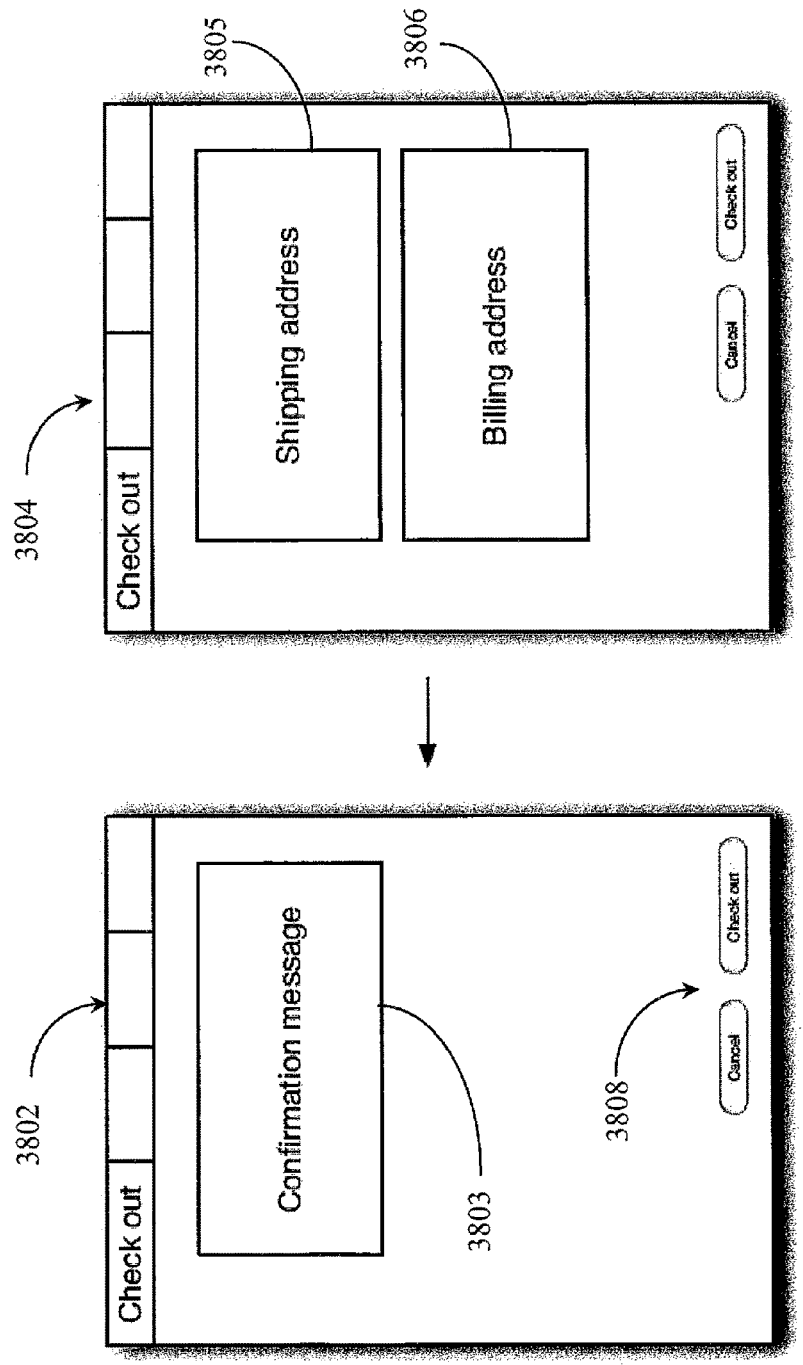
FIG. 38B is a front view of the shopping cart of FIG. 38A in various stages of checkout process.

FIG. 38A is a front view of a shopping cart collage with a checkout control for proceeding to checkout according to an embodiment of the present invention. FIG. 38B is a front view of the shopping cart of FIG. 38A in various stages of checkout process.

Referring now to FIG. 38A, collage view 3800 includes a user interface control 3801 for initiating checkout process. The items in the collage may be converted to listed items as shown in a checkout list 3802 in the shopping cart view to the right. Each line item includes a product description, the SKU, the unit price. The items are then totaled. User interactive buttons cancel and checkouts are presented at the bottom of the cart.

User control elements may, in some cases be generated and served to the client interface for display and interaction by the user. In some cases the interface controls are hidden until the user activates them by mouse-over.

Referring now to FIG. 38B, a view 3802 is illustrated with a checkout confirmation message 3803 illustrated within the space of the interface. Buttons 3808, cancel and checkout are still visible in the view throughout the checkout process. To move on the user selects the checkout option or in some cases the option is labeled "continue" or "continue to checkout".

In view 3804, the user enters a shipping address in a provided field 3805 and a billing address in a provided field 3806. In one embodiment, these fields are already populated by the server but just need to be confirmed by the user before continuing to checkout.

Figure 39:
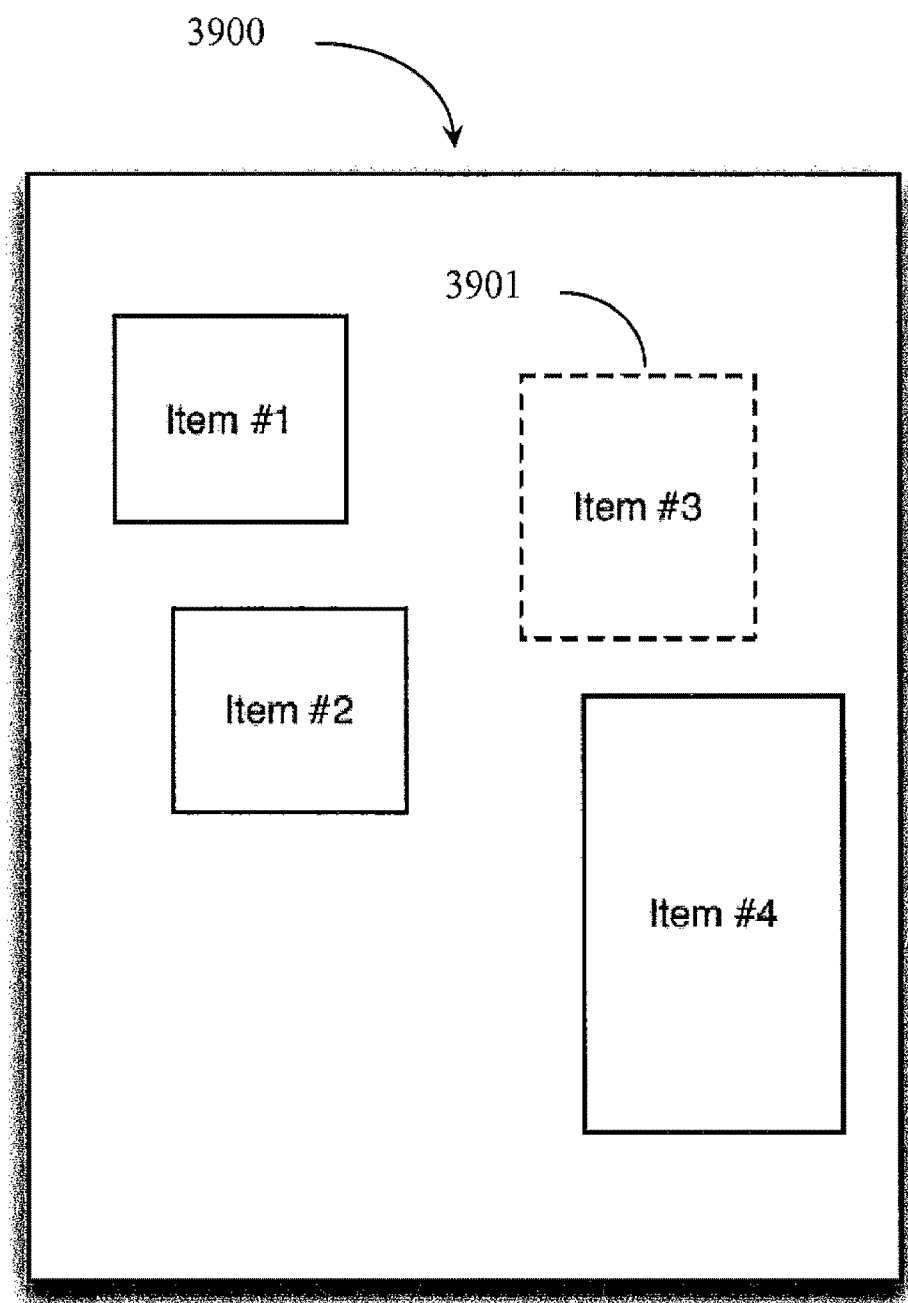
FIG. 39 is a front view of a shopping cart collage illustrating an item placed in the cart that is unavailable.

FIG. 39 is a front view of a shopping cart collage illustrating an item placed in the cart that is unavailable. In one embodiment, a user may place an item in the shopping cart of the invention and the item might become unavailable some time after the item was placed in the cart but before checkout. View 3900 illustrates item 3901 with a dotted border indicating that the item is no longer available. Many other visual notifications of this state maybe used.

Figure 40:
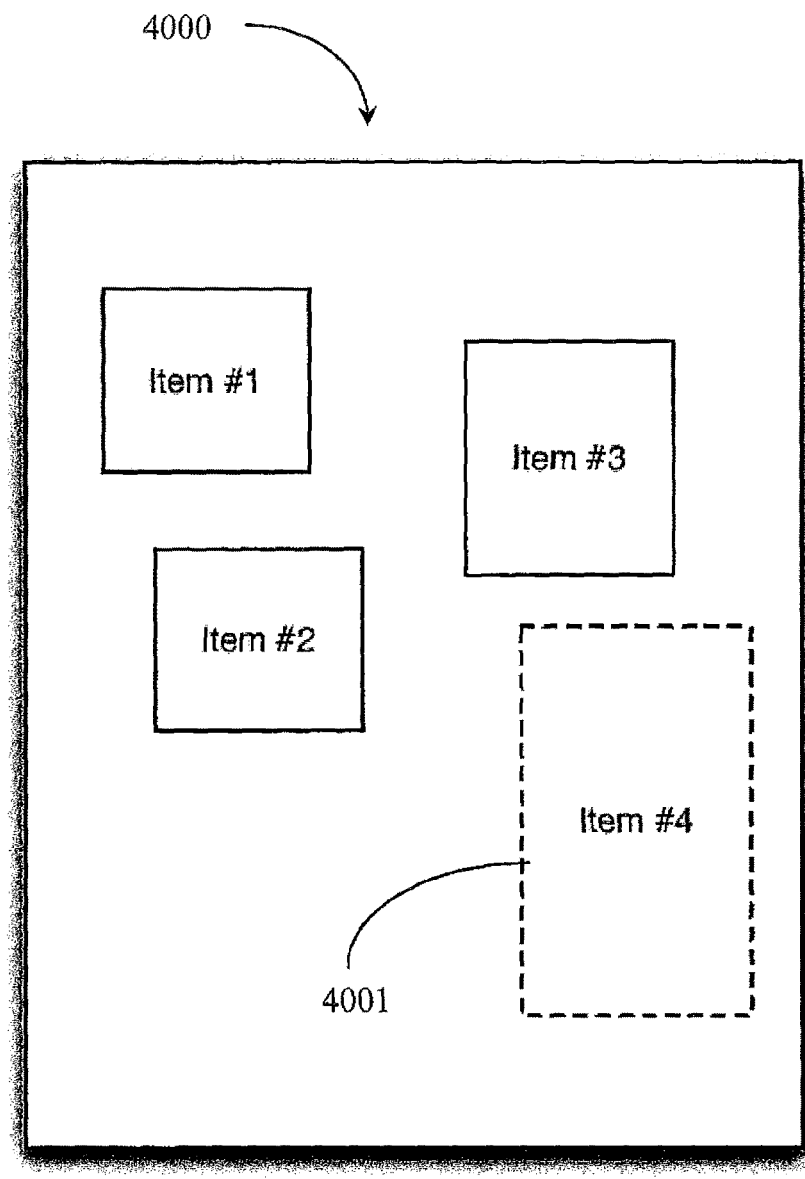
FIG. 40 is a front view of a shopping cart collage illustrating an item placed in the cart that is on hold.

FIG. 40 is a front view of a shopping cart collage illustrating an item placed in the cart that is on hold. In one embodiment, a user may place an item in the shopping cart, but mark it as a hold item so that it is not tallied during checkout as was described further above. In this case view 4000 includes hold item 4001. The visualization for a hold item may be made different from an indicator that an item is no longer available.

Figure 41:
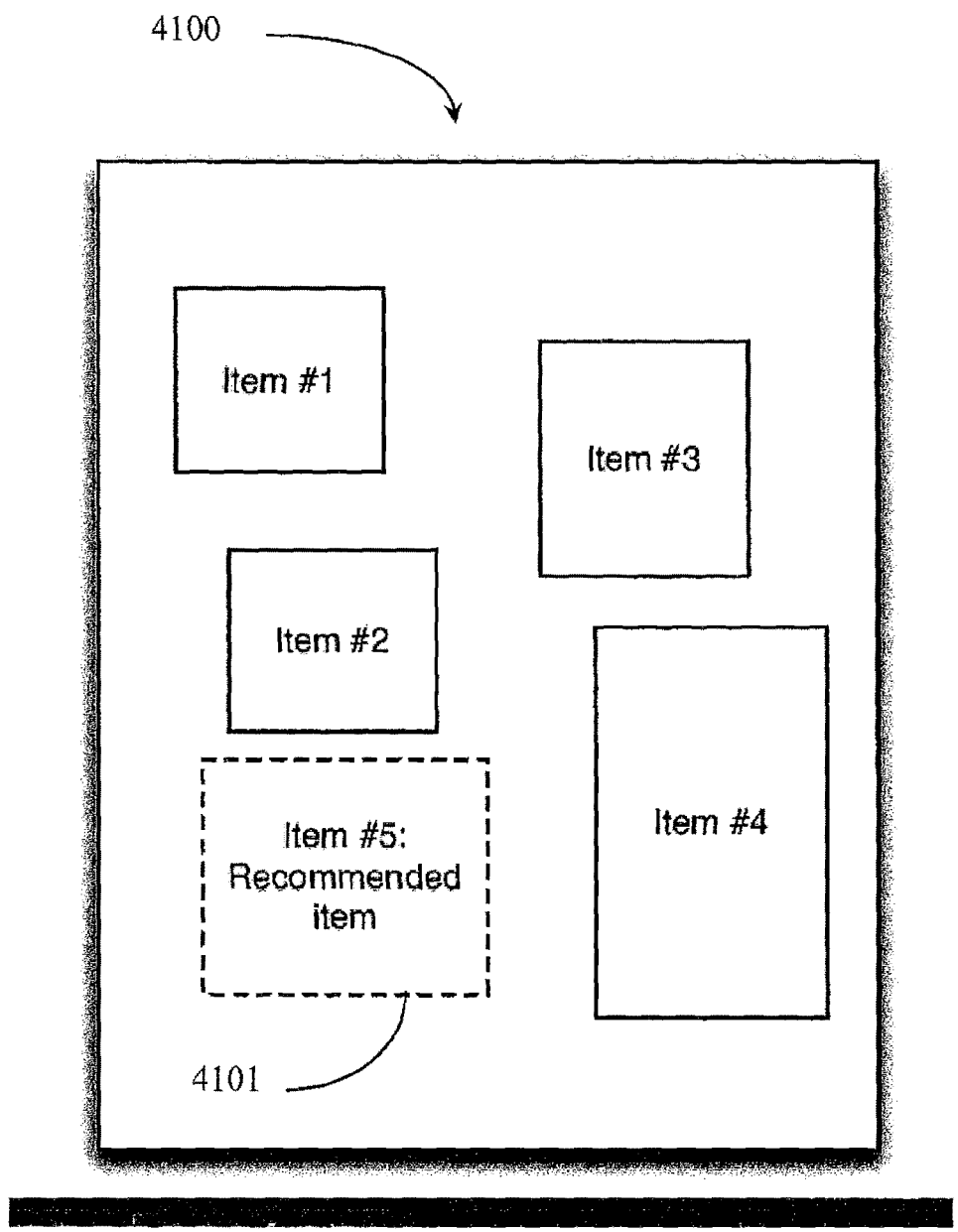
FIG. 41 is a front view of a shopping cart collage illustrating an item suggested by the system as an item recommended to the user by the merchant of some other third party.

FIG. 41 is a front view of a shopping cart collage illustrating an item suggested by the system as an item recommended to the user by the merchant of some other third party. View 4100 includes a recommended item 4101 that appears in the cart differently from those items for checkout. The recommended item can be accepted or removed from the cart. In one embodiment, if the user takes no action then the item will disappear in a very short period of time like an advertisement.

Figure 42:
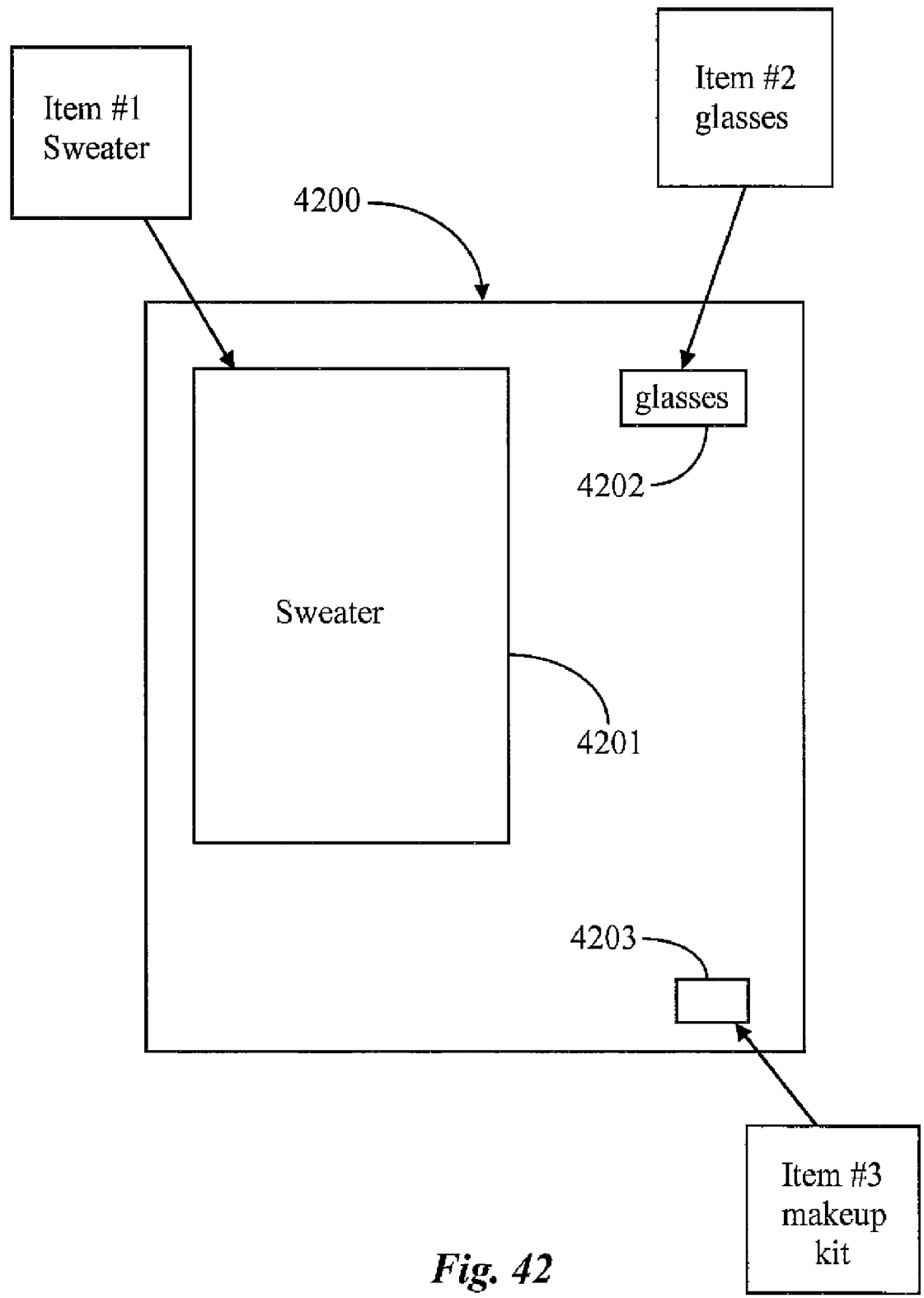
FIG. 42 is a front view of a shopping cart collage where items placed in the cart are automatically sized appropriate to scale.

FIG. 42 is a front view of a shopping cart collage where items placed in the cart are automatically sized appropriate to scale. View 4200 includes items 4201 (sweater), 4202 (glasses), and 4203 (makeup kit). The system based on a general scale can resize images based on that scale system.

Figure 43:
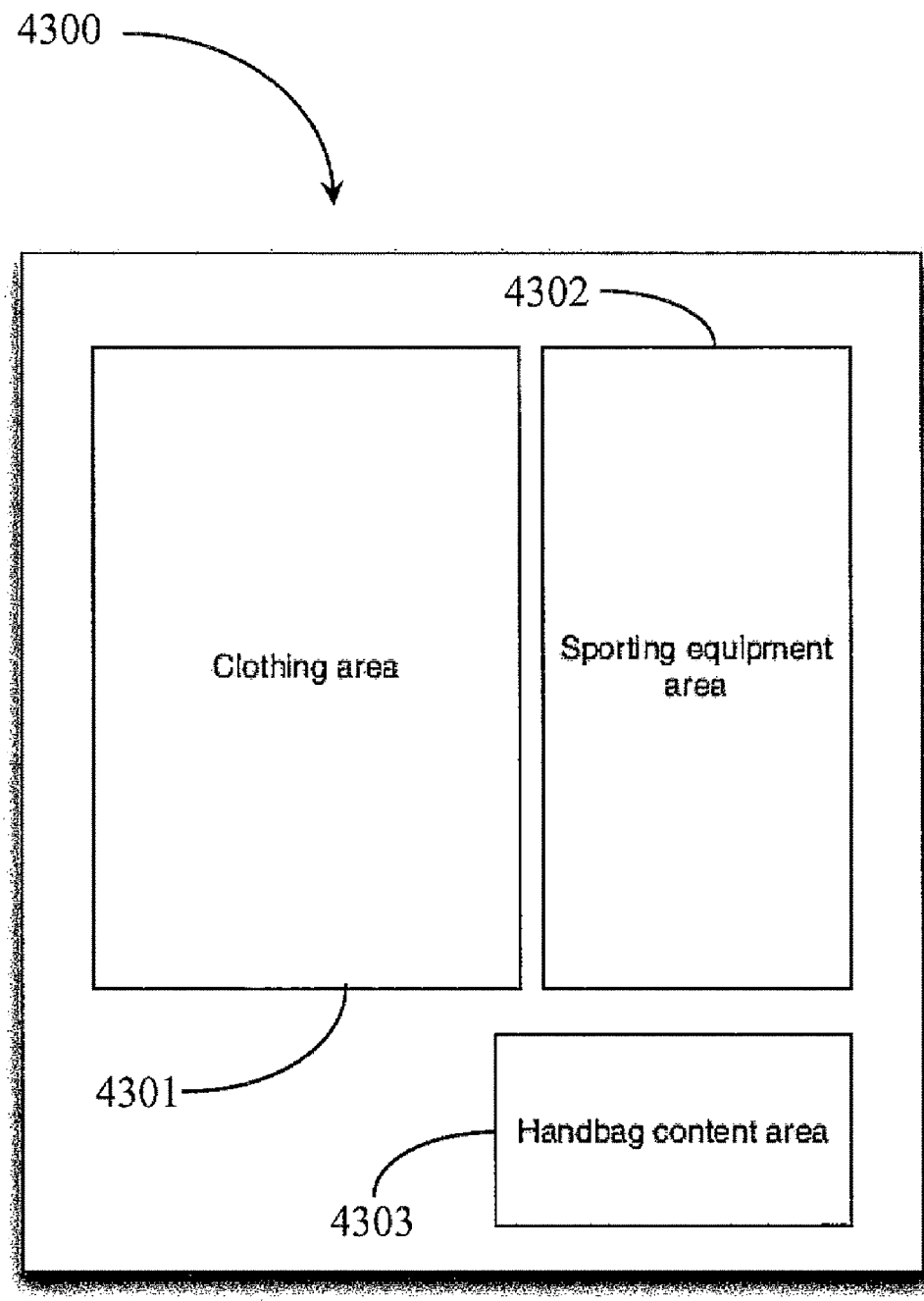
FIG. 43 is a front view of a shopping cart collage including sub-categorical partitions or sub-carts for including categorically similar items.

FIG. 43 is a front view of a shopping cart collage including sub-categorical partitions or sub-carts for including categorically similar items. View 4300 includes a sub-cart space 4301 for a clothing area, a sub-cart space 4302 for sporting equipment items, and a sub-cart space 4303 for handbag products.

With respect to partitioning a shopping cart space with multiple areas for categorical products, when a user places one of these items into the shopping cart, a mechanism may be activated to smartly place the appropriate item in the appropriate category. For example, when a user places a first item of clothing in the shopping cart, a clothing space is created covering all clothing items. If the user then places a baseball glove in the shopping cart, a new area for sporting equipment may be automatically created by the presence and recognition of the item. In one embodiment a user may manually create areas or sub-carts and may manually place the items therein the appropriate areas by clicking the add button or by dragging and dropping the item as previously discussed above.

Figure 44:
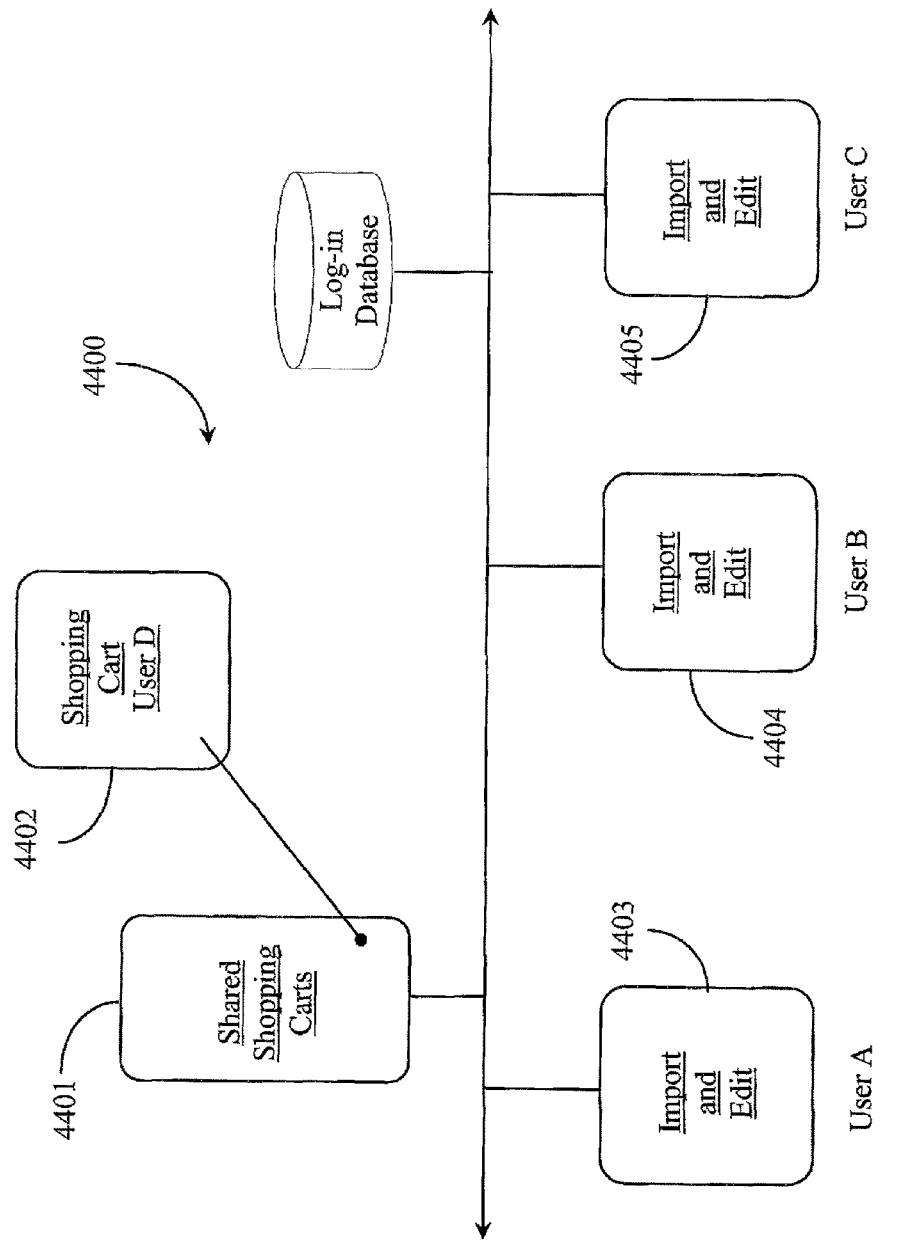
FIG. 44 is an architectural view of a collaborative environment where multiple users may access and edit a shopping cart for one user.

FIG. 44 is an architectural view of a collaborative environment where multiple users may access and edit a shopping cart for one user. Environment 4400 may be a social networking site environment with e-commerce services integrated into the functionality of the site.

A server 4401 contains multiple shopping carts prepared by users who also socially network with other users. A shopping cart 4402 is illustrated within server 4401 belonging to a user D. User D may want friends on the network to view and help edit the items placed in the user's shopping cart.

A login database is provided for users A-C who may be invited to access and edit the shopping cart of user D before user D proceeds to checkout. The invited users may receive a notification such as a post on their social interaction networking site page. So friends of user D may be invited to participate.

Users A-C have logged into the server and have imported the shopping cart of user D into their own client applications. User A is working from remote station 4403, user B is working from station 4404, and user C is working from station 4405. The remote stations may be any computing devices having Internet capability and the downloaded utility or plug-in (client) to communicate with server 4401.

Each user may provide an edited version of the shopping cart for user D. User D may approve, deny, or further edit one or more versions and may make a decision to proceed to checkout on any of the multiple edited versions of the cart.

In general, the operations of repositioning, resizing, and removing an image, described earlier with respect to product items, are also applicable to decorative elements. Two or more users can collaboratively edit a collage. A table specifies which users are permitted to view or edit each collage. When the user clicks on the collage switcher, a list of collages that the user can view or edit is displayed. The user can select one of these collages to edit it.

If the user is viewing a collage that the user has edit permission for, the user can edit the collage using the edit operations described above. If two or more users are editing the same collage, edits that one user makes show up on the other's screen. If the user is viewing a collage that the user does not have edit permission for, when the user makes an edit gesture, the system offers to make a copy of the collage within the user's own shopping cart.

Shared Pages

An editing mechanism may be provided for sharing and editing shopping carts according to collaborative effort among multiple users. The mechanism for displaying a list of viewable collages when the user activates the collage switcher may be provided as an accessible tool in a shared space.

A collage permission table in the database contains tuples of (user, collage, permission), and specifies which users have which rights (viewing or editing) for collages that they did not create. In one embodiment, when the user clicks on the collage name, the client sends a request for a list of viewable collages to the server. The server creates three lists: a list of collages that the user owns; a list of collages that for which the user has edit permission; and a list of collages for which the user has view but not edit permission. The first list is retrieved by selecting collages that are owned by the current user from the collage table. The remaining lists are selected by retrieving collages from the permission table that have "edit" and "view" permission, respectively.

The server creates a representation of each list, where each item is represented by its name, owner's name, and item ID. The client displays these lists. When the user selects a list, the client requests the contents of this list, as described in the "initial display" section above.

Editing a Shared Collage

This is the mechanism for updating other user's views of a collage when one user edits the collage. When the server shopping cart manager receives a command that modifies the shopping cart contents, such as ADD_ITEM, SELECT_IMAGE, SET_SKU, etc., in addition to interpreting this command as described above, it relays the response to this command to other clients that are viewing the same shopping cart, as well as to the client that sent the message. In interpreting this message as though it were the response to a command that it had sent, the client will modify its local representation of the shopping cart contents and the display as though the change had been made locally.

Editing a Read-Only Collage

When the user performs an edit gesture upon a layout that they do not have write access to, they are prompted to make a copy of the layout. If they affirm this, the client sends a CLONE_COLLAGE request to the server. The server creates a copy of the collage entry in the collage table, and it creates copies of the page element entries in the page element table. The collage entry copy is identical to the original except that the collage's owner is the user identified in the client request. The page element entries are identical to their respective originals except that their collage references refer to the new collage entry. The server returns the ID of the new collage to the client, which requests and displays its content as described in the section on initial display, above.

Figure 45:
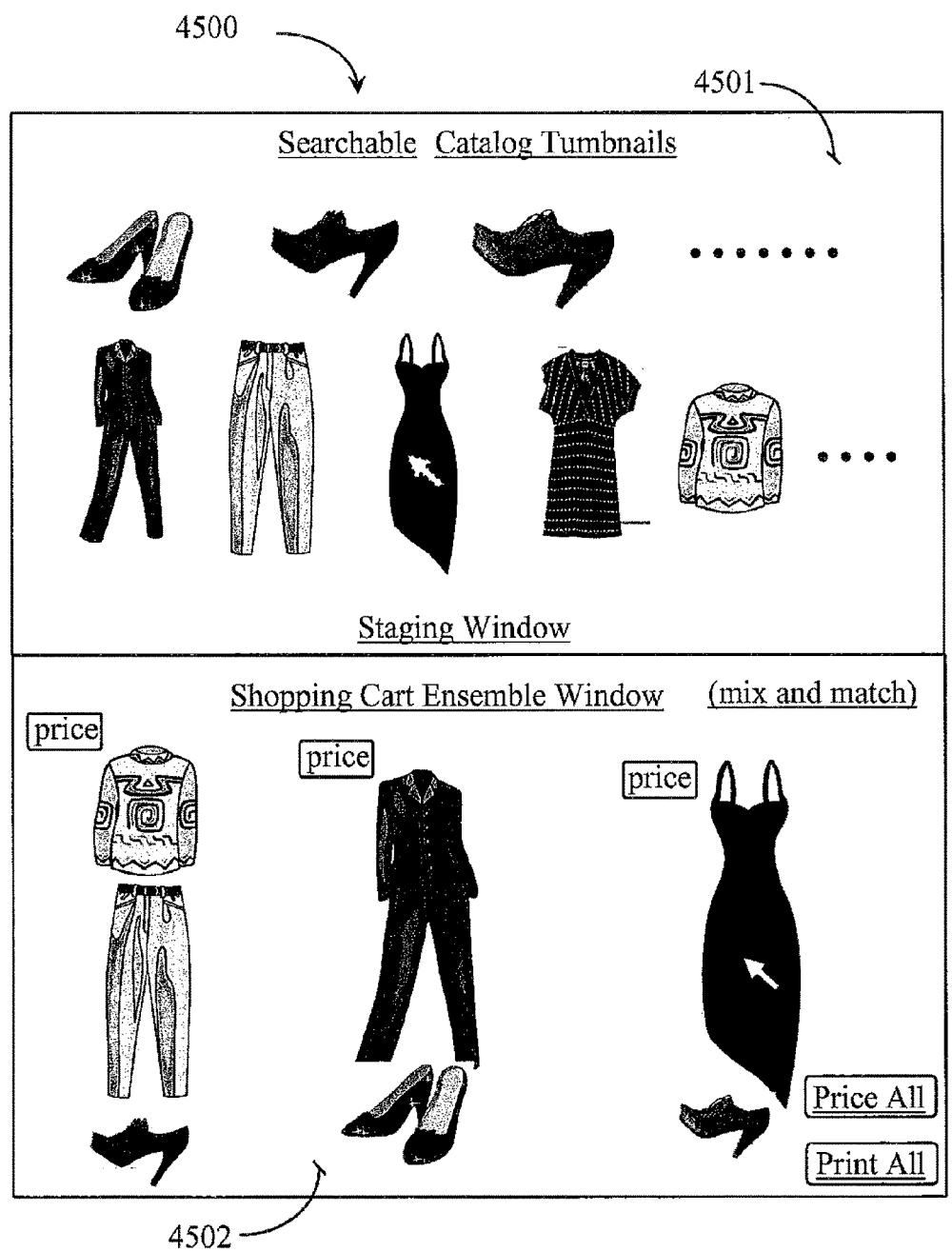
FIG. 45 is a front view of a shopping cart 4500 containing multiple ensembles arranged according to an embodiment of the present invention.

FIG. 45 is a front view of a shopping cart 4500 containing multiple ensembles arranged according to an embodiment of the present invention. Shopping cart 4500 contains a collage view of multiple clothing ensembles. Shopping cart interface 4500 is divided horizontally in this example into a catalog pace 4501 and a shopping cart 4502.

In this embodiment a user may utilize the catalog area to aggregate items for application to individual ensembles in the shopping cart space. In the catalog space the user has gathered shoes and various articles of clothing. The invention may be used for other product ensembles besides clothing such as for food items. Clothing serves as a god example of items that may be grouped according to some motivation such as fashion. Food items may also be grouped for dinners etc.

The user in this case has placed a sweater, slacks and shoes in one ensemble (far left), which has its own ensemble pricing. A merchant may have motivation to provide discounts for users who assemble outfits from their available items promoting the purchase of more items.

The user has also placed a pants suit and shoes into a second ensemble having its own price. The user has also placed a dress with a pair of shoes to create yet another ensemble at far right having its own price. Each ensemble becomes a checkout item with a price that may be less than each original atomic item aggregated. The user may mix and match items into ensembles and may treat each ensemble like an item. Moreover, the user may tear down an ensemble, remove part or the entire ensemble and so on.

Pricing in this embodiment is dynamic in the sense that if the user takes an item out of an ensemble the ensemble pricing dynamically changes accordingly. Multiple sets of price totals corresponding to the ensembles change dynamically with additions and subtractions of items. In one embodiment, ensembles may be assembled and suggested to users based on a user's stated budget. Gloves, belts, scarves, jewelry, hats, bags, and other accessories might be considered for assembling an ensemble. Image placement with respect to sizing and positioning may be made smart based on item recognition and scale so that the system can calculate the correct placement of items added to any ensemble. Each ensemble may be provided with a temporary "sticky" region so that items may be dragged near the appropriate ensemble and automatically be assembled to the ensemble. Just as with individual items, ensembles may be "suggested" to a user and appear temporarily or with some visual difference such as dimmed or with a dotted outline until a user accepts the suggestion such as by double clicking on it. Collaboration environments may support multiple users sharing and editing of shopping carts with ensemble editing suggestion and creation.

Figure 46:
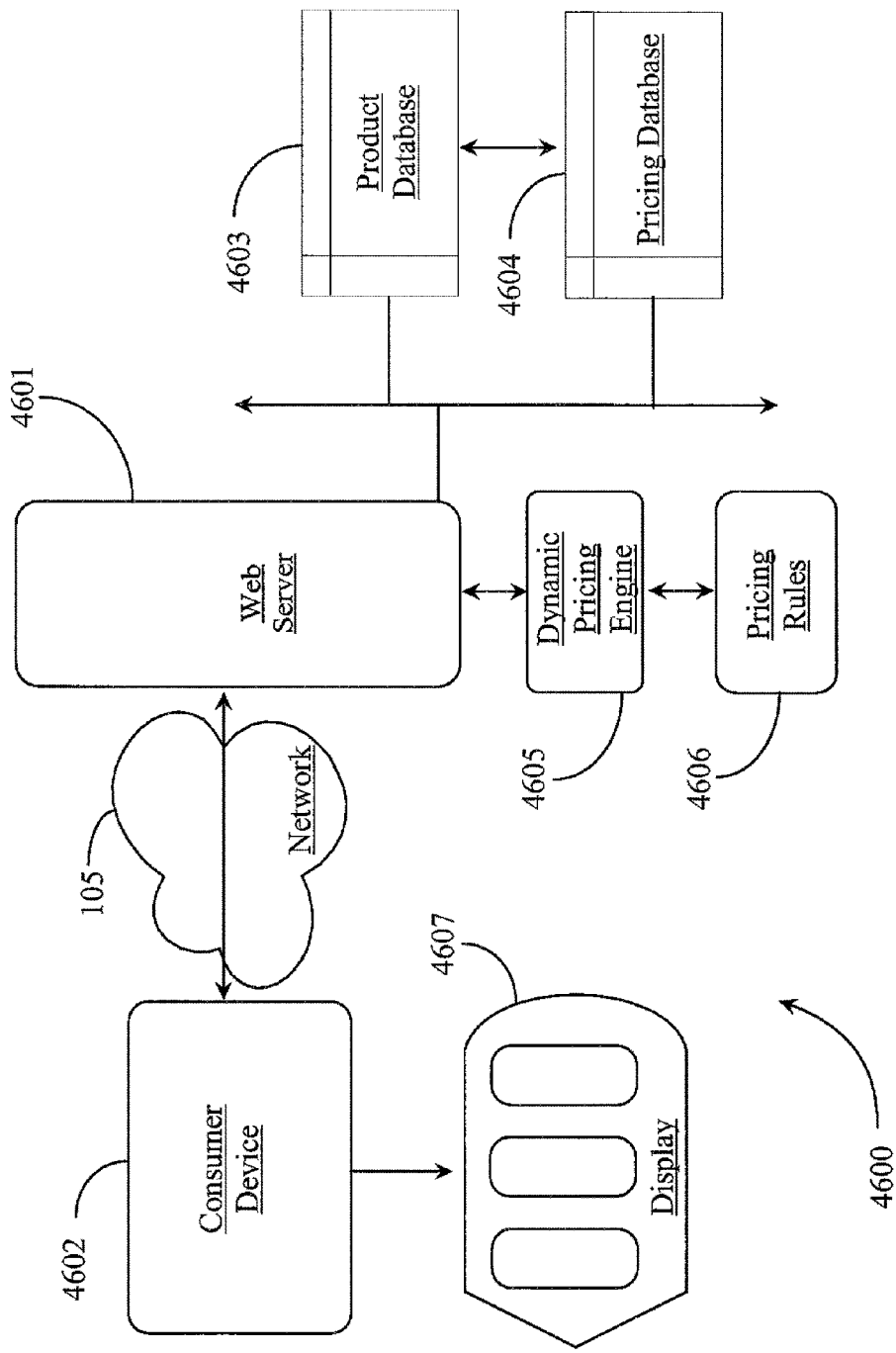
FIG. 46 is an architectural view of a shopping service practicing dynamic item pricing according to an embodiment of the present invention.

FIG. 46 is an architectural view of a shopping service practicing dynamic item pricing according to an embodiment of the present invention. Consumer device 4602 may access server 4601 through network 105 to engage in e-commerce shopping according to an embodiment of the invention where an interactive shopping cart integrated with one or more product catalogs displayed in device display 4607. As the user adds and subtracts items from the shopping cart or places items on suspension or hold within the art, pricing for the items is dynamically calculated and visible to the user in real time.

In this example, product items are stored in database 4603, which is a product database and product pricing is stored in a separate database 4604, which is a pricing database. Pricing in database 4604 is correlated to the products in database 4603.

A dynamic pricing engine 4605 is provided within or accessible to server 4601. Pricing engine 4605 is adapted to keep count of items in a shopping cart and tally the pricing according to the display of the items weighed against pricing rules 4606.

When a user adds items into shopping cart display 4607, each item may have a price visible and a total accounting for all of the active items in the cart may also be visible to the user. In a case of ensembles, pricing rules may play a large part in determining discounts for certain combined product and so on. For example, a rule might be that shoes 10-234 grey are discounted 20% if combined with any pantsuits 10-223 series. Quantity discounts, credits, and the like may all be tallied using engine 4605 in real time. This capability provides an excellent motivation for advertising by suggesting quantities and combinations to on-line shoppers as they browse items.

Figure 47:
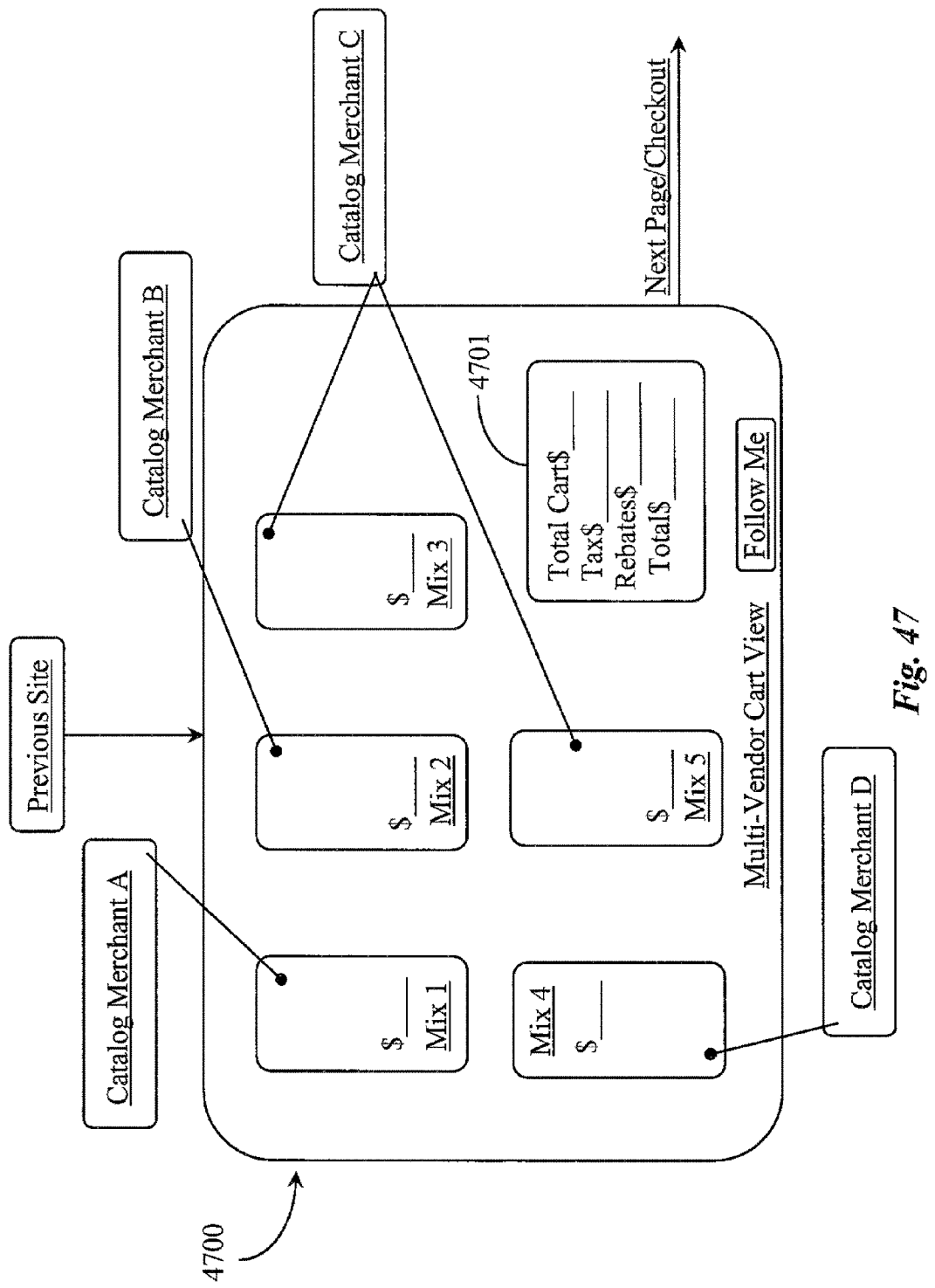
FIG. 47 is front view of a shopping cart serviced by multiple vendors according to an embodiment of the present invention.

FIG. 47 is front view of a shopping cart serviced by multiple vendors according to an embodiment of the present invention. An interactive shopping cart 4700 is provided in this embodiment wherein a user operating the cart has access to multiple on-line merchant sites using the same cart to aggregate items for checkout. The cart may be integrated with catalogs of multiple merchants or the cart may be taken from site to site while the user is aggregating products.

Shopping cart 4700 has 5 ensembles mix 1 through mix 5 assembled for checkout. The aggregated ensembles are provided by various merchants. For example, a catalog merchant A is the source of ensemble (Mix 1). A catalog merchant B is the source of ensemble (Mix 2). Catalog merchant C is the source of ensembles (Mix 3 and Mix 5). A catalog merchant D is the source of ensemble (Mix 4).

In this example, dynamic pricing is provided so that the user knows how much each ensemble costs before going to checkout. Moreover, a pricing block or information window 4701 is provided to give the total cart value in dollars, the total taxable amount, any total amount of rebates and the final cart total and perhaps the final totals for each merchant after rebates.

In one embodiment, a bill payment system is integrated into the schema so that one payment can be allocated according to the shopping cart amounts to each of the participant vendors. In this way the user does not have to navigate to multiple vendor sites and be required to check out at each site.

In one embodiment, the shopping cart interface has a user control interface (Follow Me). Using this interface, a user may drag the shopping cart to multiple shopping sites generic to participating merchants such as more than one separate merchant store. The user may shop at many different sites and leave sites without checking out but having the product items from the site still in the shopping cart ready for checkout. When the user is finished shopping the user may proceed to a central checkout service that incorporates the visited merchant sites as member sites. Using this capability, a user might shop first at home depot, then at Barnes and Noble, and then at Sears and may aggregate items from all three online merchants and check them out at the centralized checkout service and make one credit card payment for all of the items. The payment service may take the card payment and allocate the appropriate remittance to the merchant accounts on behalf of the user.

Using this concept, a user could shop online for a while and then turn over the task to another user or more than one user to delegate purchasing power. For a company, a maintenance worker may take the cart to buy needed maintenance supplies and then turn the cart over to a materials buyer to purchase manufacturing materials for an upcoming order. Checkout may not be required until every user has done their shopping with the same cart. The last user can then use the company credit card to make a one-time payment for all of the items. For some product items there may be time limits on pricing or they may become unavailable during multi-vendor and multi-user shopping. However, using the techniques described further above the centralized checkout can validate the cart against current information at all of the sites to make sure availability and pricing of the items are still valid. Price changes can be recalculated at checkout and items which are no longer available can be marked so. Links back to the merchant sites can be provided with marked items that have had price changes or that have become unavailable since the item was placed in the cart. Additional service information may also be available from the disparate sites such as order data and delivery (ETA) for an item that is no longer available in stock.

Figure 48:
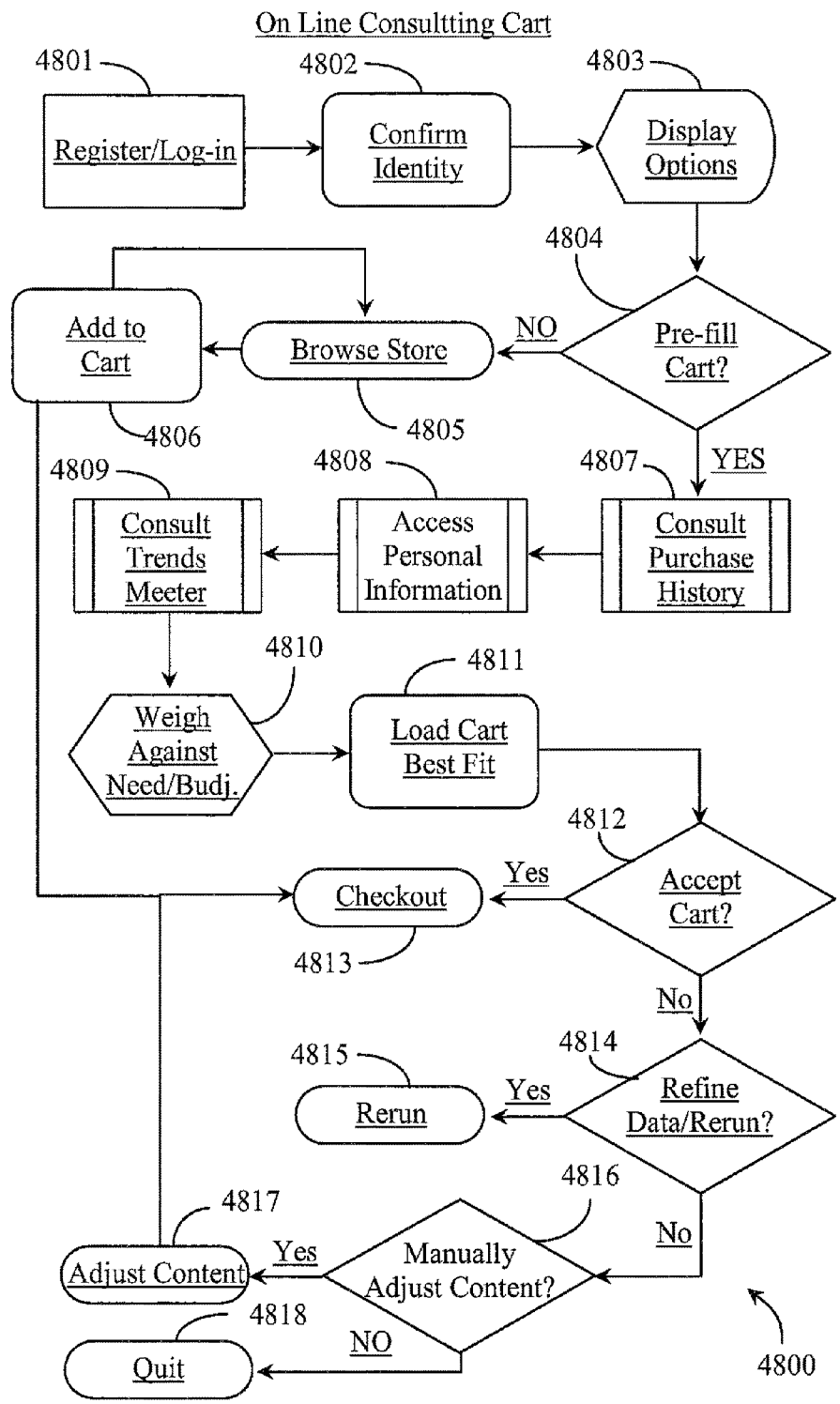
FIG. 48 is a process flow chart illustrating steps for interacting with a dynamic, interactive shopping cart according to one embodiment of the present invention.

FIG. 48 is a process flow chart illustrating steps 4800 for interacting with a dynamic, interactive shopping cart according to one embodiment of the present invention. In one aspect of the invention collaborative features may be extended into the automated system world where computer intelligence provides input or suggestion to a user interacting with the system. In this process a user may obtain a pre-filled shopping cart based on what is known about the user by an automated probability system connected to site intelligence.

At step 4801, a user registers or logs into a service for shopping. At step 4802, the server confirms the ID of the user. At step 4803, the server displays options for the user to select. One of the options is whether or not the user wants to get a pre-filled shopping cart at step 4804. A pre-filled shopping cart for a user has content based on what information about the user is resident at the service or can be gleaned from the user during interaction with the server before runtime.

If at step 4804, the user decides not to obtain a pre-filled shopping cart, the user may instead browse the online store with an initially empty shopping cart in step 4805. The user may also manually add any catalog items into the cart at step 4806. These two steps may loop until the user decides to proceed to checkout at step 4813 skipping the consulting process.

At step 4804, if the user decides to obtain a pre-filled cart, then at step 4807, the service may consult the purchase history of the user at step 4807. At step 4808, the service may also consult personal information about the user. In a fashion embodiment, purchase history may reveal style choices of the user with respect to various categories of clothing and accessories. Personal information may reveal size of the user for fitting of shoes, pants, blouses, dresses and so on. At step 4809, the service may consult with a trends meter that may contain the latest data on what is hot, age appropriate, fashionable, in, out, etc.

At step 4810, the service may weigh the information aggregated against the stated needs and budget of the user too narrow a list of possible items to fill the shopping cart of the user. At step 4811, the service pre-fills the user's shopping cart with items that the service recommends based on the information.

At step 4812, the user can decide whether to accept the recommendation of the service. If at step 4812, the user accepts all of the items, the user may then proceed to checkout at step 4813. If at step 4812, the user does not accept the recommended items fully, then the user can decide in step 4814 to refine the data the service has and try for a rerun of the process. If the user decides to rerun process at step 4814, the user can initiate a rerun at step 4815. In this step the user may refine some data such as size information for example. If at step 4812, the user decides not to attempt a rerun of the process, the user can decide to manually adjust the content provided in the shopping cart at step 4816. If the user decides not to manually adjust the contents, then at step 4818, the user may quit the process and log off of the service. If at step 4816, the user decides to manually adjust the content in the shopping cart then the user may proceed at step 4817 to adjust the contents and when satisfied, may proceed to checkout at step 4813.

In this example, service intelligence such as fashion trends may be enhanced by input from many sources including professional fashion consultants. Using this system and service a user travelling to a foreign country may pre-fill a shopping cart with styles that are popular where the user may travel. This service is not limited to clothing and accessories. The service may be practiced with other types of products such as home furnishings and decorating products, camping products, sporting goods, professional supplies, fishing equipment and so on. To adapt to different environs, the service intelligence including personal information and trends meter information will be different. There are many possibilities.

Figure 49:
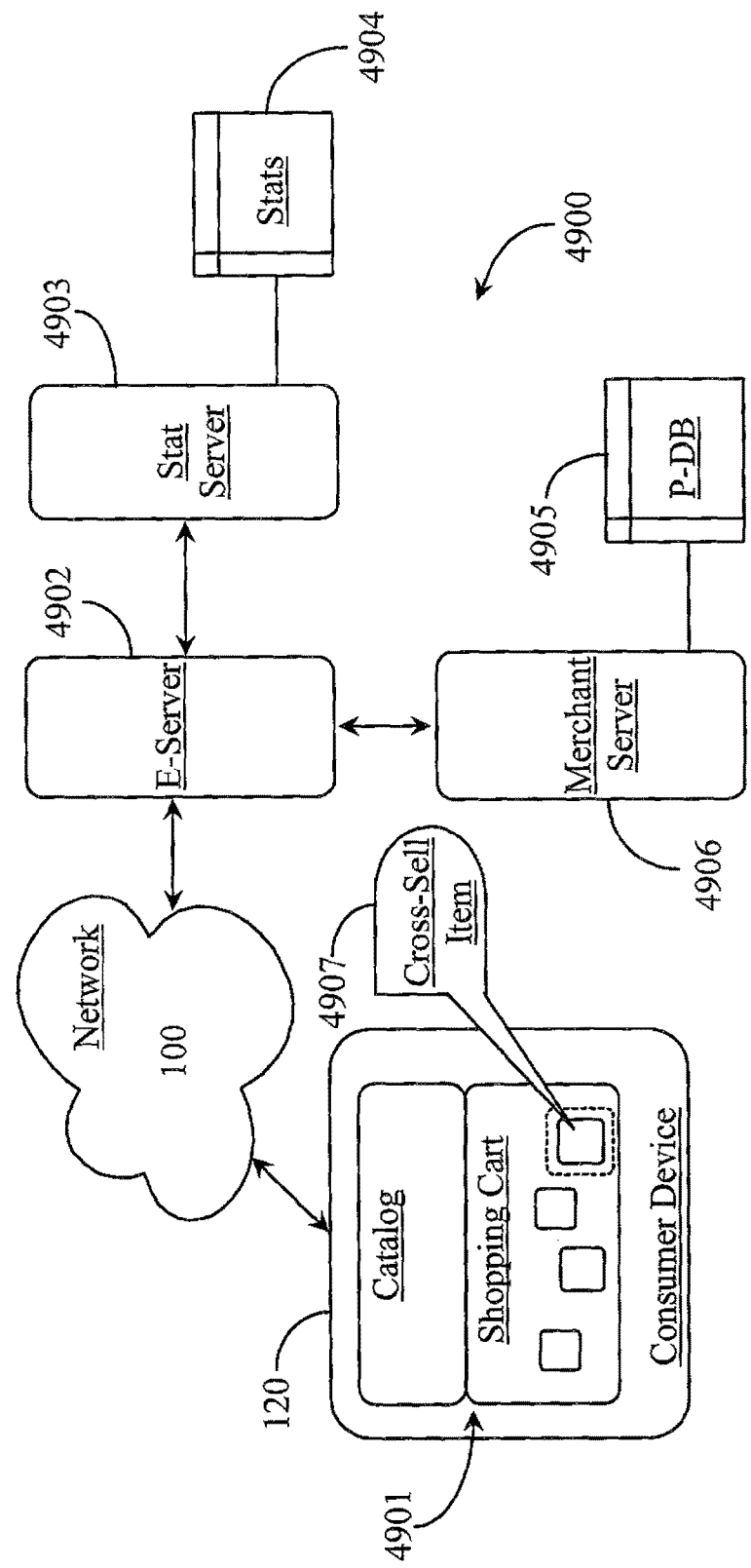
FIG. 49 is an architectural view of a shopping network 4900 practicing dynamic cross selling based on statistics.

FIG. 49 is an architectural view of a shopping network 4900 practicing dynamic cross selling based on statistics. Network 4900 includes WAN 100 and consumer device 120. Device 120 is connected to an E-commerce or E-server 4902. A client on device 120 is used to interact with the shopping cart of the present invention (4901) as described further above. A merchant server 4906 is illustrated in this example and is connected to E-server 4902 via the network. In this example, E-server 4902 collects statistics from a stat server 4903 that has access to stored statistics in database 4904.

Merchant server 4906 has access to a product database (P-DB) 4905 including items for general purchase and items that the merchant may suggest based on relevant statistics including Bayesian statistics. Statistics 4904 may include those liked to probability, demographics, user history, current shopping cart content, geographies, climate, weather, or other types of statistics such as behavioral, and use.

Shopping cart 4901 includes an accessible catalog interface integrated with the actual shopping cart space and all of the features previously mentioned may be assumed possible in this example. As the user is shopping, E-server 4902 recognizes the current content of the shopping cart and has access to other statistics as described above. Based on consultation of statistics served by stat server 4903, server 4902 may broker a cross-sell item illustrated herein as a cross-sell item 4907 for merchant 4906. The cross sell item may be grayed out or surrounded by an irregular or dotted border region indicating the item is suggested only as a cross sell or an upsell item.

If the other items suggest a pattern or trend, the service may offer an item based on what most users who purchase the items in the art might also purchase or may be interested in. There are many different motivations for offering a cross sell item not the least of which it may be similar or loosely associated with the other items already in the cart. Other statistical analysis or collaborative filtering analytics might determine a plausible cross-sell item based on entirely different statistics.

The interactive shopping cart of the present invention may be provided as a portable product which can be shared among collaborators. It can be emailed and copied or posted whereby other users can access and edit product items and can contribute to decorative elements of the cart. In one embodiment, users may upload images of themselves into the cart. In a collaborative embodiment, users may upload self images or avatars where they appear in the cart wearing the items. The users may, for example, be girlfriends on a shopping spree where each girl's image is part of an individual ensemble put together in the cart. A background image may be provided with the girl's ensemble images positioned around the backdrop.

It will be apparent to one with skill in the art that the interactive shopping cart and service system of the invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A system comprising:
   one or more computer processors;
   or more memory connected to the one or more computer processors, wherein the one or more memory includes executable instructions configured to cause the one or more computer processors to:
   create a shopping cart window having a plurality of products represented by product images arranged into a plurality of segmented areas displayed simultaneously within the shopping cart window, wherein each area in the plurality of segmented areas identifies a specific product category and visually contains multiple products from the plurality of products;
   freely arrange each product image of the plurality of products into a collage view of product images within the shopping cart window;
   add a new product represented by a product image to the shopping cart window;
   automatically determine that the new product has a product category which is not any of the specific product categories for the plurality of segmented areas in the shopping cart window;
   automatically create a new segmented area in the shopping cart for the new product based on the product category for the new product.

* * * * *